United States Patent [19]

Takashimizu et al.

[11] Patent Number: 5,743,518
[45] Date of Patent: Apr. 28, 1998

[54] PAPER STACKING APPARATUS FOR IMAGE READING APPARATUS AND IMAGE READING APPARATUS WITH PAPER STACKING APPARATUS

[75] Inventors: Yoshihiro Takashimizu; Masahiro Yoshida; Toshiaki Anzai; Toshio Saito, all of Kawasaki, Japan

[73] Assignee: Fujitsu Limited, Kawasaki, Japan

[21] Appl. No.: 845,050

[22] Filed: Apr. 21, 1997

Related U.S. Application Data

[63] Continuation of Ser. No. 407,472, Mar. 20, 1995, abandoned.

[30] Foreign Application Priority Data

Apr. 7, 1994 [JP] Japan ................................ 6-069828

[51] Int. Cl.[6] ............................................... B65H 5/22
[52] U.S. Cl. .................. 271/4.1; 271/4.01; 271/265.02; 271/265.04; 271/176; 271/314; 271/215; 271/217; 271/223
[58] Field of Search ....................... 271/4.01, 4.08, 271/4.1, 258.01, 259, 262, 263, 265.01, 265.02, 265.04, 176, 314, 207, 213, 214, 215, 217, 223

[56] References Cited

U.S. PATENT DOCUMENTS

| | | | |
|---|---|---|---|
| 3,840,222 | 10/1974 | Fowlie et al. | 271/214 |
| 3,991,996 | 11/1976 | Bass | 271/314 |
| 4,155,643 | 5/1979 | Ladds et al. | 271/207 |
| 4,164,649 | 8/1979 | Anderegg et al. | 271/4.1 |
| 4,824,091 | 4/1989 | Knight | 271/207 |
| 5,106,051 | 4/1992 | Jordelius | 271/223 |
| 5,215,394 | 6/1993 | Kim | 400/625 |
| 5,249,793 | 10/1993 | Scheufler | 271/207 |
| 5,318,401 | 6/1994 | Mandel | 271/214 |

FOREIGN PATENT DOCUMENTS

| | | | |
|---|---|---|---|
| 0 024 712 A1 | 3/1981 | European Pat. Off. | |
| 38 43 281 C2 | 8/1992 | Germany. | |
| 58-00522142 | 3/1983 | Japan | 271/213 |
| 403267263 | 11/1991 | Japan | 271/213 |
| 406135616 | 5/1994 | Japan | 271/215 |
| 406135617 | 5/1994 | Japan | 271/213 |
| 2080253 | 2/1982 | United Kingdom | 271/215 |
| 2 215 313 | 9/1989 | United Kingdom. | |

OTHER PUBLICATIONS

German Patent Office Official Letter for corresponding German Patent Application No. 185 10 882.5–27 dated Aug. 27, 1995 (w/ translation of same).

Primary Examiner—H. Grant Skaggs
Attorney, Agent, or Firm—Armstrong, Westerman, Hattori, McLeland & Naughton

[57] ABSTRACT

A paper stacking apparatus for an image reading apparatus and an image reading apparatus with a paper stacking apparatus wherein paper sheets can be stacked appropriately to allow a large amount of paper sheets to be read rapidly at a time are disclosed. The paper stacking apparatus is designed to stack a paper sheet discharged from a paper transport mechanism of an image reading apparatus along which an optical image reading mechanism is disposed, and comprises a paper stacker including, at a bottom portion thereof, a stacker table for receiving thereon paper sheets discharged from the paper transport mechanism to stack the paper sheets, a paper stacker position variation mechanism for varying the position of the paper stacker, a paper discharge roller mechanism provided at a terminal end of the paper transport mechanism and having a projection extending into a paper transport path of the paper transport mechanism, and a paper trailing end guide mechanism disposed to extend into the paper stacker for guiding a trailing end of a paper sheet to be stacked into the paper stacker.

17 Claims, 66 Drawing Sheets

F I G. 2
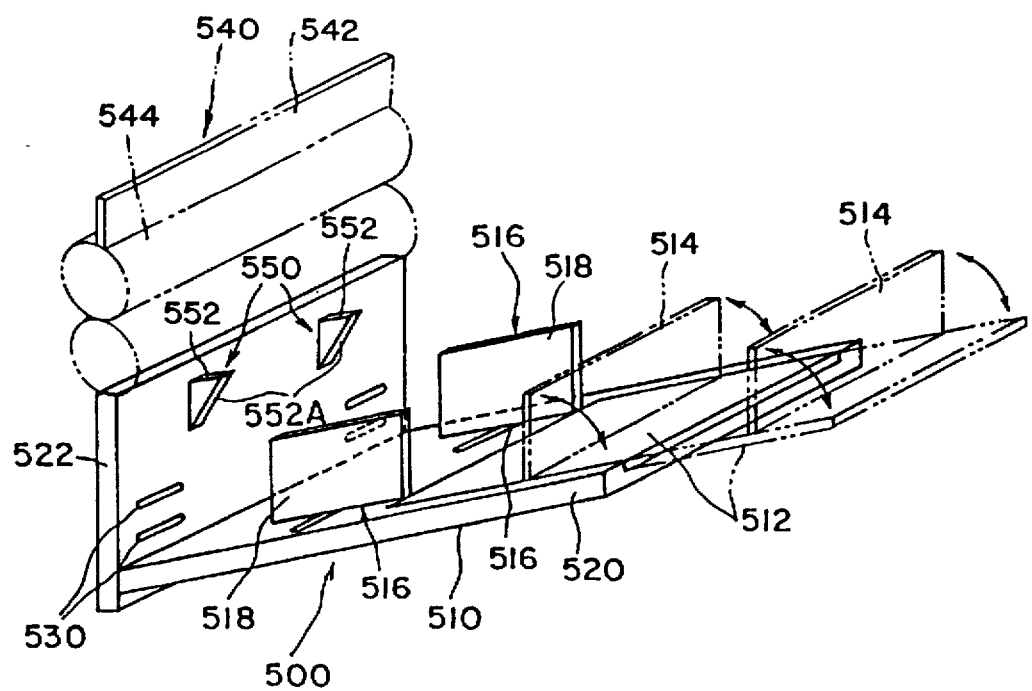

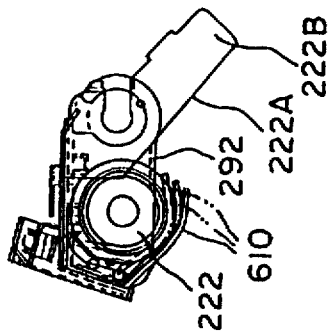
FIG. 16(D)
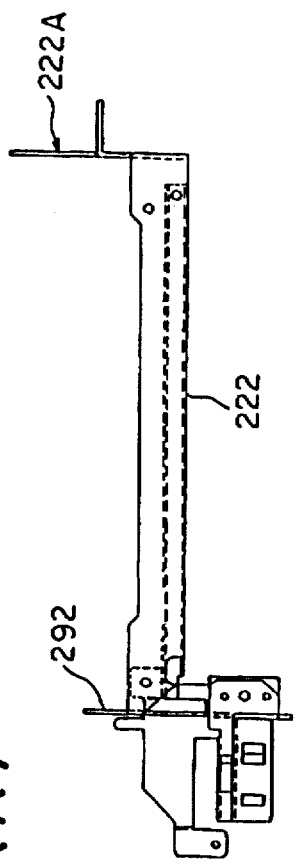
FIG. 16(A)
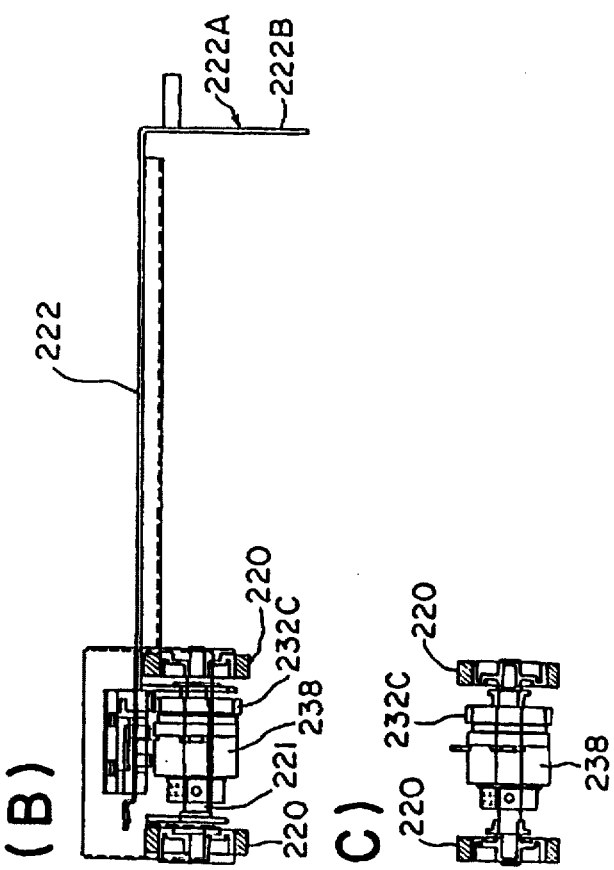
FIG. 16(B)
FIG. 16(C)

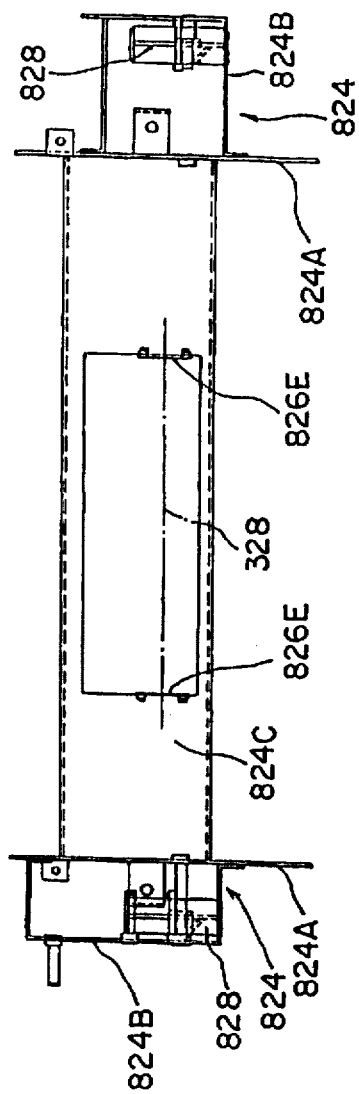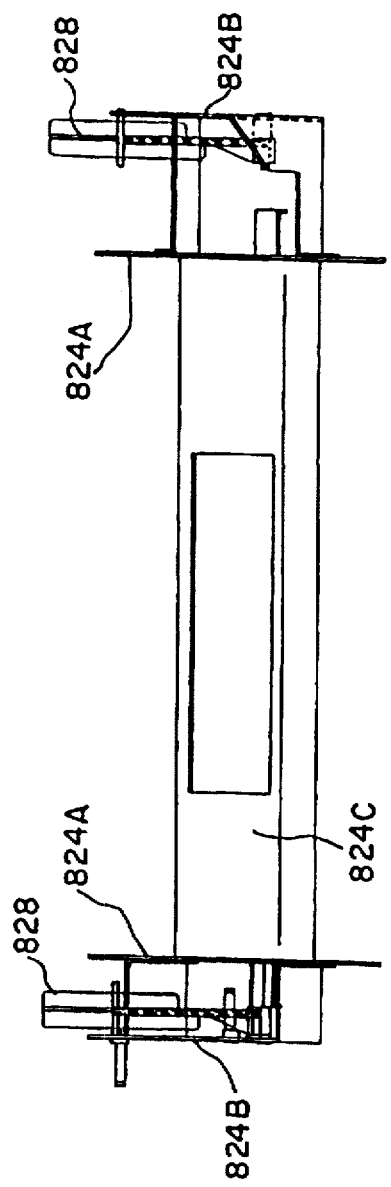

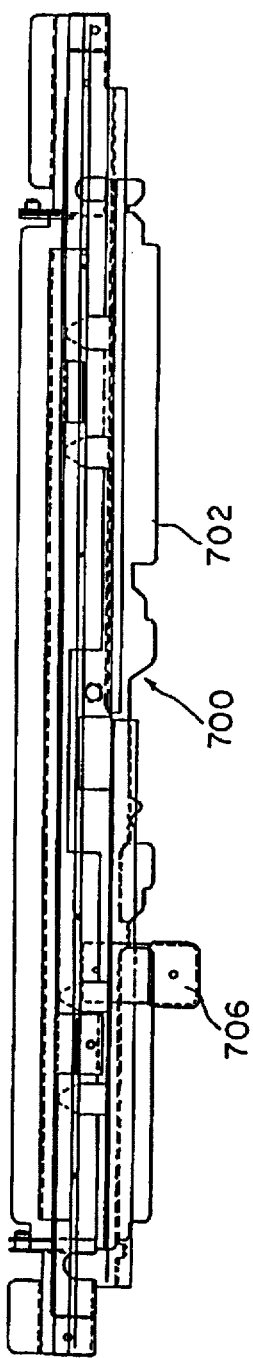
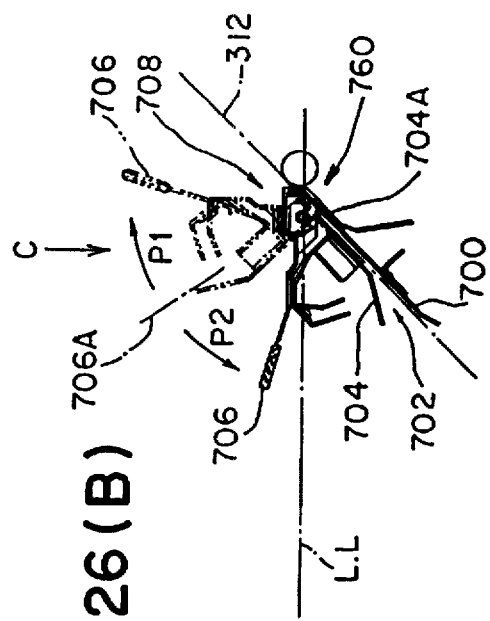
FIG. 26(A)
FIG. 26(B)

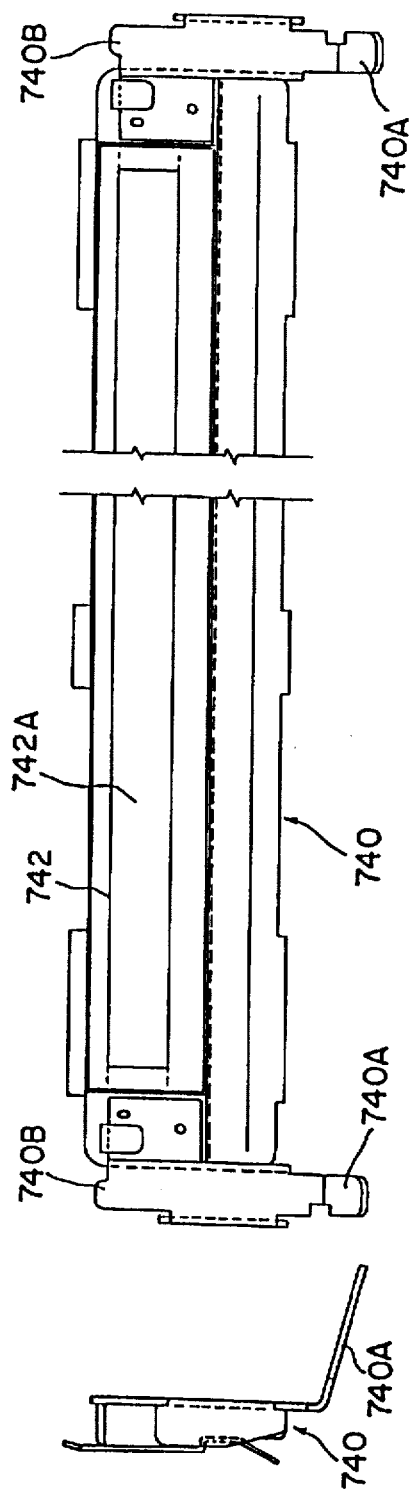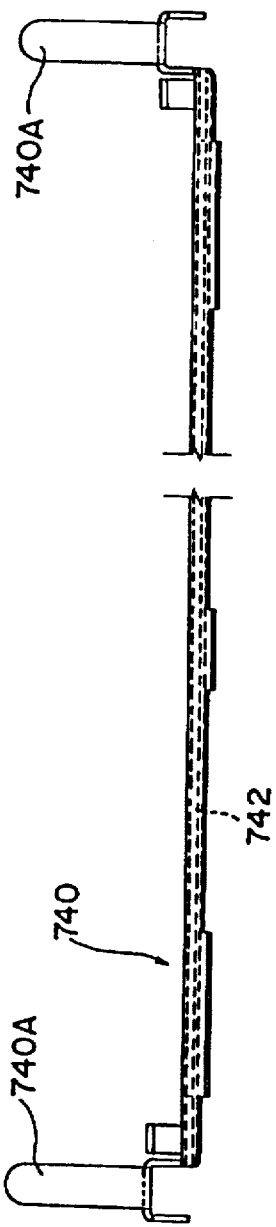

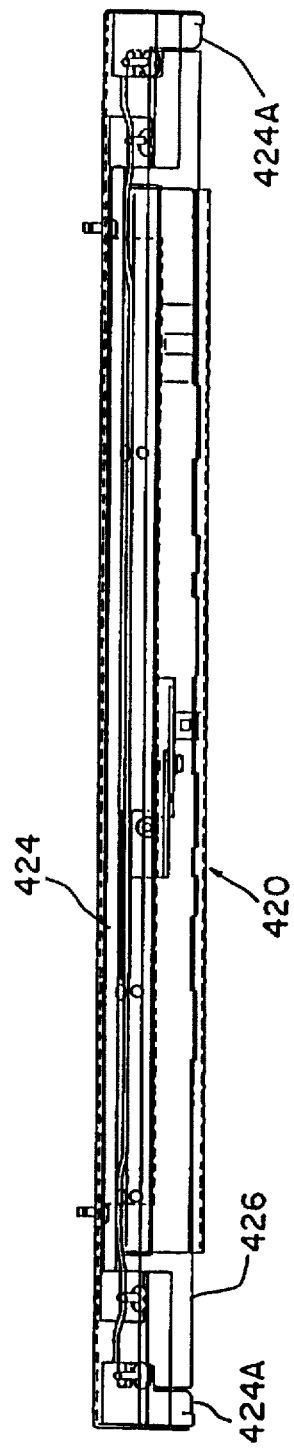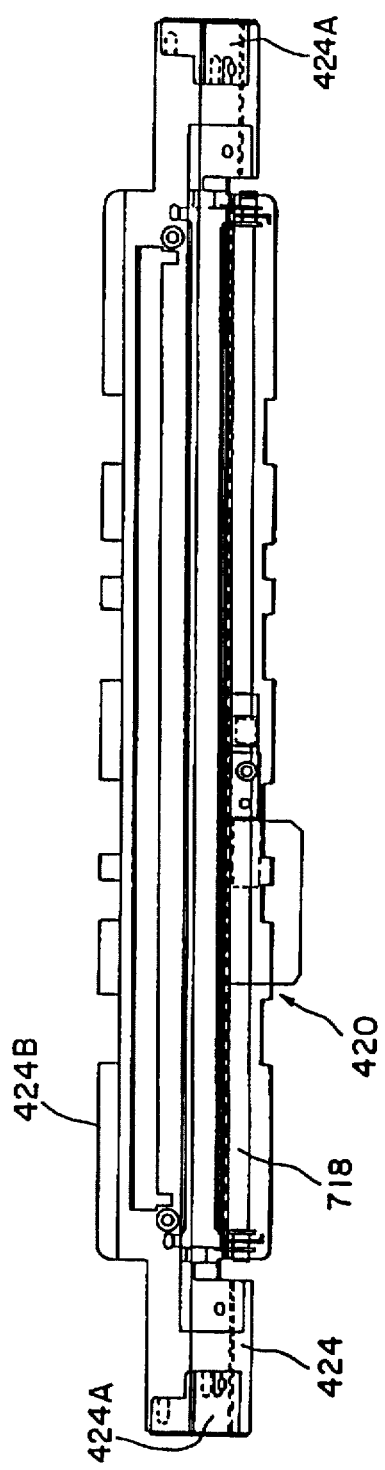
FIG. 32(A)
FIG. 32(B)

PRESENT CONTROL IS NOT PERFORMED WHEN BOTTOM
SENSOR ALREADY DETECTS LOWER END OF TABLE

L1: OVERRUN AMOUNT

L2: MANUAL INSERTION OVERRUN AMOUNT
T3: MANUAL INSERTION START TIME
T4: STACKER DISCHARGE TIME AFTER START
    OF PAPER SUPPLY

FIG. 41

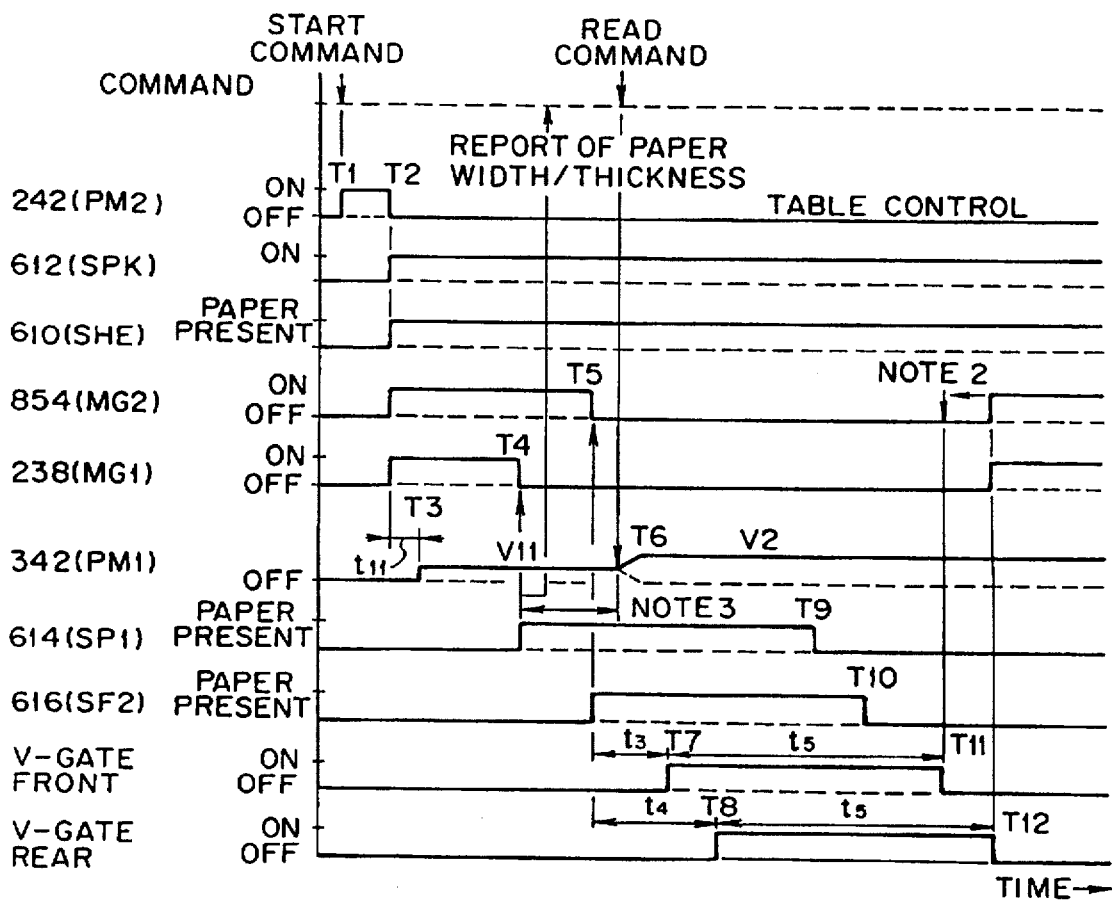

- $t_3$ —— TIME REQUIRED FOR PAPER TO PASS FROM SF2 TO READING POINT R1  $t_3 = L_2 / V_2$
- $t_4$ —— TIME REQUIRED FOR PAPER TRAILING END TO PASS FROM SF2 TO READING POINT R2  $t_4 = L_1 / V_2$
- $t_5$ —— TIME REQUIRED TO FETCH IMAGE
  $t_5 = $ READ LINE NUMBER × INTEGRATION TIME
- $V_1$ —— PAPER TRANSPORT VELOCITY OF SEPARATE ROLLER (SR)
  WHEN VELOCITY FOR FIRST PAPER SHEET IS $V_{11}$, VELOCITY FOR SECOND OR FOLLOWING PAPER SHEET OF THICKNESS WITHIN SPECIFICATIONS IS SET HIGHER THAN $V_{11}$, BUT VELOCITY FOR PAPER SHEET OUTSIDE SPECIFICATIONS IS SET TO $V_{11}$
- $V_2$ —— PAPER TRANSPORT VELOCITY OF FR1 TO FR5 ROLLERS

NOTE 2, NOTE 3 —— REFER TO FIG. 42

FIG. 42

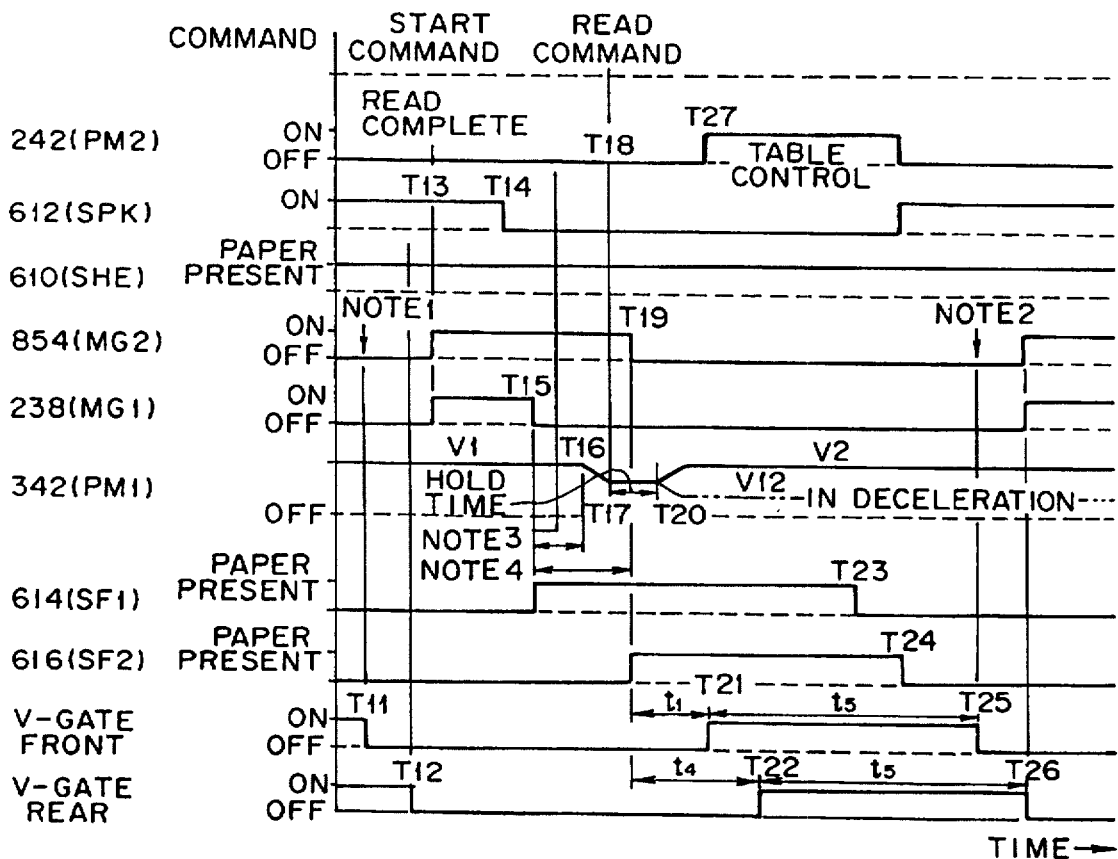

NOTE 1: FOR ONE FACE READING, READ COMPLETE IS RETURNED WHEN V-GATE IS TURNED OFF

NOTE 2: FOR ONE FACE READING, CLUTCH IS ENGAGED SIMULTANEOUSLY WITH TURNING OFF OF V-GATE

NOTE 3: AFTER PS1 PULSES AFTER PAPER LEADING END PASSES SF1, DECELERATION IS STARTED, & DECELERATION IS CONTINUED TO $V_{t2}$

NOTE 4: WHEN NO READ COMMAD IS RECEIVED WITHIN PS2 (>PS1) PULSES AFTER PAPER LEADING END PASSES SF1, TRANSPORTATION IS STOPPED TO WAIT READ COMMAND. WHEN READ COMMAND IS RECEIVED WITHIN THAT PERIOD, MOTOR IS ACCELERATED OR DECELERATED IN RESPONSE TO READING SPEED.

F I G. 65
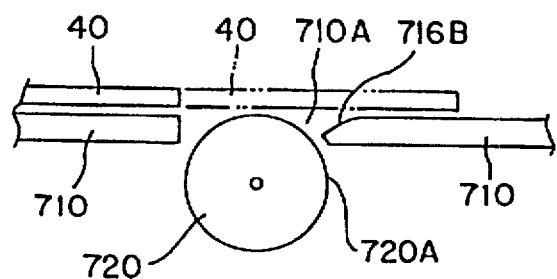
F I G. 66
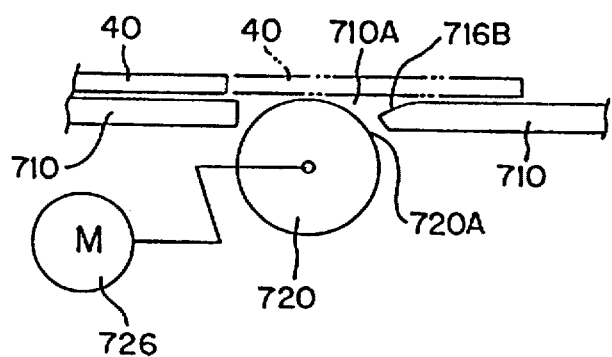

F I G. 73
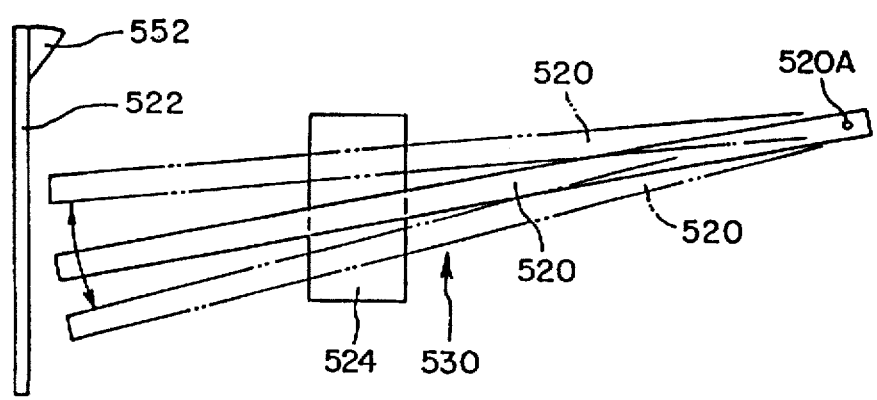

PAPER STACKING APPARATUS FOR IMAGE READING APPARATUS AND IMAGE READING APPARATUS WITH PAPER STACKING APPARATUS

This application is a continuation of application Ser. No. 08/407,472 filed Mar. 20, 1995, now abandoned.

BACKGROUND OF THE INVENTION

1. Field of the Invention

This invention relates to an image reading apparatus which can be suitably used as an image scanner and can be used also to read an image in an apparatus such as a facsimile apparatus, and more particularly to a paper stacking apparatus for an image reading apparatus of the type mentioned and an image reading apparatus with such paper stacking apparatus.

2. Description of the Related Art

In recent years, image reading apparatus such as image scanners have been and are being developed in order to input image information to a computer or a like apparatus. Image reading apparatus of the type mentioned include a paper stacking mechanism (paper stacking apparatus) for stacking paper sheets which have been, for example, transported by a paper transport mechanism and read by an image reading mechanism.

Such conventional image reading apparatus, however, have a subject to be solved in that the reading speed is not sufficiently high and the capacity for information (quantity of paper sheets) which can be read at a time is not sufficiently high. In order to solve the subject, not only it is an important subject to improve the performances of an image reading mechanism itself which is a principal portion of an image reading apparatus, but also it is another important subject to develop a mechanism which can stack a large amount of paper sheets, from which information has been read, in order and in correct posture.

In other words, if a paper sheet is not stacked with certainty by the paper stacking apparatus, then transportation and image reading of a next paper sheet may not be continued naturally.

SUMMARY OF THE INVENTION

It is an object of the present invention to provide a paper stacking apparatus for an image reading apparatus and an image reading apparatus with a paper stacking apparatus wherein paper sheets can be stacked appropriately to allow a large amount of paper sheets to be read rapidly at a time.

In order to attain the object described above, according to an aspect of the present invention, there is provided a paper stacking apparatus for an image reading apparatus for stacking a paper sheet discharged from a paper transport mechanism of the image reading apparatus along which an optical image reading mechanism is disposed, comprising a paper stacker including, at a bottom portion thereof, a stacker table for receiving thereon paper sheets discharged from the paper transport mechanism to stack the paper sheets, a paper stacker position variation mechanism for varying the position of the paper stacker, a paper discharge roller mechanism provided at a terminal end of the paper transport mechanism and having a projection extending into a paper transport path of the paper transport mechanism, and a paper trailing end guide mechanism disposed to extend into the paper stacker for guiding a trailing end of a paper sheet to be stacked into the paper stacker.

With the paper stacking apparatus for an image reading apparatus, since a paper sheet is guided by the paper discharge roller mechanism when it is discharged from the paper transport mechanism, it can be stacked smoothly into the paper stacker. Further, since the paper trailing end guide mechanism guides the trailing end of the paper sheet to be stacked into the paper stacker or since the position of the paper stacker is adjusted in accordance with the type of the paper, the number of paper sheets to be stacked or the like by way of the paper stacker position variation mechanism in advance, a predetermined amount of paper sheets are stacked in a predetermined posture on the paper stacker. Consequently, when information of a large number of paper sheets is read while they are successively transported at a high speed, the papers can be stacked suitably, which allows appropriate and smooth reading of images of the large amount of paper sheets at a high speed.

According to another aspect of the present invention, there is provided an image reading apparatus with a paper stacking apparatus, comprising a paper transport mechanism for successively transporting paper sheets set in position, an optical reading mechanism for optically reading information on a paper sheet being transported by the paper transport mechanism, and a paper stacker apparatus for stacking a paper sheet discharged from the paper transport mechanism, the paper stacker apparatus including a paper stacker including, at a bottom portion thereof, a stacker table for receiving thereon paper sheets discharged from the paper transport mechanism to stack the paper sheets, a paper stacker position variation mechanism for varying the position of the stacker table, a paper discharge roller mechanism provided at a terminal end of the paper transport mechanism and having a projection extending into a paper transport path of the paper transport mechanism, and a paper trailing end guide mechanism disposed to extend into the paper stacker for guiding a trailing end of a paper sheet being stacked into the paper stacker.

With the image reading apparatus with a paper stacking apparatus, even when information of a large number of paper sheets is read while they are successively transported at a high speed, the papers can be stacked suitably, which allows appropriate and smooth reading of images of the large amount of paper sheets at a high speed.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIG. 2 is a schematic perspective view showing the construction of a paper stacking apparatus according to the present invention;

FIGS. 16(A) and 16(B) are a plan view and a front elevational view, respectively, of a paper supply roller system of the paper supply mechanism of FIG. 14, FIG. 16(C) is a front elevational view showing only part of the paper supply roller system, and FIG. 16(D) is a side elevational view showing, in an enlarged scale, the paper supply roller system;

FIGS. 18(A) and 18(B) are a plan view (a view as viewed in the direction of an arrow mark A in FIG. 19) and an oblique front elevational view (a view as viewed in the direction of an arrow mark B in FIG. 19), respectively, showing a bearing system of the separation roller system shown in FIGS. 17(A) to 17(D);

FIGS. 26(A) and 26(B) are a plan view and a side elevational view, respectively, showing a sheet guide system of the paper transport system of the image reading apparatus of FIG. 4;

FIGS. 27(A), 27(B) and 27(C) are a plan view, a front elevational view and a side elevational view, respectively, showing the sheet guide system of the paper transport system of FIG. 4;

FIGS. 32(A) and 32(B) are a plan view and a front elevational view, respectively, showing a fluorescent lamp unit of the optical image reading mechanism of the image reading apparatus of FIG. 4;

FIG. 41 is a sequence diagram illustrating operation of a transport system of the image reading apparatus of FIG. 4 and particularly showing a transport starting sequence for a first paper sheet;

FIG. 42 is a similar view but particularly showing a transport starting sequence for a second or following paper sheet;

FIG. 65 is a schematic side elevational sectional view showing a yet further form of the backing element and adjacent member of the image reading apparatus of FIG. 4;

FIG. 66 is a schematic side elevational sectional view showing a yet further form of the backing element and adjacent member of the image reading apparatus of FIG. 4;

FIG. 73 is a schematic side elevational view showing another paper stacking mechanism according to the present invention;

DESCRIPTION OF THE PREFERRED EMBODIMENTS a. Aspect of the Invention

Figure 1:
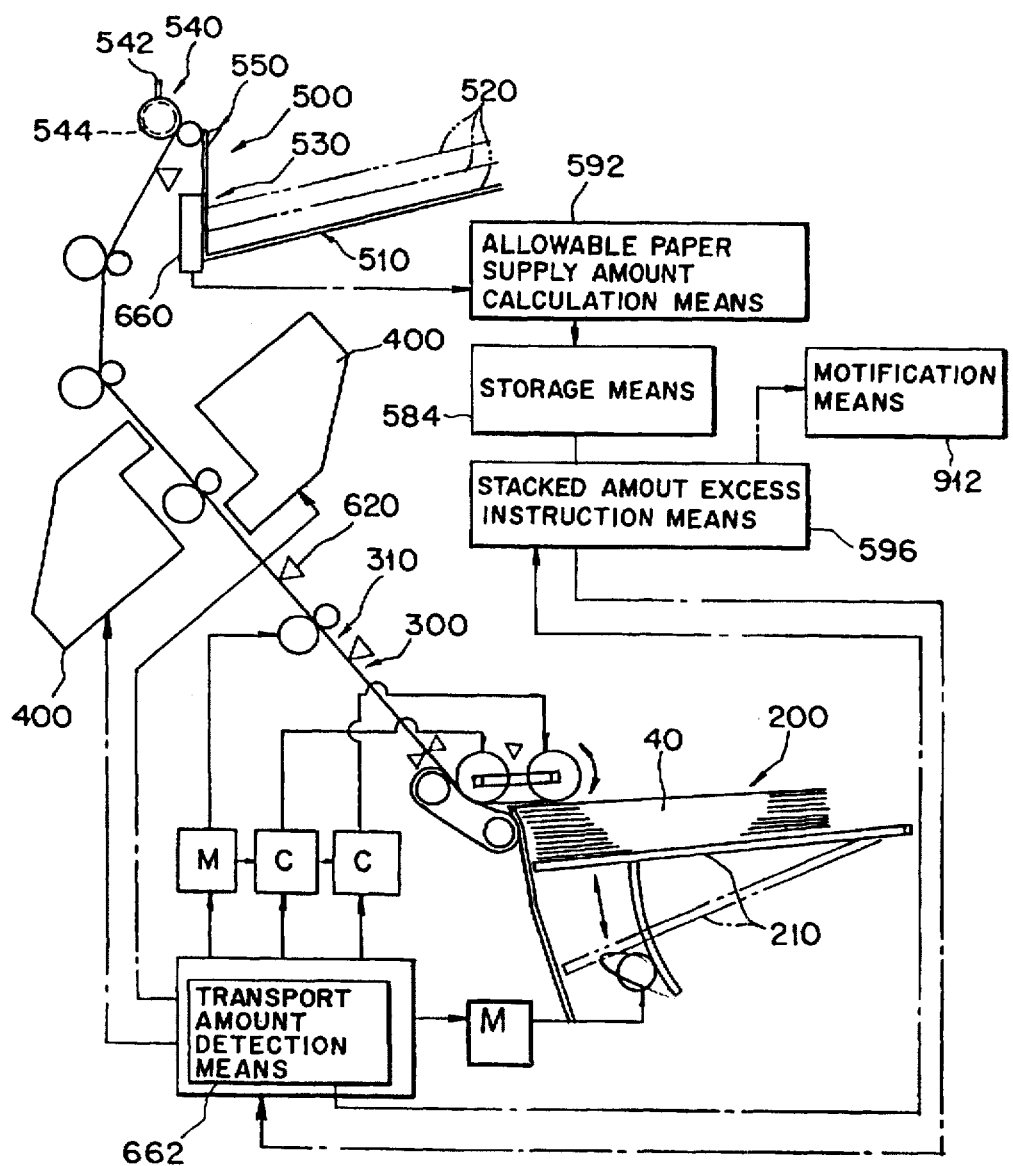
FIG. 1 is a diagrammatic view schematically showing, in side elevation, an arrangement of principal components of an image reading apparatus according to the present invention.
Figure 3:
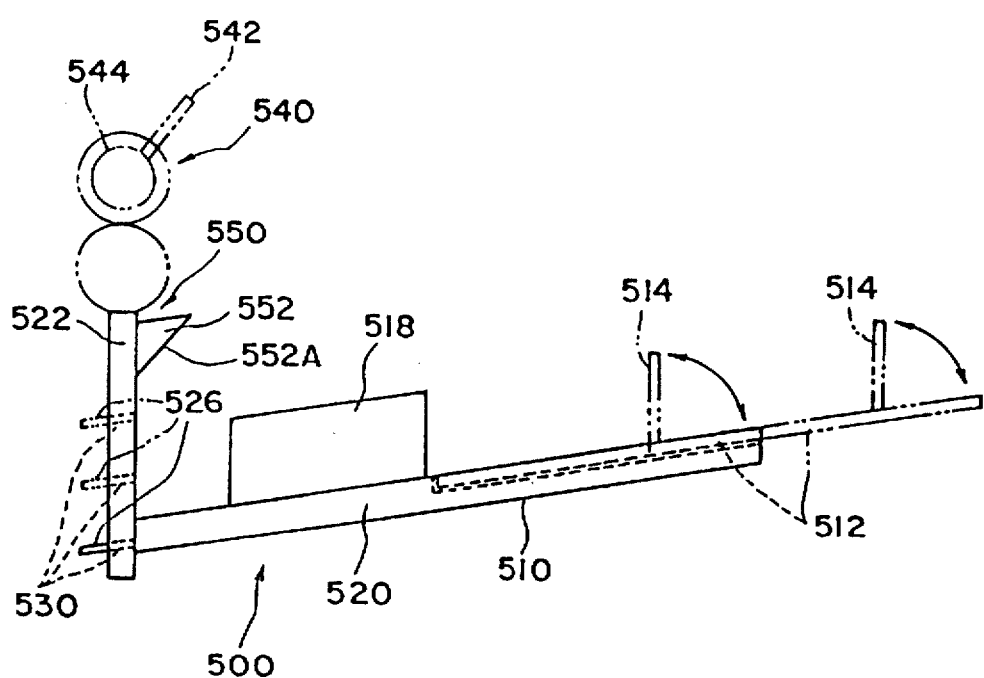
FIG. 3 is a schematic side elevational view showing the construction of the paper stacking apparatus of FIG. 2.

FIG. 1 shows principal components of an image reading apparatus in which a paper stacking apparatus according to the present invention is incorporated, and FIGS. 2 and 3 show the construction of the paper stacking mechanism. Referring to FIGS. 1 to 3, the paper stacking mechanism for an image reading apparatus is generally denoted at 500, and the image reading apparatus in which the paper stacking mechanism is incorporated includes, in addition to the paper stacking mechanism 500, a paper transport mechanism 300, and an optical image reading mechanism 400.

First, the paper stacking apparatus for an image reading apparatus according to the present invention will be described. The paper stacking apparatus includes a paper stacker 510 including, at a bottom portion thereof, a stacker table 520 for receiving paper sheets 40 thereon to stack the paper sheets 40, a paper stacker position variation mechanism 530 for varying the position of the paper stacker 510, a paper discharge roller mechanism 540 provided at a terminal end of the paper transport mechanism 300 and having a projection 542 extending into a paper transport path 310 of the paper transport mechanism 300, and a paper trailing end guide mechanism 550 disposed to extend into the paper stacker 510 for guiding the trailing end of a paper sheet 40 to be stacked into the paper stacker 510.

In the image reading apparatus, a paper sheet 40 from which an image has been optically read by the optical image reading apparatus 400 is discharged from the paper transport mechanism 300 into the paper stacking apparatus 500.

In the paper stacking apparatus 500, the paper sheet 40 is discharged thereto from the paper transport mechanism 300 by the paper discharge roller mechanism 540. In the paper discharge roller mechanism 540, the paper sheet 40 having been transported along the paper transport path 310 is guided, when it is discharged, by the projection 542 provided at the terminal end of the paper transport mechanism 300 so as to extend into the paper transport path 310 of the paper transport mechanism 300.

Further, in the paper stacking apparatus 500, the paper sheet 40 discharged from the paper transport mechanism 300 is received by the stacker table 520 at the bottom portion of the paper stacker 510 to stack such paper sheets 40. Further, with the paper stacker 510, where the position of it is adjusted in accordance with the type of the paper, the number of paper sheets to be stacked or the like by way of the paper stacker position variation mechanism 530 in advance, a predetermined amount of paper sheets are stacked in a predetermined posture on the paper stacker. Further, since the paper trailing end guide mechanism 550 guides, upon such stacking, the trailing end of the paper sheet 40 to be stacked into the paper stacker 510, the paper sheets are stacked in a predetermined posture also by such guiding operation.

Thus, with the paper stacking apparatus for an image reading apparatus described above, since a paper sheet is guided by the paper discharge roller mechanism when it is discharged from the paper transport mechanism, it can be stacked smoothly into the paper stacker. Further, since the paper trailing end guide mechanism guides the trailing end of the paper sheet to be stacked into the paper stacker or where the position of the paper stacker is adjusted in accordance with the type of the paper, the number of paper sheets to be stacked or the like by way of the paper stacker position variation mechanism, a predetermined amount of paper sheets are stacked in a predetermined posture on the paper stacker. Consequently, when information of a large number of paper sheets is read while they are successively transported at a high speed, the papers can be stacked suitably, which allows appropriate and smooth reading of images of the large amount of paper sheets a high speed.

Where the stacker table 520 is mounted for pivotal portion around an axis, the paper stacker position variation mechanism 530 may be constructed as a stacker table pivoting driving mechanism for driving the stacker table 520 to pivot around the axis. In this instance, the position of the stacker table 520 is adjusted by pivotal motion thereof around the axis by the stacker table pivoting driving mechanism serving as the paper stacker position variation mechanism. Accordingly, the position of the stacker table can be adjusted readily, and an appropriate position of the stacker table can be realized even where a large mount of paper sheets is handled. This facilitates appropriate and smooth reading of images of a large amount of paper sheets at a high speed.

The paper stacker position variation mechanism 530 may include a resilient member (not shown) for biasing the stacker table 520 against the weight of paper sheets 40 received on the stacker table 520. Where the resilient member is provided in the paper stacker position variation mechanism 530, when the weight of paper sheets 40 stacked on the stacker table 520 is low, the weight and the biasing force of the resilient member are balanced with each other in a condition wherein the biasing force is low, that is, the resilient deformation of the resilient member is small.

Accordingly, the stacker table 520 is held at a comparatively high position. Then, as the number of paper sheets 40 stacked on the stacker table 520 increases to increase the total weight of them, the biasing force, that is, the resilient deformation, of the resilient member increases so that the weight and the biasing force are balanced with each other. Consequently, the stacker table 520 is allowed to move down by the resilient deformation of the resilient member.

In this manner, the position (height) of the stacker table 520 is automatically adjusted by way of the resilient member such that the stacker table 520 can be lowered in response to the amount of stacked paper sheets 40. Thus, while a large number of paper sheets 40 are successively stacked, the height of the face by which a discharged paper sheet is received, that is, the height of the top face of the stacked paper sheets 40, can be held substantially at a fixed height suitable to stack the discharged paper sheet. Consequently, the paper sheet can be stacked in an appropriate postured in the paper stacker 510.

If the paper thickness is substantially fixed, then the position (height) of the stacker table 520 is adjusted automatically by way of the resilient member also in response to the size of paper sheets 40 stacked in the stacker table 520. In particular, even if a same number of paper sheets 40 are stacked, if the paper sheets 40 have a small size, then the stacker table 520 assumes a comparatively high position, but if the paper sheets 40 have a large size, then the stacker table 520 assumes a comparatively low position.

When the paper sheets 40 have a small size, if the stacker table 520 is at a higher position with respect to the paper discharging location, then a paper sheet 40 discharged does not likely dance while it drops to the stacker table 520, and consequently, the paper sheet 40 will likely be stacked regularly without being displaced from a position on the stacker table 520 at which it should be stacked. In contrast, when the paper sheets 40 have a large size, if the stacker table 520 is at a lower position with respect to the paper discharging location, then a paper sheet 40 discharged is not likely acted upon by a frictional resistance or the like from the top face of the stacker table 520, and consequently, the paper sheet 40 will likely be stacked regularly without being displaced from a position on the stacker table 520 at which it should be stacked.

Accordingly, the position of the stacker table can be adjusted automatically, and an appropriate position of the stacker table can be realized in response to the stacked amount or the size of paper sheets or the like. This facilitates appropriate and smooth reading of images at a high speed.

The stacker table 520 may partially be movable by the resilient member. Where the stacker table 520 is partially movable by the resilient member, when the weight of stacked paper sheets 40 is low, the paper sheets 40 are received by the portion of the stacker table 520 which is movable by way of the resilient member, but as the weight of stacked paper sheets 40 increases, the portion of the stacker table 520 is moved down to the same level as that of the remaining portion of the stacker table 520 which is not movable so that the paper sheets 40 can be received by the entire upper face of the stacker table 520. Accordingly, the position of the stacker table can be adjusted automatically, and an appropriate position of the stacker table can be realized in response to the stacked amount or the size of paper sheets or the like. Besides, a large amount of paper sheets can be handled. This facilitates appropriate and smooth reading of images at a high speed.

The paper stacking apparatus for an image reading apparatus may be constructed such that the paper stacker position variation mechanism 530 is constructed so as to allow the position of the paper stacker 510 thereof to be adjusted in advance, and that it further includes paper stacker position detection means 660 for detecting the position of the paper stacker 510 adjusted in advance, allowable paper supply amount calculation means 592 for calculating an allowable paper supply amount based on the position of the paper stacker 510 detected by the paper stacker position detection means 660, storage means 584 for storing the allowable paper supply amount calculated by the allowable paper supply amount calculation means 592, transport amount detection means 662 for detecting an amount of paper sheets transported by the paper transport mechanism 300, stacked amount excess instruction means 596 for detecting whether or not the amount detected by the transport amount detection means 662 exceeds the allowable paper supply amount stored in the storage means 584, and notification means 912 for notifying, when the stacked amount excess instruction means 596 detects that the amount detected by the transport amount detection means 662 exceeds the allowable paper supply amount stored in the storage means 584, such excess. In the paper stacking apparatus for an image reading apparatus of the construction just described, if the position of the paper stacker 510 is adjusted in advance by way of the paper stacker position variation mechanism 530, then the paper stacker position detection means 660 detects the position of the paper stacker 510 thus adjusted in advance, and the storage means 584 stores an allowable paper supply amount calculated by the allowable paper amount calculation means 592 in response to a result of detection of the paper stacker position detection means 660. The transport amount detection means 662 detects, as a paper sheet 40 is transported, an amount of thus transported paper sheets 40, and the notification means 912 notifies, when a detection amount detected by the transport amount detection means 662 exceeds the allowable paper supply amount stored in the storage means 584, such excess. Accordingly, a limit to the amount of paper sheets to be stacked on the paper stacker can be recognized, and such a situation that paper sheets flow out from the paper stacker can be prevented.

The paper stacking apparatus for an image reading apparatus may alternatively be constructed such that the paper stacker position variation mechanism 530 is constructed so as to allow the position of the paper stacker 510 thereof to be adjusted in advance and a paper supply hopper 210 provided in a paper supply mechanism 200 of the image reading apparatus for accommodating paper sheets 40 therein is constructed for movement to a position corresponding to the amount of paper sheets 40 accommodated in the paper supply hopper 210, and that it further comprises paper stacker position detection means 660 for detecting the position of the paper stacker 510 adjusted in advance, storage means (not shown) for storing an allowable vertical movement amount of the paper supply hopper 210 calculated based on the position of the paper stacker 510 detected by the paper stacker position detection means 660, hopper vertical movement amount detection means (not shown) for detecting a vertical movement amount of the paper supply hopper 210, and notification means (not shown) for notifying, when the vertical movement amount detected by the hopper vertical movement amount detection means exceeds the allowable vertical movement amount stored in the storage means, such excess. In the paper stacking apparatus for an image reading apparatus of the construction just described, if the position of the paper stacker 510 is adjusted by way of the paper stacker position variation mechanism 530 in advance, then the position of the paper stacker 510 thus adjusted in advance is detected by the paper stacker position detection means 660, and the storage means stores an allowable vertical movement amount of the paper supply hopper 210 calculated based on a result of detection of the paper stacker position detection means 660. The paper supply hopper 210 provided in the paper supply mechanism 200 for accommodating paper sheets 40 therein is moved in a vertical direction in response to the amount of paper sheets 40 accommodated therein, and the hopper vertical movement amount detection means detects the amount of such vertical movement of the paper supply hopper 210. The notification means notifies, when the vertical movement amount detected by the hopper vertical movement amount detection means exceeds the allowable vertical movement amount stored in the storage means, such excess. Accordingly, a limit to the amount of paper sheets to be stacked on the paper stacker can be recognized appropriately in response to the cumulative thickness or amount of paper sheets supplied, and such a situation that paper sheets flow out from the paper stacker can be prevented.

Or, the paper stacking apparatus for an image reading apparatus may further comprise paper stacker position detection means 660 for detecting the position of the paper stacker 510, transport amount detection means 662 for detecting an amount of paper sheets 40 transported by the paper transport mechanism 300, and stacker position control means (not shown) for controlling the paper stacker position variation mechanism 530 to adjust the position of the paper stacker 510 in response to the position detected by the paper stacker position detection means 660 and the amount detected by the transport amount detection means 662. In the paper stacking apparatus for an image reading apparatus of the construction just described, the paper stacker position detection means 660 detects the position of the paper stacker 510, and the transport amount detection means 662 detects an amount of paper sheets 40 transported by the paper transport mechanism 300. Then, the stacker position control means controls the paper stacker position variation mechanism 530 to adjust the position of the paper stacker 510 in response to the position detected by the paper stacker position detection means 660 and the amount detected by the transport amount detection means 662. Accordingly, the position of the paper stacker can be adjusted in accordance with the amount of stacked paper sheets, and whether the amount of paper sheets is small or great, paper sheets can be stacked in an appropriate posture onto the paper stacker without giving rise to such a situation that paper sheets flow out from the paper stacker. This facilitates appropriate and smooth reading of images of a large amount of paper sheets at a high speed.

Or else, the paper stacking apparatus for an image reading apparatus may further comprise paper stacker position detection means 660 for detecting the position of the paper stacker 510, transport amount detection means 662 for detecting an amount of paper sheets 40 transported by the paper transport mechanism 300, paper size detection means 620 for detecting the size of a paper sheet 40 transported by the paper transport mechanism 300, paper thickness detection means (not shown) for detecting the thickness of a paper sheet 40 transported by the paper transport mechanism 300, and stacker position control means (not shown) for controlling the paper stacker position variation mechanism 530 to adjust the position of the paper stacker 510 in response to results of detection of the paper stacker position detection means 660, the transport amount detection means 662, the paper size detection means 620 and the paper thickness detection means so as to correspond to the transported paper amount, the paper size and the paper thickness. In the paper stacking apparatus for an image reading apparatus of the construction just described, the paper stacker position detection means 660 detects the position of the paper stacker 510; the transport amount detection means 662 detects an amount of paper sheets 40 transported by the paper transport mechanism 300; the paper size detection means 620 detects the size of a paper sheet 40 transported by the paper transport mechanism 300; and the paper thickness detection means detects the thickness of the paper sheet 40 transported by the paper transport mechanism 300. The stacker position control means controls the paper stacker position variation mechanism 530 to adjust the position of the paper stacker 510 in response to results of detection of the paper stacker position detection means 660, the transport amount detection means 662, the paper size detection means 620 and the paper thickness detection means so as to correspond to the transported paper amount, the paper size and the paper thickness. Consequently, the position of the paper stacker can always be adjusted to an optimum position taking the paper size and the paper thickness into consideration, and whether the amount of paper sheets is small or great or whether the size of paper sheets is small or large, paper sheets can be stacked in an appropriate posture into the paper stacker without giving rise to such a situation that paper sheets flow out from the paper stacker. This facilitates appropriate and smooth reading of images of a large amount of paper sheets at a high speed.

Otherwise, the paper stacking apparatus for an image reading apparatus may further comprise interlocking means (not shown) for operating the paper stacker position variation mechanism 530 in an interlocking relationship with the paper supply position adjusting operation of the paper supply mechanism 200 for supplying a paper sheet 40 to the paper transport mechanism 300. In the paper stacking apparatus for an image reading apparatus of the construction just described, the interlocking means operates the paper stacker position variation mechanism 530 in an interlocking relationship with the paper supply position adjusting operation of the paper supply mechanism 200 for supplying a paper sheet 40 to the paper transport mechanism 300. Consequently, the position of the paper stacker can always be adjusted to an optimum position in response to a cumulative thickness or amount of paper sheets supplied from the paper supply mechanism, and whether the amount of paper sheets is small or great or whether the size of paper sheets is small or large, paper sheets can be stacked in an appropriate posture into the paper stacker without giving rise to such a situation that paper sheets flow out from the paper stacker. This facilitates appropriate and smooth reading of images of a large amount of paper sheets at a high speed.

In this instance, the paper stacking apparatus for an image reading apparatus may further comprise interlocking inhibition means (not shown) for inhibiting, when a paper manual insertion mode is selected, the operation of the paper stacker position variation mechanism 530 interlocked with the paper supply position adjusting operation of the paper supply mechanism 200. In the paper stacking apparatus for an image reading apparatus of the construction just described, when a manual paper insertion mode is selected, the interlocking inhibition means inhibits the operation of the paper stacker position variation mechanism 530 interlocked with the paper supply position adjusting operation of the paper supply mechanism 200. Accordingly, when a manual paper insertion mode is selected, the paper stacker is adjusted to an optimum position, and a paper manually inserted can be read smoothly.

Or, the amount of operation of the stacker position variation mechanism 530 may be set greater than the amount of operation by which the paper supply position of the paper supply mechanism 200 is to be adjusted. Where the amount of operation of the stacker position variation mechanism is set in this manner, the position of the paper stacker 510 is adjusted including an increase in overall thickness of paper sheets in the paper stacker 510 which is caused by air left, when a paper sheet is stacked, between the paper sheet and an adjacent paper sheet. Accordingly, the position of the paper stacker can always be adjusted to an optimum position while taking an increase in thickness of paper sheets, which is caused by air left, when a paper sheet is stacked, between the paper sheet and an adjacent paper sheet into consideration, and paper sheets can be stacked in an appropriate posture into the paper stacker in response to the amount of stacked paper sheets without giving rise to such a situation that paper sheets flow out from the paper stacker. This facilitates appropriate and smooth reading of images of a large amount of paper sheets at a high speed.

The stacker table 520 may include a slide element 512 mounted for sliding movement in the paper discharging direction, and a paper stopper 514 mounted on the slide element 512 for movement between a position in which the paper stopper 514 stands upwardly on the slide element 512 and another position in which the paper stopper 514 lies on the slide element 512. Where the stacker table 520 includes the slide element 512 and the paper stopper 514, the position of the paper stopper 514 is adjusted by adjusting the position of the slide element 512 mounted for sliding movement in the paper discharging direction, and when the paper stopper 514 stands upwardly, it restricts movement of paper sheets in the paper discharging direction in the paper stacker 510. On the other hand, where paper sheets used have a large size in the paper discharging direction and the paper stopper 514 makes an obstacle to stacking of the paper sheets, the paper stopper 514 is laid down onto the slide element 512 to allow the paper sheets to be received on the slide element 512. Accordingly, movement of paper sheets in the paper discharging direction in the paper stacker is restricted by the paper stopper so that a paper sheet can be stacked in an appropriate posture onto the paper stacker, which facilitates appropriate and smooth reading of images of a large amount of paper sheets at a high speed. On the other hand, paper sheets of a large size can be received on the paper stacker by laying down the paper stopper. Consequently, variations of the size of a paper sheet to be read can be increased.

Or, the stacker table 520 may include a slide element 516 mounted for sliding movement in a widthwise direction of a paper sheet, and a paper stopper 518 mounted on the slide element 516 for movement between a position in which the paper stopper 518 stands upwardly on the slide element 516 and another position in which the paper stopper 518 lies on the slide element 516. In the paper stacking apparatus of the construction just described, by adjusting the position of the slide element 516 mounted for sliding movement in a widthwise direction of a paper sheet, the position of the paper stopper 518 is adjusted, and when the paper stopper 518 is in its position in which it stands upwardly on the slide element 516, it restricts movement of paper sheets in their widthwise direction in the paper stacker 510. On the other hand, where paper sheets used have a large width and the paper stopper 518 makes an obstacle to stacking of the paper sheets, the paper stopper 514 is laid down onto the slide element 516 to allow the paper sheets to be received on the slide element 516. Accordingly, movement of paper sheets in their widthwise direction in the paper stacker is restricted by the paper stopper so that a paper sheet can be stacked in an appropriate posture onto the paper stacker, which facilitates appropriate and smooth reading of images of a large amount of paper sheets at a high speed. On the other hand, paper sheets of a large size can be received on the paper stacker by laying down the paper stopper. Consequently, variations of the size of a paper sheet to be read can be increased.

The paper discharge roller mechanism 540 may include a paper discharge roller 544 having a projection 542 provided thereon such that the projection 542 extends into the paper transport path 310 but can be accommodated into the paper discharge roller 544. In the paper stacking apparatus of the construction just described, the paper discharge roller 544 of the paper discharge roller mechanism 540 is rotated such that the projection 542 extends into the paper transport path 310 to guide a paper sheet 40 to be discharged from the paper transport path 310. Further, since the projection 542 can be accommodated into the paper discharge roller 544, it will not interfere with another roller or some other member opposed to the paper discharge roller 544. Accordingly, a paper sheet can be discharged from the paper transport path into the paper stacker under the guidance of the projection of the paper discharge roller which does not disturb the transportation of the paper. Consequently, the paper sheet can be stacked in an appropriate posture into the paper stacker, and this facilitates appropriate and smooth reading of images of a large amount of paper sheets at a high speed.

The paper trailing end guide mechanism 550 may include a pair of paper trailing end guide members 552 disposed in a spaced relationship from each other in a widthwise direction of a paper sheet and directed toward the paper stacker 510 for guiding a trailing end of a paper sheet 40 to be stacked into the paper stacker 510. In the paper stacking apparatus of the construction just described, the pair of paper trailing end guide members 552 of the paper trailing end guide mechanism 550 disposed in a spaced relationship from each other in a widthwise direction of a paper sheet guide a trailing end of a paper sheet 40 to be stacked into the paper stacker 510. Accordingly, the paper sheet can be stacked in an appropriate posture into the paper stacker with the trailing end thereof guided by the paper trailing end guide members, and this facilitates appropriate and smooth reading of images of a large amount of paper sheets at a high speed.

Now, the image reading apparatus with a paper stacking apparatus according to the present invention will be described more specifically. Referring again to FIGS. 1 to 3, the image reading apparatus includes a paper transport mechanism 300 for successively transporting paper sheets 40 set in position, an optical reading mechanism 400 for optically reading information on a paper sheet 40 being transported by the paper transport mechanism 300, and a paper stacker apparatus 500 for stacking a paper sheet 40 discharged from the paper transport mechanism 300.

The paper stacker apparatus 500 includes a paper stacker 510 including, at a bottom portion thereof, a stacker table 520 for receiving thereon paper sheets 40 discharged from the paper transport mechanism 300 to stack the paper sheets 40, a paper stacker position variation mechanism 530 for varying the position of the stacker table 510, a paper discharge roller mechanism 540 provided at a terminal end of the paper transport mechanism 300 and having a projection 542 extending into a paper transport path 310 of the paper transport mechanism 300, and a paper trailing end guide mechanism 550 disposed to extend into the paper stacker 510 for guiding a trailing end of a paper sheet 40 being stacked into the paper stacker 510.

In the image reading apparatus with a paper stacking apparatus, a paper sheet 40 from which an image has been optically read by the optical image reading mechanism 400 is discharged from the paper transport mechanism 300 into the paper stacking apparatus 500.

In the paper stacker apparatus 500, the paper stacker 510 receives the paper sheet 40 discharged from the paper transport mechanism 300 by the paper discharge roller mechanism 540. When the paper sheet 40 transported along the paper transport path 310 of the paper transport mechanism 300 is discharged, it is guided by the projection 542 of the paper discharge roller mechanism 540 provided at the terminal end of the paper transport mechanism 300 so as to extend into a paper transport path 310 of the paper transport mechanism 300.

Then, in the paper stacking apparatus, the paper sheet 40 discharged is received by the stacker table 520 at the bottom portion of the paper stacker 510 to stack paper sheets 40. In this instance, in the paper stacker 510, by adjusting the position of the paper stacker 510 in accordance with the type, the amount and so forth of stacked paper sheets by way of the paper stacker position variation mechanism 530 in advance, a predetermined amount of paper sheets is stacked in an appropriate posture. Further, upon such stacking, since the paper trailing end guide mechanism 550 guides the trailing end of a paper sheet 40 being stacked into the paper stacker 510, the paper sheet is stacked in an appropriate posture also by such guidance.

With the image reading apparatus with a paper stacking apparatus, also when a large number of paper sheets are read while they are successively transported at a high speed, they can be stacked appropriately, and this facilitates appropriate and smooth reading of images of a large amount of paper sheets at a high speed.

b. Embodiments of the Invention

An image reading apparatus according to a preferred embodiment of the present invention will be described in detail below with reference to the accompanying drawings.

1. General Construction of the Image Reading Apparatus

Referring first to FIGS. 4 to 7, there is shown an image reading apparatus according to a preferred embodiment of the present invention. The general structure of the image reading apparatus shown can be divided into an apparatus body 10 and an apparatus lid unit 20. The apparatus lid unit 20 is mounted for pivotal motion around a fulcrum 32 to open or close the apparatus body 10. When the image reading apparatus is used, the apparatus lid unit 20 is fixed to such a closing condition as indicated by solid lines in FIGS. 4 to 6 by a body-lid unit locking mechanism 30.

Various other components of the image reading apparatus are mounted on the apparatus body 10 and the apparatus lid unit 20.

Figure 4:
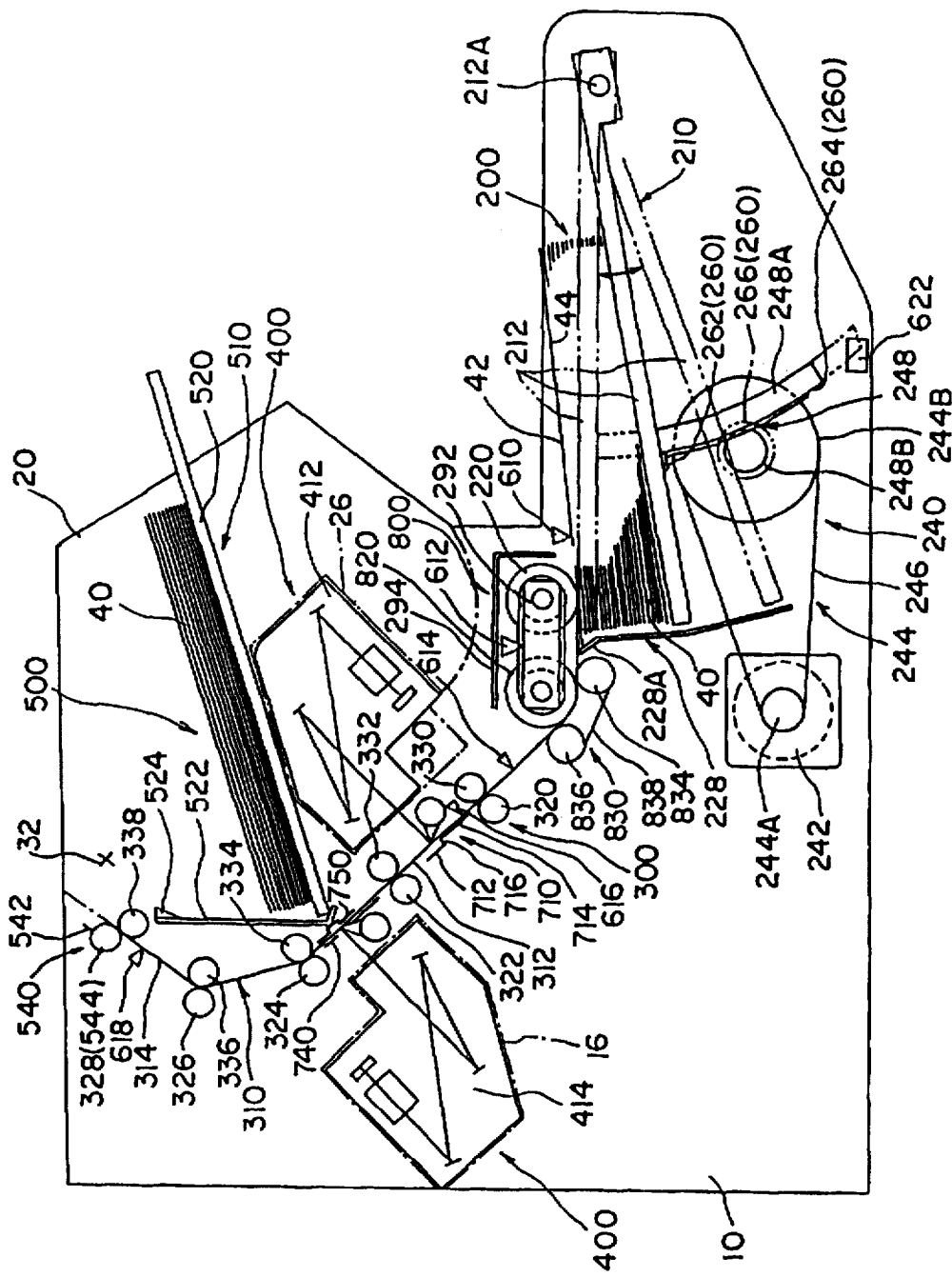
FIG. 4 is a schematic side elevational sectional view of an image reading apparatus showing a preferred embodiment of the present invention.
Figure 7:
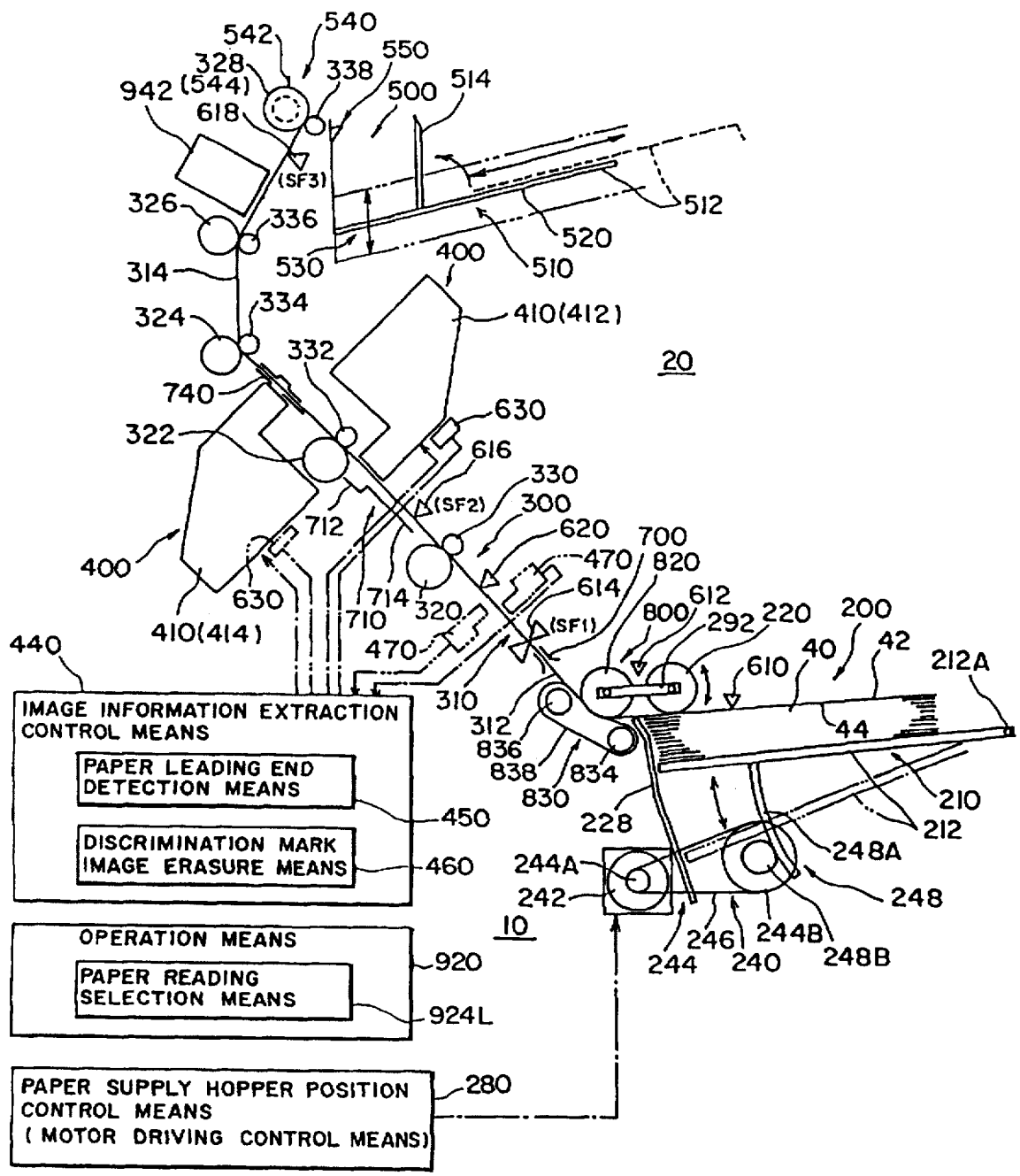
FIG. 7 is a diagrammatic view schematically showing, in side elevation, an arrangement of principal components of the image reading apparatus of FIG. 4.

Referring to FIGS. 4 and 7, the image reading apparatus includes, as components thereof, a paper supply mechanism 200 which can successively supply paper sheets 40 accommodated therein, a paper transport mechanism 300 for transporting a paper sheet 40 supplied from the paper supply mechanism 200, an optical image reading mechanism 400 for optically reading information on a paper sheet 40 being transported by the paper transport mechanism 300, and a paper stacking mechanism 500 for receiving a paper sheet 40 discharged from the paper transport mechanism 300 to stack such paper sheets 40.

The paper supply mechanism 200 includes a paper supply hopper 210 which can accommodate therein paper sheets 40 to be read, a paper supply roller 220 located above the paper supply hopper 210 for supplying one of paper sheets 40 accommodated in the paper supply hopper 210 toward the paper transport mechanism 300 which will be hereinafter described, a paper supply roller driving mechanism 230 for driving the paper supply roller 220 to rotate, a paper supply hopper driving mechanism 240 for driving the paper supply hopper 210 to an inclined position in response to the amount of paper sheets 40 accommodated in the paper supply hopper 210, and a paper separation mechanism 800 for preventing two or more paper sheets supplied by the paper supply roller 220 from being fed to the paper transport mechanism 300.

Figure 5:
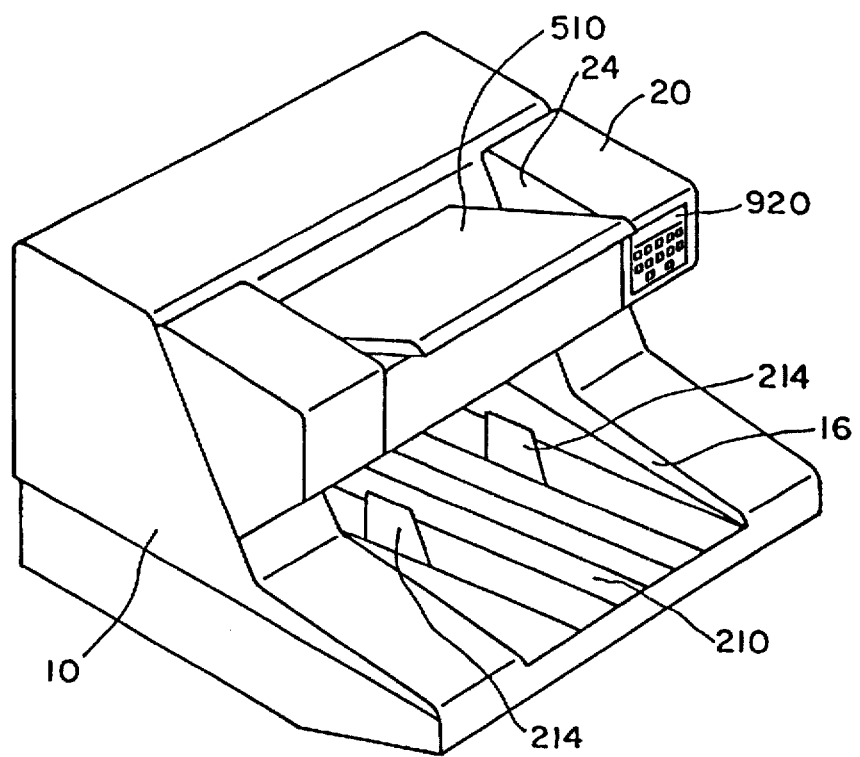
FIG. 5 is a perspective view showing an outer profile of the image reading apparatus of FIG. 4.
Figure 6:
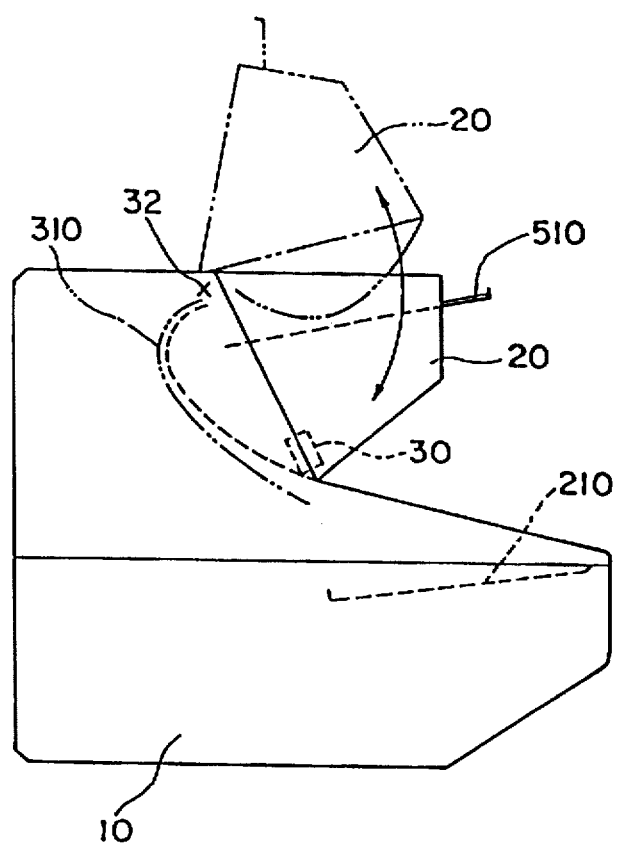
FIG. 6 is a schematic side elevational view showing an outer profile of the image reading apparatus of FIG. 4.

The paper supply hopper 210 includes a hopper table 212 supported for pivotal motion on a rotatable shaft 212A located at a rear end portion (right end portion in FIGS. 4 and 7) of the image reading apparatus. The hopper table 212 is driven at an end portion (left end portion in FIGS. 4 and 7) thereof by a rack-and-pinion mechanism 248 of the paper supply hopper driving mechanism 240 so that it is pivoted upwardly and downwardly and adjusted to a predetermined inclined position. The hopper table 212 includes, as shown in FIG. 5, a pair of tiltable paper edge guide members 214 for guiding the opposite side edges of the paper sheets 40 accommodated in the paper supply hopper 210.

The paper supply hopper driving mechanism 240 includes, as a driving source, a hopper motor 242 constituted from a stepper motor. The driving force of the hopper motor 242 is transmitted to the rack-and-pinion mechanism 248 by way of a belt-and-pulley mechanism 244.

Meanwhile, the paper supply roller 220 is supported for rocking motion around an axis of a separation roller 820, which will be hereinafter described, by way of a rockable arm 292 such that it can be retracted upwardly from a space above the paper supply hopper 210. Particularly, here, a rocking arm position control member not shown which can contact with the rockable arm 292 so as to define an uppermost position of the paper supply roller 220 is provided. The rocking arm position control member is projected, for example, when the paper supply hopper 210 is moved down to its lowermost or bottom position, to restrict the rockable arm 292, but when the image reading apparatus is started, the rocking arm position control member is retracted to cancel the restriction of the rockable arm 292.

Thus, a paper supply roller retraction mechanism 270 is constituted from the rocking structure for the rockable arm 292 and the rocking arm position control member described above.

When it is tried to accommodate paper sheets 40 into the paper supply hopper 210, the paper supply roller 220 is automatically retracted upwardly from the space above the paper supply hopper 210 by the paper supply roller retraction mechanism 270 to facilitate such accommodation of paper sheets.

On the other hand, when the image reading apparatus is operative, unless the paper supply roller 220 is artificially retracted upwardly, the paper supply roller 220 is normally at a position suitably moved down by the weight of the paper supply roller 220 itself or by means of a spring not shown. Then, when the paper supply hopper 210 is pivoted, the paper supply roller 220 is moved upwardly by a required amount in response to the position of the upper face of the paper sheets 40 accommodated in the hopper table 212 which is moved upwardly or downwardly by pivotal motion of the paper supply hopper 210.

Referring now to FIGS. 4 and 7 to 9, the paper supply roller driving mechanism 230 for driving the paper supply roller 220 to rotate includes, as a driving source, a transport motor 342 constituted from a stepper motor. The paper supply roller driving mechanism 230 further includes a first belt-and-pulley mechanism 344 and first to third gear mechanisms 852, 856 and 232 interposed between the transport motor 342 and the paper supply roller 220. A pick clutch 238 constituted from an electromagnetic clutch is provided at an inputting portion of the driving force to the paper supply roller 220 from the third gear mechanism 232.

The paper supply roller driving mechanism 230 is controlled by paper supply roller driving mechanism control means 250 in response to the paper supplying position (hopper paper supplying position) of the paper supply hopper 210. More particularly, the paper supply roller driving mechanism control means 250 controls the pick clutch 238 between on and off states to control operation of the paper supply roller driving mechanism 230, that is, the rotation condition of the paper supply roller 220.

The paper separation mechanism 800 includes a separation roller 820, a rotation member 830 disposed in an opposing relationship to the separation roller 820, and a separation roller driving mechanism 850 for driving the separation roller 820 to rotate.

The rotation member 830 is located below the separation roller 820 and includes a pair of pulleys 834 and 836 disposed in a spaced relationship from each other in the paper transporting direction and an endless belt 838 wound between and around the pulleys 834 and 836.

The separation roller driving mechanism 850 is constituted from components substantially common to those of the paper supply roller driving mechanism 230 described hereinabove. In particular, as shown in FIGS. 4 and 7 to 9, the separation roller driving mechanism 850 includes the transport motor 342 described hereinabove as a driving source and further includes the first belt-and-pulley mechanism 344 and the first and second gear mechanisms 852 and 856 interposed between the transport motor 342 and the paper supply roller 220. A separation clutch 854 constituted from an electromagnetic clutch is interposed in the first gear mechanism 852. In short, the paper supply roller driving mechanism 230 has a construction wherein the third gear mechanism 232 is provided in addition to the separation roller driving mechanism 850. It is to be noted that operation of the separation clutch 854 is controlled by separation clutch control means 858.

Meanwhile, the paper transport mechanism 300 includes a paper transport path 310 for transporting a paper sheet 40 supplied thereto from the paper supply mechanism 200, a plurality of paper transporting rollers 320 to 328 disposed along the paper transport path 310, a roller driving mechanism 340 for driving the paper transporting rollers 320 to 328, and roller driving mechanism control means 350 for controlling the roller driving mechanism 340. Idler rollers 330 to 338 are provided corresponding to the paper transporting rollers 320 to 328, respectively.

The paper transport path 310 includes an inclined transport path 312 for transporting a paper sheet 40 supplied thereto from the paper supply mechanism 200 in an inclined condition, and a paper reversing transport path 314 provided contiguously to the inclined transport path 312 for reversing the paper sheet 40 transported by the inclined transport path 312.

Due to the construction of the paper transport path 310, the posture of a paper sheet 40 supplied from the paper supply hopper 210 is changed first from a substantially horizontal posture in the paper supply hopper 210 to a rearwardly inclined posture in the inclined transport path 312 and is then reversed by the paper reversing transport path 314, and then, in this posture, the paper sheet 40 is discharged to the paper stacking mechanism 500.

Consequently, a paper sheet which is directed upwardly in the paper supply hopper 210 is directed downwardly in the paper stacking mechanism 500, and the paper sheets 40 accommodated one on another in the paper supply hopper 210 are successively stacked into the paper stacking mechanism 500 without changing the order of them.

Meanwhile, the paper transporting rollers 320 to 328 and the idler rollers 330 to 338 are disposed in a condition distributed discretely at a distance smaller than the length of the paper sheets 40 in the transporting direction as seen from FIGS. 4 and 7 to 9.

The roller driving mechanism 340 includes the transport motor 342 described above as a driving source and further includes a second belt-and-pulley mechanism 348 in addition to the first belt-and-pulley mechanism 344. The first and second belt-and-pulley mechanisms 344 and 348 will be described here. The first belt-and-pulley mechanism 344 includes a pulley 344A mounted on a rotary shaft of the transport motor 342, another pulley 344B mounted on a rotary shaft 320A of the paper transporting roller 320, and a belt 346A wound between and around the pulleys 344A and 344B. The second belt-and-pulley mechanism 348 includes pulleys 320B to 328B mounted on the rotary shafts 320A to 328A of the paper transporting rollers 320 to 328, and a belt 346B wound between and around the pulleys 320B to 328B.

Accordingly, when the transport motor 342 operates, the driving force is transmitted from the rotary shaft of the transport motor 342 to the pulley 344B by way of the pulley 344A and the belt 346A so that the rotary shaft 320A of the paper transporting roller 320 is driven to rotate. Further, from the pulley 320B, the rotary shafts 322A to 328A of the other paper transporting rollers 322 to 328 are driven to rotate by way of the belt 346A and the pulleys 322B to 328B so that the paper transporting rollers 320 to 328 are driven to rotate simultaneously. It is to be noted that reference numeral 360 denotes a tension pulley which applies a suitable tensile force to the belt 346A so that the driving force may be transmitted with certainty between the belt 346A and the pulleys 320B to 328B.

Figure 9:
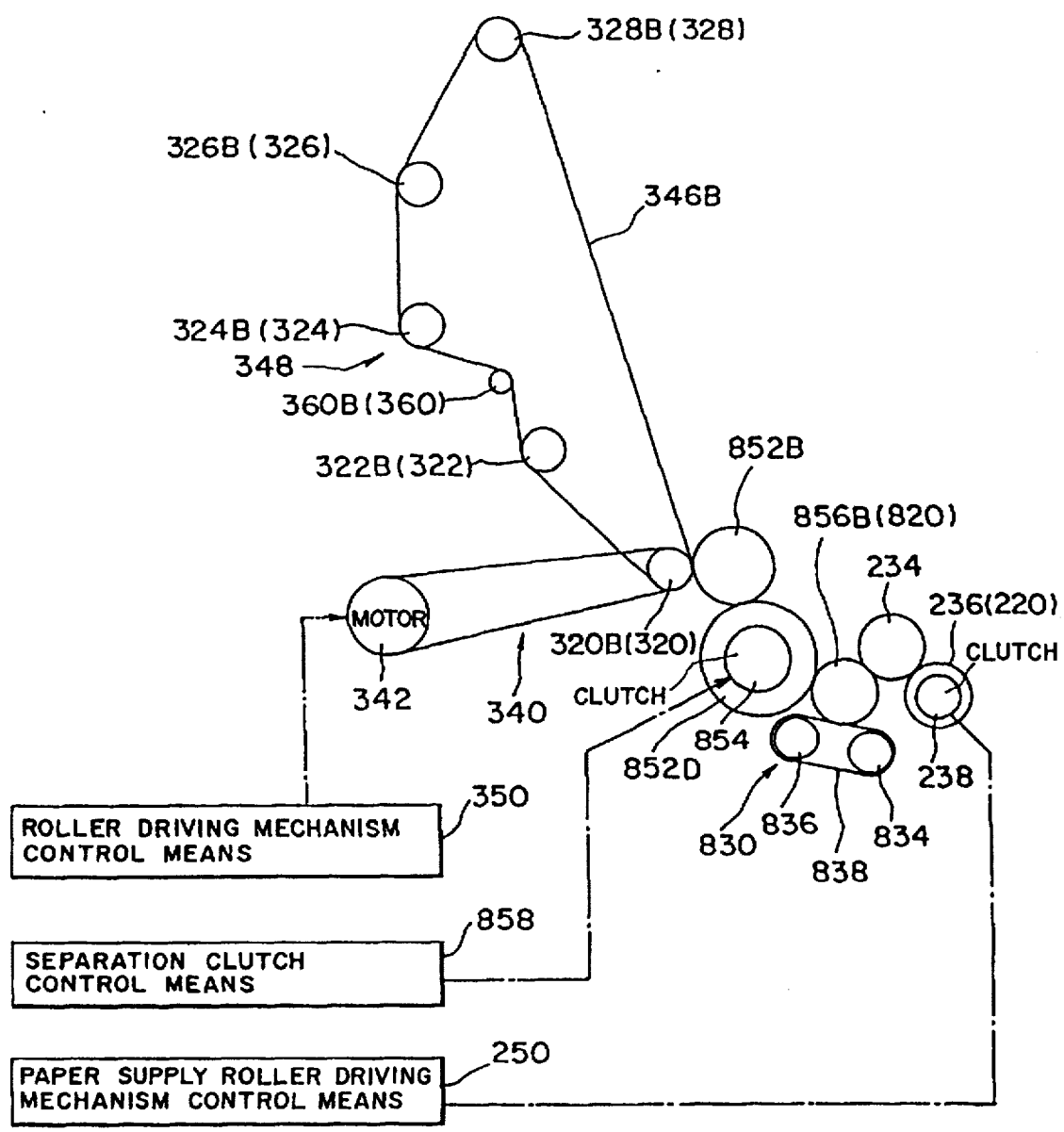
FIG. 9 is a diagrammatic view schematically showing, in side elevation, the driving system shown in FIG. 8.
Figure 10:
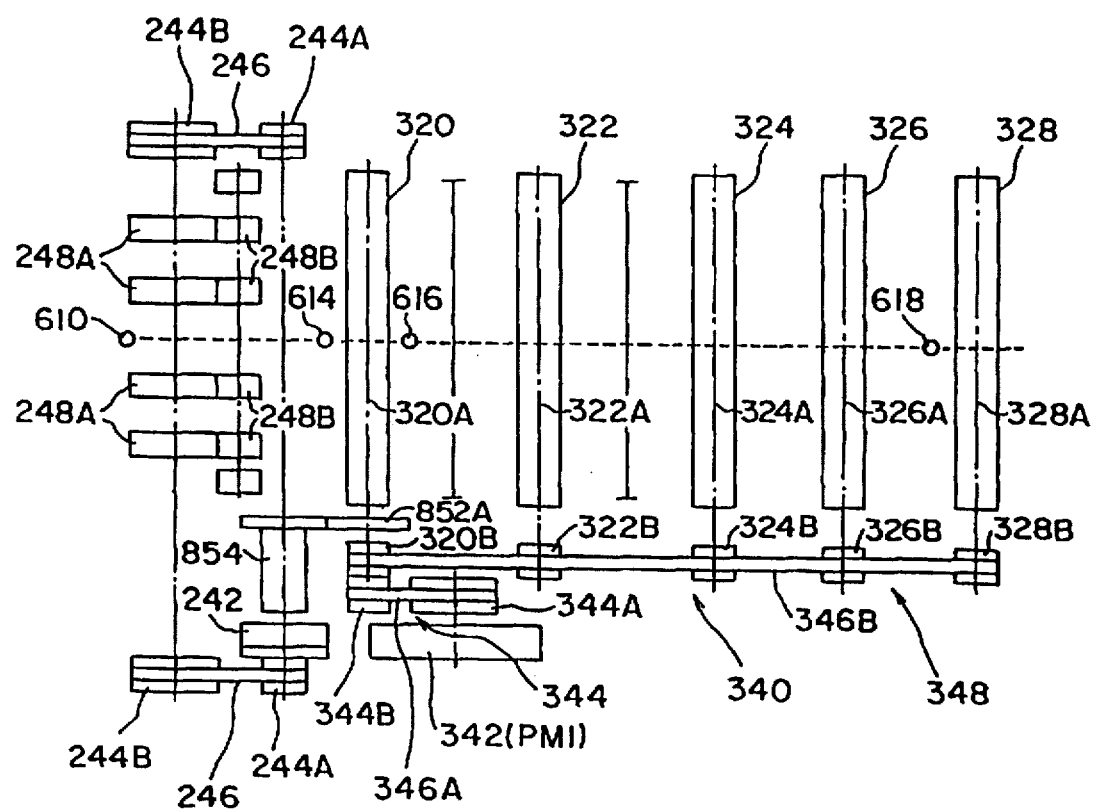
FIG. 10 is a diagrammatic view schematically showing, in plan, the driving system shown in FIG. 8.
Figure 11A:
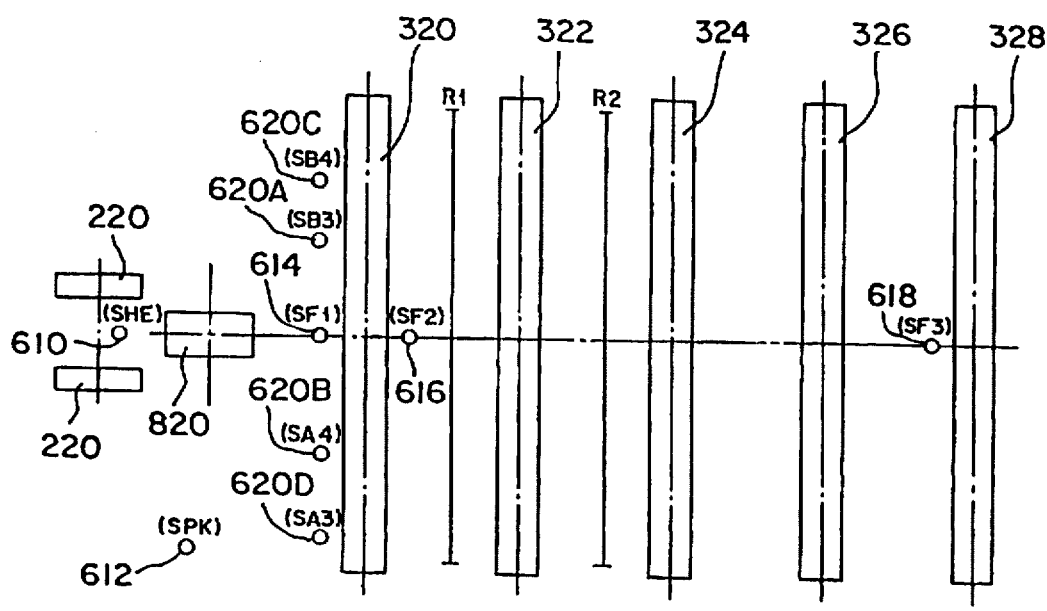
FIG. 11 is a diagrammatic view schematically showing, in plan, a paper transport system of the image reading apparatus of FIG. 4.
Figure 11B:
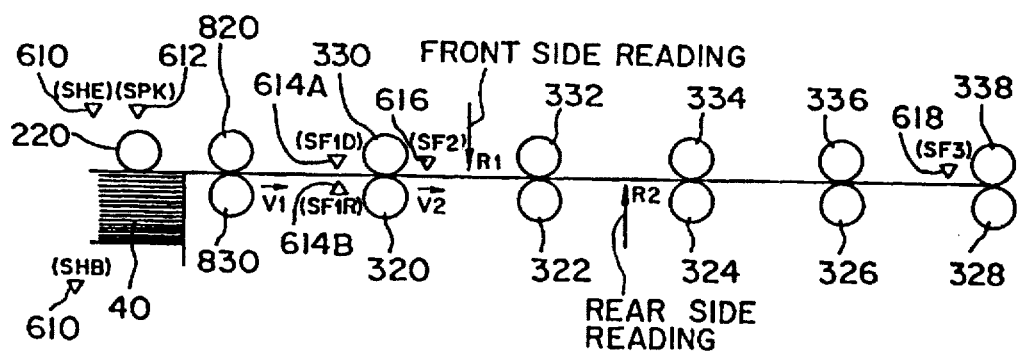

The paper transport mechanism 300 described above is schematically shown in FIGS. 10 and 11. Referring to FIGS. 10 and 11, the components are shown such that the paper supply hopper 210 is positioned on the left side while a paper stacker 510 is positioned on the right side and a paper sheet 40 is transported from the left to the right side reversely to those in FIGS. 4 to 9 so as to conform to time charts (sequence diagrams shown in FIGS. 38 to 43) which will be hereinafter described.

Figure 12:
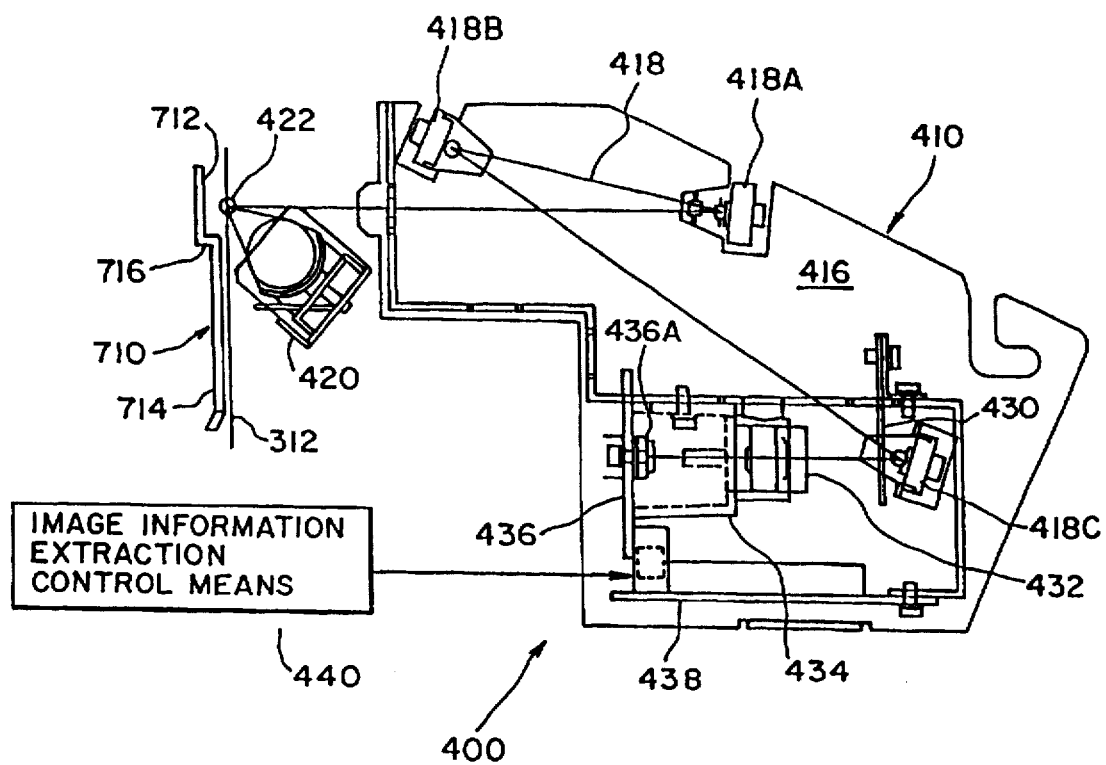
FIG. 12 is a schematic side elevational view showing the construction of an image reading unit of the image reading apparatus of FIG. 4.

Referring now to FIG. 12, the optical image reading mechanism 400 includes an optical image reading unit 410 having a reading point 422 located on the inclined transport path 312 for optically reading information on a paper sheet 40, and image information extraction control means 440 for controlling extraction of image information read by the optical image reading unit 410.

Referring to FIGS. 4 and 7, the optical image reading unit 410 includes, in the arrangement shown, two units of a first optical image reading unit 412 and a second optical image reading unit 414. The optical image reading units 412 and 414 are located intermediately of the inclined transport path 312, and the first optical image reading unit 412 optically reads information on the front face 42 of a paper sheet 40 while the second optical image reading unit 414 optically reads information on the rear face 44 of the paper sheet 40.

Here, each of the optical image reading units 412 and 414 is constituted as an image reading unit of common specifications. For example, FIG. 12 is a side elevational view showing the construction of the image reading unit of common specifications. Referring to FIG. 12, the optical image reading unit 410 includes a fluorescent lamp unit 420 serving as a lighting element for irradiating light upon the reading point 422 on the inclined transport path 312, a CCD (charge coupled device) circuit board 436 including a CCD camera 436A for optically reading information on a paper sheet 40, and a video circuit board 438 for processing information from the CCD camera 436A.

A light path 418 from the reading point 422 to the CCD camera 436A is constituted from a plurality of (three in the arrangement shown) mirrors 418A, 418B and 418C for reflecting light. A shading plate 430 and a lens 432 are located intermediately of the light path 418 between the mirror 418C and the CCD camera 436A so that an image from the mirror 418C may be introduced into the CCD camera 436A by way of the lens 432 after peripheral portions thereof, which are liable to be distorted, are corrected by the shading plate 430.

Since the light path 418 is formed by the plurality of mirrors 418A, 418B and 418C for reflection of light in this manner, the light path 418 can have a sufficient length while the reading point 422 and the CCD circuit board 436 are located at comparatively near locations to each other. Consequently, even where the lens 432 has a great focal length, the reading point 422 can be disposed at a focus position of the lens 432.

A paper sheet 40 from which information has been read by the optical image reading mechanism 400 in this manner is discharged from the paper transport mechanism 300 to the paper stacking mechanism 500. Here, at the terminal end of the paper transport mechanism 300, a paper discharge roller mechanism 540 is located so that the paper sheet 40 may be discharged to the paper stacking mechanism 500 while being driven by the paper discharge roller mechanism 540.

The paper stacking mechanism 500 includes a stacker table 520 having, at the bottom thereof, the paper stacker 510 on which paper sheets 40 can be stacked. A paper trailing end guide mechanism 550 for guiding the rear end 48 of a paper sheet 40 to be stacked into the paper stacker 510.

Referring back to FIGS. 4, 7 and 11, several sensors 610 to 618, 620A to 620D and 622 are provided. Thus, operations of the driving systems described above, that is, operations of the hopper motor 242 of the paper supply hopper driving mechanism 240, the pick clutch 238 of the paper supply roller driving mechanism 230, the separation clutch 854 and the roller driving mechanism 340 of the separation roller driving mechanism 850, and the transport motor 342 for the separation roller driving mechanism 850 and the paper supply roller driving mechanism 230 and extraction operations of the image information extraction control means 440 of the first optical image reading unit 412 and the second optical image reading unit 414 are controlled in response to detection signals from the sensors 610 to 618 and 620A to 620D.

The sensor (SHE) 610 is a hopper empty sensor for detecting whether or not the paper supply hopper 210 is empty. The sensor (SPK) 612 is a paper supply sensor for detecting whether or not the posture of the paper supply hopper 210 is in an optimum condition (that is, a hopper paper supplying position) for supplying a paper sheet. Here, since the paper supply roller 220 is put into a paper supplying position (optimum condition) in response to the paper supplying position of the paper supply hopper 210, the sensor 612 actually detects whether or not the paper supply hopper 210 and the paper supply roller 220 are in their individual paper supplying positions. The hopper empty sensor 610 and the paper supply sensor 612 may each be constituted from, for example, a photo-interrupter.

The sensor (SF1) 614 and the sensor (SF2) 616 are transport sensors for detecting a paper sheet 40 is transported by the paper transport mechanism 300. Of the two sensors 614 and 616, the transport sensor 616 detects a reading timing for an image. Meanwhile, the sensor (SF3) 618 is a discharge sensor for detecting whether or not a paper sheet 40 is discharged from the paper transport mechanism 300 to the paper stacking mechanism 500. The transport sensors 614 and 616 and the discharge sensor 618 may each be constituted from, for example, a photo-sensor. Here, the transport sensor 614 is a transmission type photo-sensor which includes a light emitting element and a light receiving element located on the opposite sides of the paper transport mechanism 300, and each of the transport sensor 616 and the discharge sensor 618 is a reflection type sensor wherein a light emitting element and a light receiving element are provided as a unitary member.

The sensor (SB5) 620A, the sensor (SA4) 620B, the sensor (SB4) 620C and the sensor (SA3) 620D are sheet width detection sensors constituting paper size detection means 620. In particular, the sensor 620A is a B5 width detection sensor provided for detection of a paper width of a paper sheet of the "B5 size"; the sensor 620B is an A4/LT width detection sensor provided for detection of a paper width of a paper sheet of the "A4 size" or "LT size"; the sensor 620C is a B4 width detection sensor provided for detection of a paper width of a paper sheet of the "B4 size"; and the sensor 620D is an A4/DL width sensor provided for detection of a paper width of a paper sheet of the "A3 size" or "DL size". The sensors 620A to 620D may each be constituted from, for example, a photo-sensor. In the arrangement shown, a reflection type photo-sensor is employed for the sensors 620A to 620D.

Meanwhile, the sensor 622 is a bottom sensor for discriminating whether or not the hopper table 212 of the paper supply hopper 210 is at its lowermost position (bottom position). The sensor 622 may be, for example, a photo-interrupter. The sensors mentioned above will be hereinafter described in detail.

For starting and stopping operations, setting of an operation condition and so forth of the image reading apparatus described above, an operation panel 920 is provided at the front of the image reading apparatus as shown, for example, in FIG. 5.

2. Construction of Essential Part of the Image Reading Apparatus

In the following, the construction of essential part of the image reading apparatus will be described in detail for the individual components.

2-1. Paper supply Mechanism

A. Paper Hopper System

The paper supply hopper driving mechanism 240 for driving the paper supply hopper 210 will first be described in detail. Referring to FIGS. 4 and 7, the paper supply hopper driving mechanism 240 includes, as described hereinabove, the hopper motor 242 constituted from a stepper motor, the belt-and-pulley mechanism 244 and the rack-and-pinion mechanism 248.

The belt-and-pulley mechanism 244 includes a pair of pulleys 244A and 244B and a belt 246. The pulley 244A is mounted on a rotary shaft of the hopper motor 242, and the pulley 244B is provided coaxially with a pinion 248B.

The rack-and-pinion mechanism 248 includes a rack 248A and the pinion 248B mentioned above which are held in meshing engagement with each other. The rack 248A is formed along an arc and mounted on the hopper table 212 such that, when the pinion 248B is rotated, the hopper table 212 is pivoted around an axis of the rotary shaft 212A together with the rack 248A by the rotation of the rack-and-pinion mechanism 248 to move the free end portion thereof upwardly or downwardly.

The hopper motor 242 is controlled in operation by motor control means 280 serving as paper supply hopper position control means in response to information from the paper supply sensor 612 serving as paper supply position detection means to adjust the inclined position of the hopper table 212 so that the uppermost one of the paper sheets 40 accommodated on the hopper table 212 of the paper supply hopper 210 may be positioned optimally to supply the paper sheet (this is the hopper paper supply position mentioned hereinabove).

Such control of the hopper motor 242 by the motor control means 280 is performed normally during reading operation. However, upon paper accommodation wherein paper sheets 40 are accommodated into the paper supply hopper 210, control of an initialization mode is performed. In particular, in response to an operation starting instruction (that is, a control starting instruction) provided by, for example, throwing in of the power supply to the image reading apparatus, the motor control means 280 controls so that the hopper motor 242 is rotated in a direction to move the hopper table 212 downwardly, and then when the hopper table 212 reaches its lowermost position, whereupon the bottom sensor 622 is switched to an on-state, the motor control means 280 controls so that the hopper motor 242 is stopped.

Thereafter, the motor control means 280 controls the hopper motor 242 so that the paper supply hopper 210 in which the paper sheets 40 are accommodated is moved to its hopper paper supply position.

Here, the hopper paper supply position will be described. A gate 228 is provided at the end of the paper supply hopper 210 in the paper supplying direction adjacent the front end of the hopper table 212 such that leading ends 46A of the paper sheets 40 may be restricted within the paper supply hopper 210. The gate 228 is formed such that an upper end portion 228A thereof is inclined a little in the paper supplying direction so as to approach the separation roller 820 at a location a little downstream (in the paper supplying direction) of the paper supply roller 220 so that the paper sheets 40 in the paper supply hopper 210 may be supplied smoothly one by one toward the separation roller 820 side.

The paper supply roller 220 drives the top face of the paper sheets 40 in the paper supply hopper 210 to supply the top one paper sheet 40. In order to drive, upon such paper supplying operation, the paper sheets 40 smoothly one by one from the top of the paper sheets 40, the top one of the paper sheets 40 in the paper supply hopper 210 is supplied preferably riding over the upper end portion 228A of the gate 228, and the position of the top face of the paper sheets 40 must not be excessively high nor low with respect to the upper end portion 228A of the gate 228. The inclined position of the hopper table 212 which is suitable to such paper supplying operation is defined as hopper paper supply position.

Figure 14:
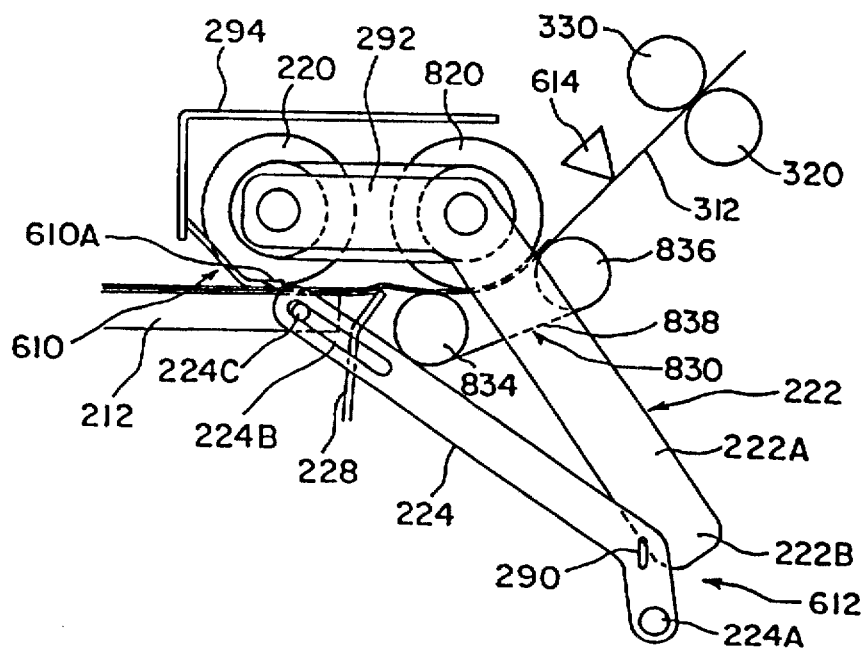
FIG. 14 is a side elevational view of part of a paper supply mechanism in the image reading apparatus of FIG. 4 when paper sheets remain by a small amount in a paper supply hopper.

By the way, the paper sheets 40 in the paper supply hopper 210 lie substantially horizontally as shown in FIG. 14 when the quantity (number) thereof is small, and as the quantity (number) thereof increases, they are inclined forwardly downwardly in the paper supplying direction with the trailing ends thereof in the paper feeding direction raised relative to the leading ends thereof. Accordingly, the hopper paper supply position varies in response to the quantity (number) of the paper sheets 40. Meanwhile, since the paper supply roller 220 is rocked to a position corresponding to the height of the top of the paper sheets 40 to incline the paper supply hopper 210, the position (height) and/or the posture of the paper sheets 40 can be detected as the rocking position of the paper supply roller 220. Accordingly, the hopper paper supply position can be detected from the rocking position of the paper supply roller 220 and the inclination of the paper supply hopper 210 itself.

Figure 15:
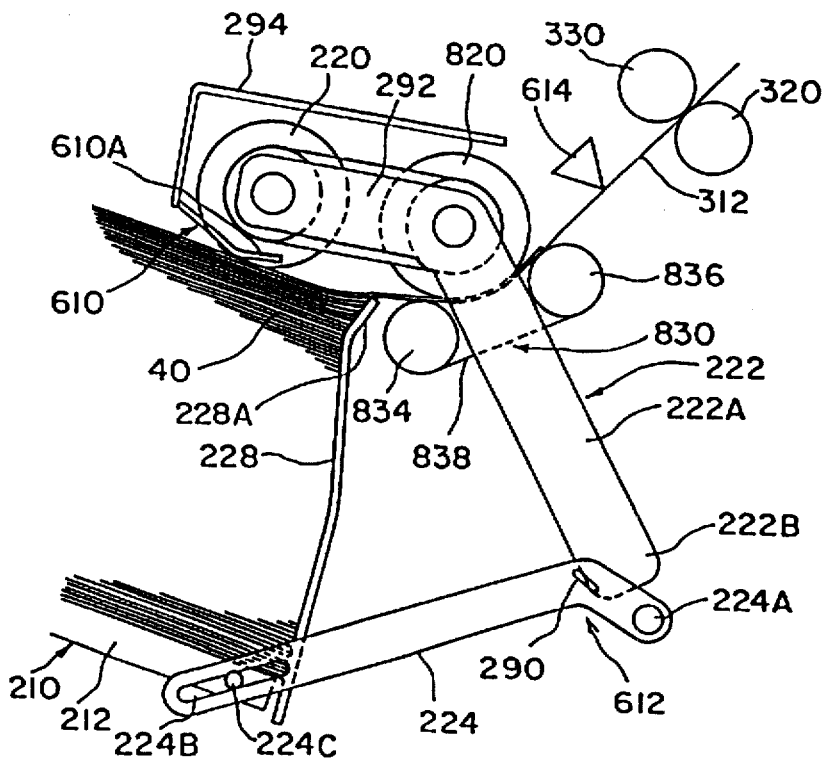
FIG. 15 is a side elevational view showing part of the paper supply mechanism of FIG. 14 but when paper sheets remain by a large amount in the paper supply hopper.

Therefore, in the present embodiment, the paper supply sensor 612 serving as paper supply position detection means includes, as shown in FIGS. 14 and 15, a first interlocking member 222 which operates in response to a rocking movement (rocking position) of the paper supply roller 220, a second interlocking member 224 which operates in response to a pivotal movement (inclined position) of the hopper table 212 itself of the paper supply hopper 210, and a switch 290 which operates on or off in response to a relative movement between the first and second interlocking members 222 and 224.

Referring to FIGS. 14 to 16, the first interlocking member 222 includes a switch arm 222A which is provided integrally with and extends obliquely downwardly from the rocking arm 292 on which the center of rotation of the paper supply roller 220 is supported for rotation so that the paper supply roller 220 may be rocked around the axis of rotation of the separation roller 820. Due to the construction of the first interlocking member 222, when the paper supply roller 220 is rocked, also the switch arm 222A of the first interlocking member 222 is rocked in response to the rocking movement of the first interlocking member 222.

Meanwhile, the second interlocking member 224 is formed as an L-shaped arm which is supported for pivotal motion around an arm fulcrum 224A at a location forwardly of a lower portion of the gate 228 in the paper supplying direction (rightwardly in FIGS. 14 and 15). A pin 224C is provided at a side portion of a front end portion of the hopper table 212 and is loosely fitted in an elongated hole 224B formed at a rocking end portion of the second interlocking member 224 such that the second interlocking member 224 may be rocked around the pin 224C when the hopper table 212 is moved upwardly or downwardly.

The switch 290 may be a photo-interrupter. The photo-interrupter switch 290 is provided at an intermediate portion (bent portion) of the second interlocking member 224 adjacent the arm fulcrum 224A. When a rocking end portion 222B of the switch arm 222A of the first interlocking member 222 comes to a position on an optic axis of the photo-interrupter switch 290, the photo-interrupter switch 290 is switched on, but when the rocking end portion 222B moves out of the optic axis of the photo-interrupter switch 290, the photo-interrupter switch 290 is switched off.

Accordingly, when the hopper table 212 is raised to a high position as seen in FIG. 14, the second interlocking member 224 is pivoted in the clockwise direction in FIG. 14 so that the switch 290 approaches the rocking end portion 222B of the first interlocking member 222. Consequently, even if the paper supply roller 220 is rocked little and the first interlocking member 222 is pivoted little, the rocking end portion 222B of the first interlocking member 222 reaches the switch 290 to switch the switch 290 on.

On the other hand, when the hopper table 212 is moved down to a low position as seen in FIG. 15, the second interlocking member 224 is pivoted in the counterclockwise direction in FIG. 15 so that the switch 290 is spaced away from the rocking end portion 222B of the first interlocking member 222. Consequently, unless the paper supply roller 220 is rocked by a certain amount, the rocking end portion 222B of the first interlocking member 222 does not reach the switch 290 to switch the switch 290 on.

The hopper motor 242 operates to drive the hopper table 212 of the paper supply hopper 210 to move upwardly until the paper supply sensor 612 detects the hopper paper supply position. Naturally, immediately after paper sheets 40 are accommodated into the paper supply hopper 210, the paper supply hopper 210 is at a sufficiently lowered position, and accordingly, the hopper motor 242 drives the hopper table 212 of the paper supply hopper 210 to move to the hopper paper supply position.

Then, when paper is supplied, since the quantity of the paper sheets 40 in the paper supply hopper 210 decreases each time a paper sheet 40 is supplied, also the hopper paper supply position varies accordingly. Also in this instance, the hopper motor 242 operates in response to such detection information of the paper supply sensor 612 so that the paper supply hopper 210 is always adjusted to the hopper paper supply position (that is, the position optimum to supply the paper sheets 40).

Meanwhile, the bottom sensor 622 mentioned hereinabove may be a photo-interrupter and is provided at a lower location in the apparatus body 10. The rack 248A is positioned so that, when the hopper table 212 comes to its lowermost position (bottom position), the lower end of the rack 248A comes to an optic axis of the photo-interrupter of the bottom sensor 622. In this instance, the bottom position can be detected as the photo-interrupter is switched on.

Since operation of the paper supply hopper 210 is normally controlled in response to the hopper empty sensor 610, the paper supply sensor 612 and the bottom sensor 622, the paper supply hopper 210 is pivoted within a fixed range. In order to prevent the paper supply hopper 210 from being pivoted beyond the fixed range due to a malfunction of an associated control system or driving system, the image reading apparatus of the present embodiment includes a paper supply hopper excessive pivotal motion prevention mechanism 260.

The paper supply hopper excessive pivotal motion prevention mechanism 260 includes a stopper 262 provided at an upper end portion of the rack 248A, a non-toothed portion 264 provided at an upper end portion of the rack 248A, and a torque limiter 266 provided between the pulley 244B and the pinion 248B.

In particular, when the paper supply hopper 210 comes to its lowermost position, the upper stopper 262 is contacted with an abutting portion (not shown) on the pinion 248B to stop pivoting motion of the pinion 248B thereby to stop the paper supply hopper 210 at the lowermost position (bottom position). Further, in this instance, the input power from the hopper motor 242 to the pinion 248B is limited within a fixed range by an action of the torque limiter 266 so that the rack-and-pinion mechanism 248 may not be damaged inadvertently.

Meanwhile, the non-toothed portion 264 is formed by removing some teeth of the rack 248A provided for meshing engagement with the pinion 248B. Thus, when the paper supply hopper 210 comes to the uppermost position, the pinion 248B comes to the non-toothed portion 264 so that further rotation of the pinion 248B is not transmitted to the rack 248A any more. Consequently, the paper supply hopper 210 is stopped at the uppermost position.

By the way, the image reading apparatus of the present embodiment not only has an automatic mode in which an image is read while the paper sheets 40 in the paper supply hopper 210 are automatically supplied and transmitted successively one by one but also has a manual paper insertion mode in which paper sheets are manually inserted one by one into the image reading apparatus. The manual paper insertion mode can be set by way of insertion mode selection means 924C provided on the operation panel 920 which will be hereinafter described.

When such manual paper insertion mode is set, the motor control means 280 controls so that the hopper table 212 of the paper supply hopper 210 may be driven by the paper supply hopper driving mechanism 240 to move to the paper supply position and thereafter keep the paper supply position. In the manual paper insertion mode, since paper sheets are inserted one by one, if the hopper table 212 is held at the paper supply position in this manner, the paper sheet always keeps an optimum height with respect to the gate 228.

B. Paper Supply Roller System

The paper supply roller 220 is supported for rocking motion on the separation roller 820 by way of the rocking arm 292 as described above. Actually, however, the paper supply roller 220 is provided by a pair located in a leftwardly and rightwardly symmetrical positions with respect to the center line of the paper supplying direction as seen in FIGS. 16(B) and 16(C). The left and right paper supply rollers 220 are disposed in a mutually neighboring relationship in the proximity of the center line of the paper supplying direction so that also a paper sheet of a comparatively small width can be supplied with certainty.

The paper supply roller driving mechanism control means 250 controls operation of the pick clutch 238 of the paper supply roller driving mechanism 230 in response to a result of detection of the paper supply sensor 612 described above. Accordingly, the paper supply roller driving mechanism control means 250 is referred to herein also as pick clutch control means. In particular, if it is discriminated by the paper supply sensor 612 that the paper supply hopper 210 is at the hopper paper supply position, then also the positions of the paper supply rollers 220 in their rocking direction are the hopper paper supply positions, and the paper supply roller driving mechanism control means 250 controls the pick clutch 238 of the paper supply roller driving mechanism 230 so as to drive the paper supply rollers 220.

On the contrary, if it is not discriminated by the paper supply sensor 612 that the paper supply hopper 210 is at the hopper paper supply position (that is, if it is discriminated that the paper supply hopper 210 is not at the hopper paper supply position), then also the positions of the paper supply rollers 220 themselves in the rocking direction are not the hopper paper supply positions, and the paper supply roller driving mechanism control means 250 controls the pick clutch 238 of the paper supply roller driving mechanism 230 so as to stop driving of the paper supply rollers 220.

For example, if it is discriminated that the paper supply hopper 210 is at the hopper paper supply position, then the paper supply roller driving mechanism control means 250 couples the pick clutch 238 so that the paper supply rollers 220 are driven by the paper supply roller driving mechanism 230 to operate to supply the top one of the paper sheets 40 in the paper supply hopper 210. After the top paper sheet 40 is supplied from the paper supply hopper 210, the paper supply rollers 220 are rocked downwardly by a distance equal to the thickness of the paper sheet 40.

As such downward rocking movement of the paper supply rollers 220 occurs and is accumulated successively, the switch arm 222A of the first interlocking member 222 is finally spaced away from the switch 290, whereupon the switch 290 is switched off. Consequently, it is discriminated now that the paper supply hopper 210 is not at the hopper paper supply position, and the paper supply roller driving mechanism control means 250 disconnects the pick clutch 238 to stop the paper supply roller driving mechanism 230. Simultaneously, the motor control means 280 renders the hopper motor 242 operative in response to information from the paper supply sensor 612 so that the paper supply hopper 210 is driven to move to the hopper paper supply position.

As a result, the paper supply roller driving mechanism control means 250 controls so that the paper supply roller driving mechanism 230 may operate again. As such a sequence of operations as just described is repeated, the position of the top face of the paper sheets 40 is always kept within an optimum range, and in this condition, the paper supply rollers 220 operate. On the contrary, if the position of the top face of the paper sheets 40 does not remain within such optimum range, the paper supply rollers 220 do not operate.

Referring to FIGS. 14 to 16(D), a cover 294 is provided integrally with the rocking arm 292 such that it covers over the paper supply rollers 220 and the separation roller 820 from the side adjacent the paper supply hopper 210. The hopper empty sensor 610 mentioned hereinabove is provided on the cover 294. The hopper empty sensor 610 includes a rockable arm 610A mounted for movement, for example, such that an end portion thereof can be moved down into a groove not shown formed on the hopper table 212, and a photo-interrupter not shown provided at a rocking portion of the rockable arm 610A. The photo-interrupter is disposed such that it is switched on (closed) when the end of the rockable arm 610A is moved down.

The rockable arm 610A is so light in weight that, even if only one paper sheet 40 is present on the hopper table 212, downward movement of the end of the rockable arm 610A is prevented by the paper sheet 40 so that the photo-interrupter remains in an off-state, but if all of the paper sheets 40 on the hopper table 212 are supplied from the hopper table 212, then the end of the rockable arm 610A is moved down so that the photo-interrupter is turn on.

The hopper empty sensor 610 may alternatively constructed in such a manner as described below. In particular, the hopper empty sensor 610 may be constructed as a transmission type photo-sensor including a light emitting element 614A and a light receiving element 614B disposed in pair on the front face and the rear face of the hopper table 212, respectively. Meanwhile, the hopper table 212 has a hole not shown perforated therein so that, if a paper sheet 40 is placed on the hopper table 212, transmission of light from the light emitting element 614A to the light receiving element 614B through the hole is prevented by the paper sheet 40, and consequently, accommodation of the paper sheet 40 is detected. However, if no paper sheet 40 remains on the hopper table 212, light is transmitted from the light emitting element 614A to the light receiving element 614B through the hole. Consequently, absence of any paper sheet 40 is detected.

C. Paper Separation Mechanism System

As described hereinabove, the paper separation mechanism 800 includes the separation roller 820, the rotation member 830 disposed in an opposing relationship to and below the separation roller 820, and the separation roller driving mechanism 850 for driving the separation roller 820 to rotate. The paper separation mechanism 800 is constructed such that, when a plurality of paper sheets 40 are supplied from the paper supply rollers 220, it separates only an uppermost one of the paper sheets 40 from the other paper sheet or sheets 40 between the separation roller 820 and the rotation member 830 and takes out and transports the thus separated one paper sheet 40.

The rotation member 830 is located below the separation roller 820, that is, adjacent the apparatus body 10 with respect to the separation roller 820, with a small gap left from the separation roller 820. The rotation member 830 includes the pair of pulleys 834 and 836 disposed in a spaced relationship from each other in the paper transporting direction and the endless belt 838 wound between and around the pulleys 834 and 836.

The separation roller driving mechanism 850 is constituted from components substantially common to those of the paper supply roller driving mechanism 230 described hereinabove. In particular, the separation roller driving mechanism 850 includes the transport motor 342 described hereinabove as a driving source and further includes the first belt-and-pulley mechanism 344 and the first and second gear mechanisms 852 and 856 interposed between the transport motor 342 and the paper supply rollers 220. The separation clutch 854 is interposed in the first gear mechanism 852. In short, the paper supply roller driving mechanism 230 has a construction wherein the third gear mechanism 232 is provided in addition to the separation roller driving mechanism 850. The first gear mechanism 852 includes gears 852A to 852D; the second gear mechanism 856 includes gears 856A and 856B; and the third gear mechanism 232 includes gears 232A to 232C. In FIGS. 9 and 10, some of the gears mentioned above are omitted.

Figure 8:
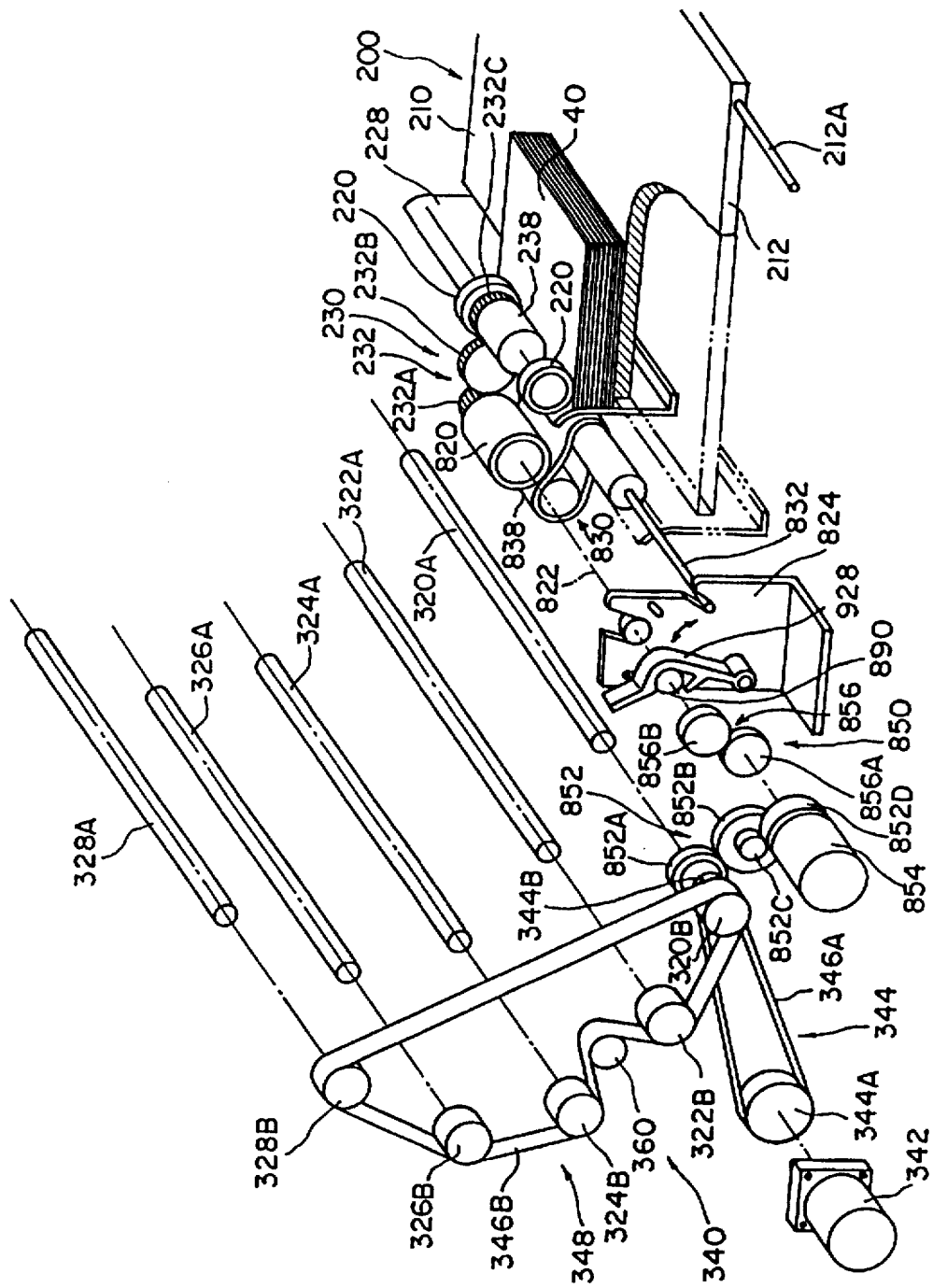
FIG. 8 is an exploded perspective view schematically showing a driving system of the image reading apparatus of FIG. 4.

In the image reading apparatus of the present embodiment, the rotary shaft 822 of the separation roller 820 is supported for rotation on a pair of separation roller system bearing members 824 provided outwardly of the left and right ends of a front portion of the paper supply hopper 210 on the apparatus body 10 as seen in FIG. 8. The separation roller 820 is provided at a central portion of the rotary shaft 822 as seen from FIGS. 17(A) and 17(B).

Figure 17A:
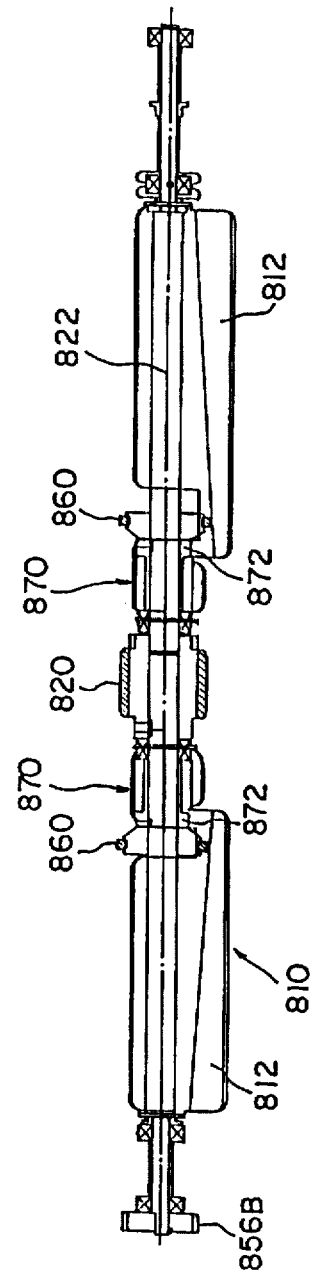
FIGS. 17(A), 17(B) and 17(C) are a plan view, a front elevational view and a side elevational view, respectively, of a separation roller system of the image reading apparatus of FIG. 4.
Figure 17B:
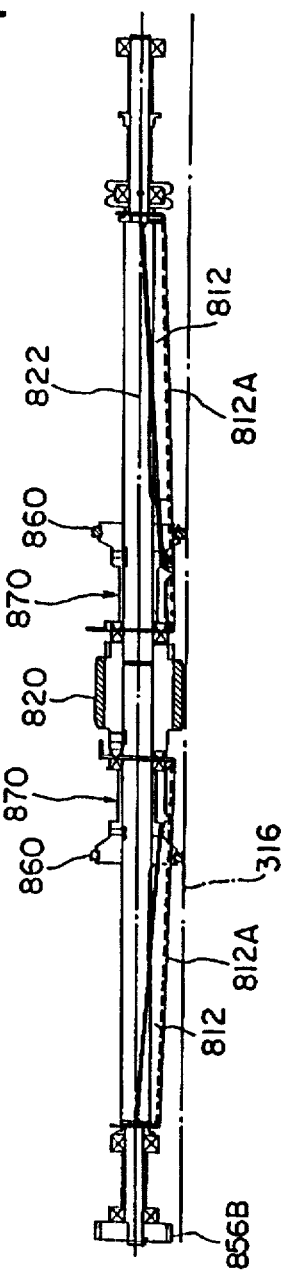

The paper separation mechanism 800 includes a paper skew prevention mechanism 810 as shown in FIGS. 17(A) and 17(B). The paper skew prevention mechanism 810 includes a pair of movable guide members 812 provided at left and right locations with respect to the separation roller 820.

The movable guide members 812 are plate-like members mounted on the rotary shaft 822 of the separation roller 820 in an opposing relationship to a paper passing region below the separation roller 820.

The movable guide members 812 restrict otherwise possible upward lateral floating movement or deformation of a paper sheet driven by the paper supply rollers 220 so that the paper sheet may be transported at a high speed and in a stable posture.

In particular, since a paper sheet driven by the paper supply rollers 220 becomes liable to move laterally as the speed increases and it is driven by the paper supply rollers 220 while it is pressed at central portions thereof in its widthwise direction from above by the paper supply rollers 220, it is fed to the separation roller 820 in such a deformed condition that the opposite left and right end portions thereof are turned up laterally. Since such lateral movement or deformation of a paper sheet makes a cause of a skew, the paper sheet must be introduced to the separation roller 820 while suppressing such lateral movement or deformation of the paper sheet.

To this end, the movable guide members 812 are provided, and a guide face 812A for guiding a paper sheet is formed on the lower face of each of the movable guide members 812. The movable guide members 812 are loosely fitted on the rotary shaft 822 such that they can be rocked around the rotary shaft 822 or moved upwardly or downwardly within a fixed range so that the guide faces 812A thereof may follow up the type or deformation of a paper sheet transported thereto.

The guide faces 812A of the movable guide members 812 are formed such that, taking possible upward lateral movement of the opposite left and right end portions of a paper sheet into consideration, portions thereof in the proximity of the center of the paper sheet in its widthwise direction are positioned in the proximity of a paper passage reference plane 316, but portions thereof adjacent the opposite ends of the paper sheet in the widthwise direction remote from the separation roller 820 are spaced away from the paper passage reference plane 316.

Since the guide faces 812A of the movable guide members 812 hold down a paper sheet by a greater amount (paper holding down amount) at a position nearer to the paper passage reference plane 316, they are shaped such that a greater paper holding amount is obtained at central portions in the widthwise direction, but a smaller paper holding amount is obtained at the opposite end portions in the widthwise direction.

Figure 19:
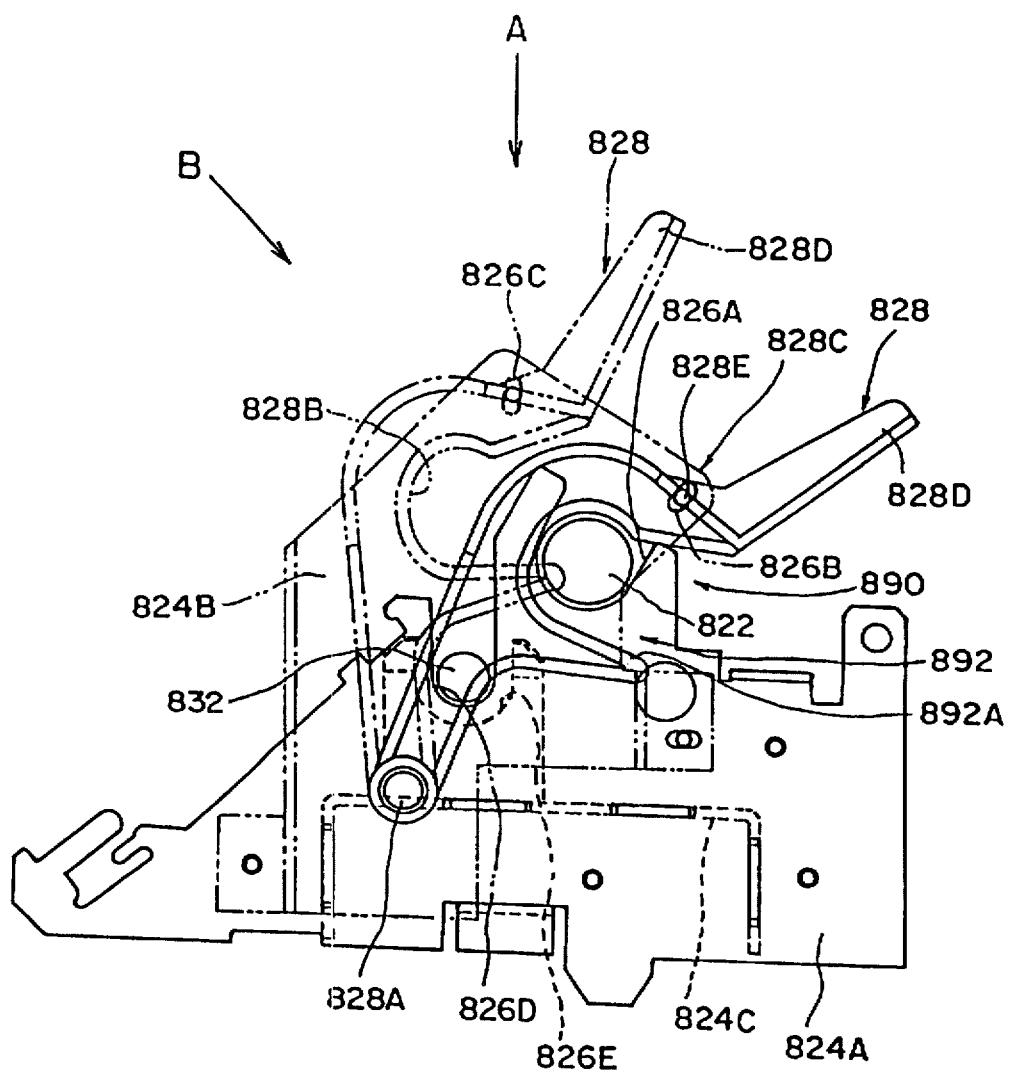
FIG. 19 is a side elevational view of the bearing system of the separation roller system shown in FIGS. 18(A) and 18(B) showing a rotary shaft of a separation roller in a fixed condition.
Figure 20:
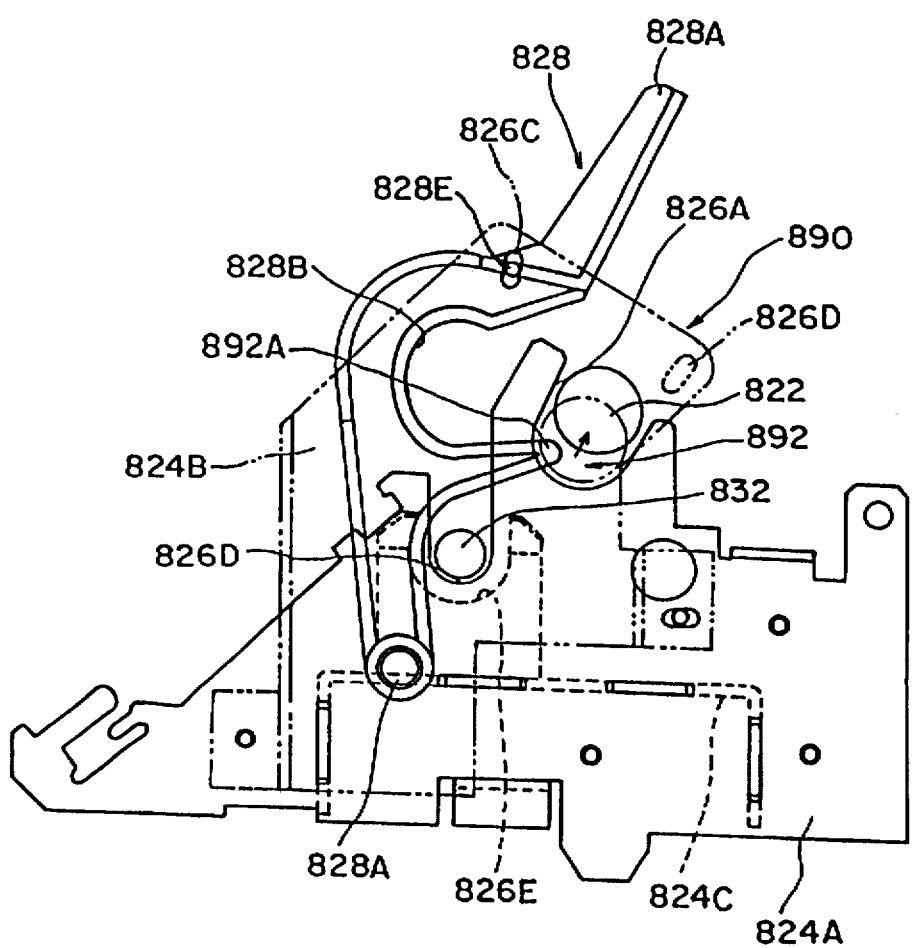
FIG. 20 is a similar view but showing the rotary shaft of the separation roller in a displaced condition.

Further, the guide faces 812A of the movable guide members 812 are inclined such that they are spaced, at entrance portions thereof adjacent the paper supply rollers 220, by a greater distance from the paper passage reference plane 316 so that the end portion 46A of a paper sheet 40 in an upwardly laterally curved condition may be caught with certainty by the guide faces 812A (refer to FIGS. 19 and 20). Accordingly, the distance of the guide faces 812A of the movable guide members 812 from the paper passage reference plane 316 decreases gradually toward the paper supplying and transporting direction. Consequently, the paper sheet 40 is reformed against deformation and controlled from lateral movement which it passes along the guide faces 812A.

Referring now to FIGS. 19 and 20, the separation roller system bearing members 824 include a pair of body plates 824A provided uprightly in the vertical direction adjacent the opposite left and right ends of the paper transport path 310, a pair of side plates 824A coupled to the outer faces of the body plates 824A, and a base plate 824C having a channel-shaped cross section and coupling the left and right body plates 824A to each other. A rotary shaft locking mechanism 890 for locking the rotary shaft 822 of the separation roller 820 from movement is provided between each of the body plates 824A and an associated one of the side plates 824A.

Referring to FIGS. 8 and 18 to 20, each of the rotary shaft locking mechanisms 890 includes a bearing hole 826A formed at an upper portion of an associated one of the body plates 824A in such a manner as to open upwardly, a rockable lever 828 supported for rocking motion on an associated one of the separation roller system bearing members 824 by means of a pin 828A, a bearing hole 828B formed in the rockable lever 828 and having an opening, and a latch mechanism 828C for latching the rockable lever 828 between a locking position and an unlocking position.

The rockable lever 828 can be pivoted between such a locking position as indicated by a solid line in FIG. 19 and such an unlocking position as indicated by a chain line in FIG. 19. The rockable lever 828 can be manually pivoted at a tongue 828D formed at a rocking end portion thereof. Further, the latch mechanism 828C includes a resilient pin 828E extending from the rockable lever 828 toward an associated one of the side plates 824A, and a pair of pin holes 826B and 826C formed in the side plate 824A.

When the rockable lever 828 is moved to its locking position, the pin 828E is engaged in the pin hole 826B to lock the rockable lever 828. However, when the rockable lever 828 is moved to its unlocking position, the pin 828E is engaged in the other pin hole 826C to lock the rockable lever 828. On the other hand, if an operation force is applied to the rockable lever 828 against the resilient force for biasing the pin 828E in its projecting direction, then the pin 828E is resiliently retracted and is now contacted with a wall face of the side plate 824A. In this condition, the rockable lever 828 can be pivoted freely between the locking position and the unlocking position.

The rotary shaft 822 is supported, when it is mounted, in such a fixed condition that, as indicated by a solid line in FIG. 19, it is held between the bearing holes 826A of the body plates 824A and the bearing holes 828B of the rockable levers 828 in the locking position.

Each of the locking mechanisms further includes separation roller moving away means 892 for moving the separation roller 820 in a direction in which it is spaced away from the rotation member 830. The separation roller moving away means 892 is constituted from a projection 892A formed on the rockable lever 828 such that an opening end portion of the bearing hole 828B of the rockable lever 828 adjacent the center of rotation of the rotary shaft 822 extends laterally by a great extent. The projection 892A is formed such that, when the rockable lever 828 is pivoted toward the unlocking position, it is contacted with the lower face of the rotary shaft 822 of the separation roller 820 to push up the rotary shaft 822.

Consequently, if paper jamming should occur, for example, between the separation roller 820 and the belt 838 of the rotation member 830, then if the rockable levers 828 are pivoted to the individual unlocking positions as seen in FIG. 20, then the projections 892A of the separation roller moving away means 892 move the rotary shaft 822 upwardly from a position indicated by a chain line in FIG. 20 to another position indicated by a solid line in FIG. 20. Consequently, the separation roller 820 and the belt 838 are spaced away from each other, and accordingly, the paper can be taken out readily. In this instance, the rotary shaft 822 is naturally held in a floating condition in the bearing hole 826A.

Referring to FIGS. 18(A) to 20, a bearing portion 826D is formed on each of the left and right body plates 824A, and a pair of bearing portions 826E are provided projectingly at upper left and right locations of the base plate 824C. The bearing portions 826D and 826E support, from below, a shaft 832 of the rotation member 830, which will be hereinafter described, located below the separation roller 820.

Figure 17C:
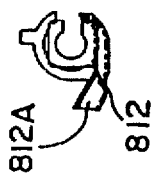

Referring to FIGS. 17(A) to 17(C), a pair of auxiliary rollers 860 are supported for rotation on and coaxially with the rotary shaft 822 at left and right positions sidewardly of the separation roller 820. In the image reading apparatus of the present embodiment, the auxiliary rollers 860 are positioned between the separation roller 820 and the movable guide members 812. The auxiliary rollers 860 act to help transportation of a paper sheet by the separation roller 820 to enhance the paper transporting force. To this end, a driving system 870 for driving the auxiliary rollers 860 is provided.

The driving system 870 serves also as a driving system for the separation roller driving mechanism 850 from the transport roller 342 to the rotary shaft 822, and from the driving systems, the auxiliary rollers 860 are driven by way of the rotary shaft 822 together with the separation roller 820. Further, the driving system 870 includes a pair of one-way clutches 872.

The one-way clutches 872 are interposed, for example, between the rotary shaft 822 and the auxiliary rollers 860 and allow the auxiliary rollers 860 to rotate at a higher speed than that at which they are driven to rotate by way of the driving system 870.

Accordingly, the auxiliary rollers 860 can help a paper sheet to be transported without making an obstacle to transportation of the paper sheet to provide a resistance to transportation of the paper sheet or without causing paper jamming.

Figure 21A:
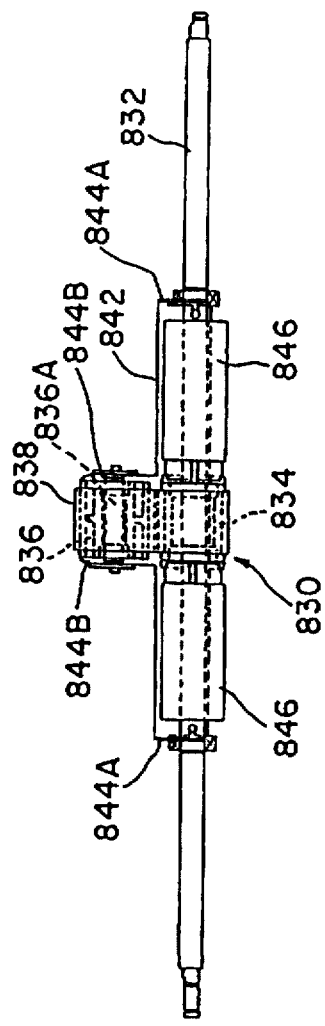
FIGS. 21(A), 21(B) and 21(C) are a plan view, a front elevational view and a side elevational view, respectively, showing a rotary member of the separation roller system shown in FIGS. 17(A) to 17(C)
Figure 21B:
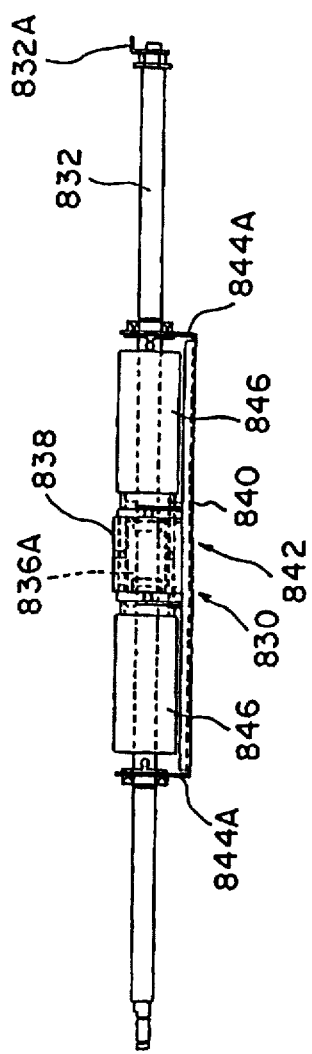
Figure 21C:
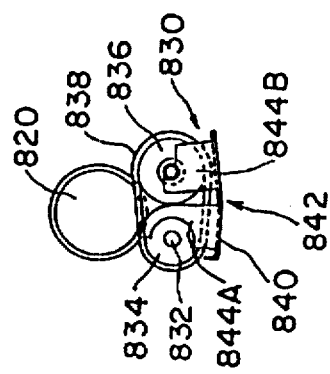

Referring to FIGS. 21(A) to 21(C), the rotation member 830 located below the separation roller 820 includes the pair of pulleys 834 and 836 spaced away from each other in the paper transporting direction at a central portion in the widthwise direction in an opposing relationship to the separation roller 820. Of the pulleys 834 and 836, the pulley 834 adjacent the paper supply rollers 220 is supported for rotation on and with respect to the shaft 832. A torque limiter 846 is interposed between the shaft 832 and the pulley 834 so that rotation of the pulley 834 may be restricted suitably.

Referring to FIGS. 8, 19 and 20, the shaft 832 is supported on the bearing portions 826D and 826E of the pair of left and right separation roller system bearing members 824. The bearing portions 826D and 826E are open at the tops thereof. However, when the separation roller 820 is fixed in a use condition, the shaft 832 is fixed at lower portions in the bearing portions 826D and 826E since it is acted upon by a downwardly pressing force from the separation roller 820 by way of the pulley 834. Accordingly, if the separation roller 820 is removed upwardly, then also the shaft 832 can be removed from the separation roller system bearing members 824.

The other pulley 836 is supported for rotation on and relative to a bearing member 842 which is removably mounted on the shaft 832 as shown in FIGS. 21(A) to 21(C). The bearing member 842 includes a pair of base leaf springs 840 each formed from a leaf spring and serving as a base portion of the bearing member 842, a fitting arm portion 844A formed projectingly at an end of each of the base leaf springs 840 such that it is fitted on the shaft 832 of the pulley 834, and a bearing arm portion 844B provided projectingly at the other end of each of the base leaf springs 840 for supporting the pulley 836 for rotation thereon.

Each of the base leaf springs 840 is formed in an L-shape and applies a biasing force in a direction to move the axes of the pulleys 834 and 836 away from each other to provide a suitable tensile force to the belt 838 wound between and around the pulleys 834 and 836. The biasing forces of the base leaf springs 840 are set so that the base leaf springs 840 may be suitably resiliently deformed artificially in the direction in which the axes of the pulleys 834 and 836 are spaced away from each other.

Figure 22:
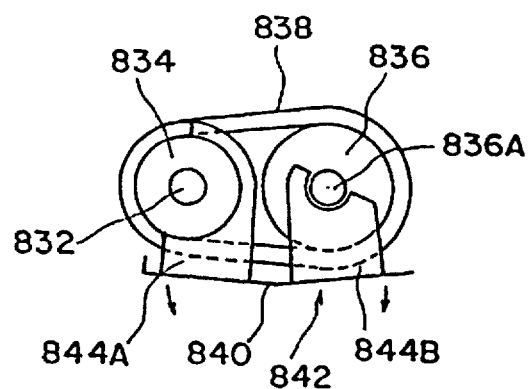
FIG. 22(A) is a side elevational view showing the rotary member of the separation roller system of FIGS. 21(A) to 21(C) in a mounted condition.
FIG. 22(B) is a similar view but showing the rotary member in a removed condition.
Figure 22:
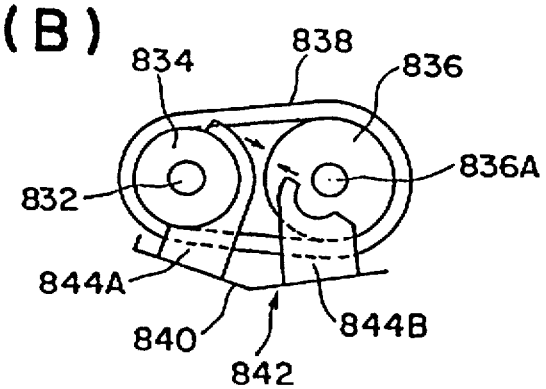

Therefore, if the base leaf springs 840 are resiliently deformed from such a mounted condition as seen in FIGS. 21(A) and 22(A) to such a condition as shown in FIG. 22(B) to move the arm portions 844A and 844B toward each other, then at least one of the arm portions 844A and 844B is removed from the shaft 832 or a shaft portion of the pulley 836 so that the pulley 836 can be removed readily.

On the contrary, in order to mount the pulley 836, the pulley 836 is first positioned in the inside of the belt 838 wound around the pulley 834 as shown in FIG. 22(B), and then the base leaf springs 840 are resiliently deformed to move the arm portions 844A and 844B toward each other, and in this condition, the arm portions 844A and 844B are fitted onto the shaft 832 and a shaft portion 836A of the pulley 836.

As a result, the pulley 836 is mounted in such a manner as shown in FIG. 22(A). In this mounted condition, the base leaf springs 840 exert a resilient force to move the arm portions 844A and 844B away from each other. Meanwhile, the belt 838 acts to restrict such movement of the arm portions 844A and 844B away from each other. Consequently, the pulley 836 is supported on the shaft 832 in a condition wherein the force of the base leaf springs 840 and the force of the belt 838 are balanced with each other. Also the tensile force of the belt 838 is adjusted by the resilient force of the base leaf springs 840.

2—2. Paper Transport Mechanism

A. Paper Transport Path and Paper Transporting Roller System

Referring to FIGS. 7 and 9, the paper transport path 310 is defined by the plurality of paper transporting rollers 320 to 328 and the plurality of idler rollers 330 to 338, sheet guides 700, 710, 740 and 750 provided between adjacent ones of the paper transporting rollers 320 to 328 and between adjacent ones of the idler rollers 330 to 338, and so forth.

The rotary shafts 320A to 324A and 330A to 334A of the rollers 320, 322, 324 and 330, 332, 334 of the paper transport path 310 on the upstream side are disposed along a straight line as viewed from a side and form the inclined transport path 312. Meanwhile, the rotary shafts 324A to 328A and 334A to 338A of the rollers 324, 326, 328 and 334, 336, 338 of the paper transport path 310 on the downstream side are disposed along a curved line as viewed from the side and form the paper reversing transport path 314.

Figure 23:
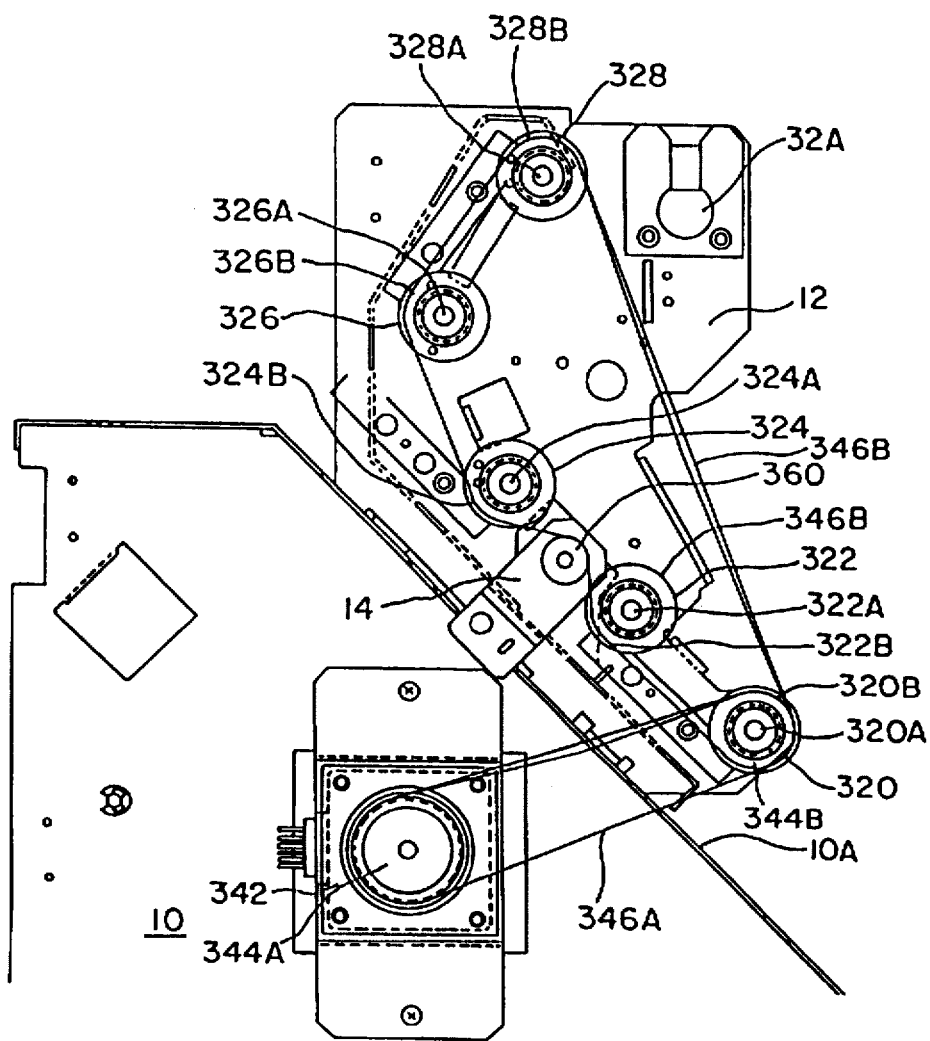
FIG. 23 is a side elevational view of an upper portion of an apparatus body showing the paper transport system of the image reading apparatus of FIG. 4.

The rotary shafts 320A to 328A of the paper transporting rollers 320 to 328 which are driven by the transport roller 342 to rotate to transport a paper sheet are provided on the apparatus body 10 as seen in FIG. 23. In particular, an upper portion 10A of the apparatus body 10 is inclined toward the paper supply hopper 210 side or the paper stacker 510 side (rightwardly in FIG. 23), and a pair of bearing walls 12 are provided uprightly at upper left and right end portions of the body inclined portion 10A. The rotary shafts 320A to 328A of the rollers 320 to 328 are supported on the bearing walls 12.

The paper transporting rollers 320 to 328 are provided on the rotary shafts 320A to 328A described above, respectively. Each of the paper transporting rollers 320 to 328 is provided by a plural number in a suitably spaced relationship from each other on the respective rotary shaft.

Each of the paper transporting rollers 320 to 328 has fine particles of alumina or some other suitable material deposited on part of the surface or the entire surface thereof so that the surface of the roller may have a sufficiently high coefficient of friction.

Also the tension pulley 360 is supported on a bearing member 14 provided projectingly on the apparatus body 10. A pin hole 32A for supporting the apparatus lid 20 for rotation is formed at an upper end portion of each of the bearing walls 12.

Figure 24:
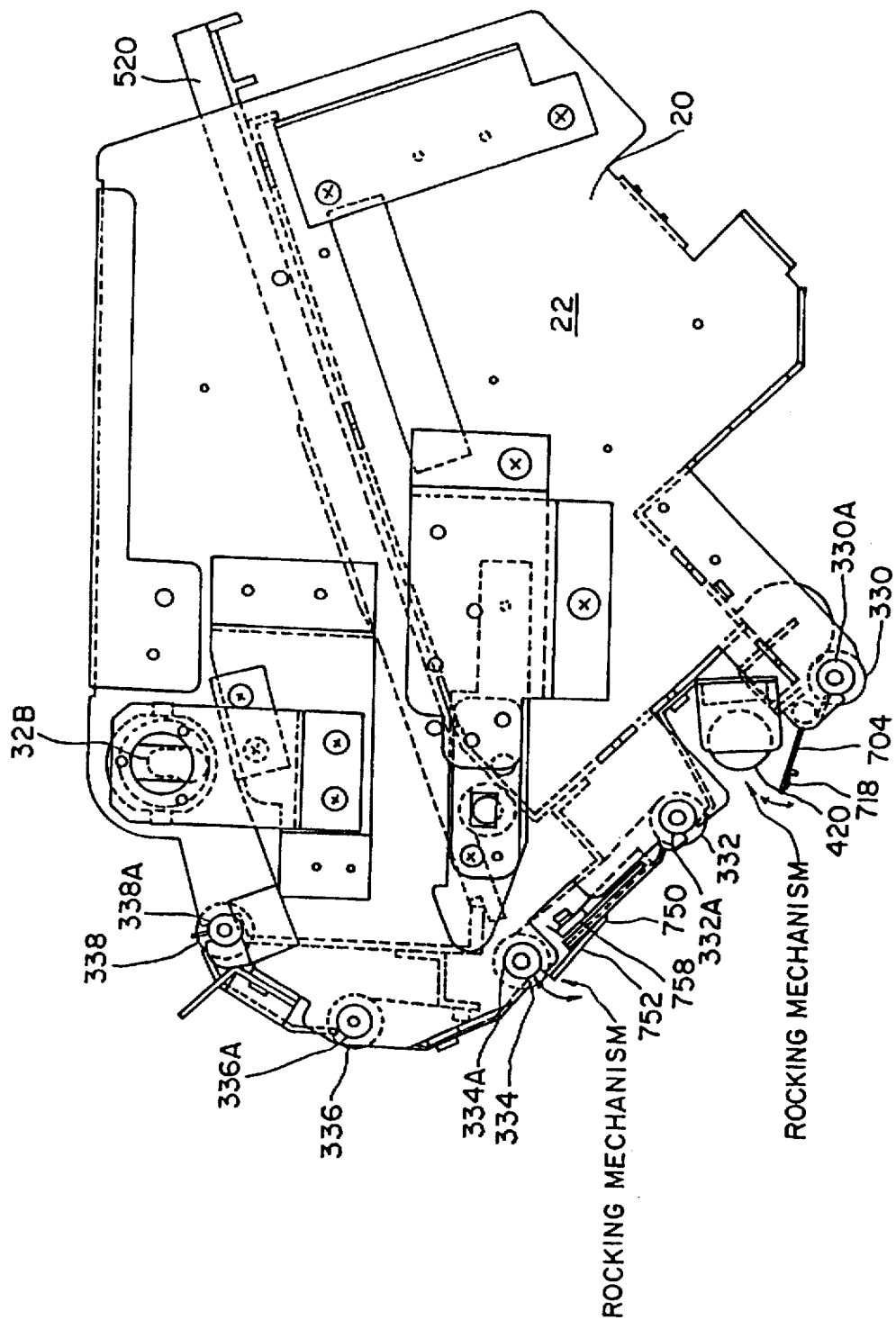
FIG. 24 is a side elevational view of an apparatus lid unit showing the paper transport system of the image reading apparatus of FIG. 4.

In contrast, the idler rollers 330 to 338 are provided on the apparatus lid 20 as seen in FIG. 24. In particular, a pair of walls 22 are provided uprightly at the left and right end portions of the apparatus lid 20, and the rotary shafts 330A to 338A of the idler rollers 330 to 338 are supported at end edges of the walls 22 adjacent the body inclined portion 10A.

Also the idler rollers 330 to 338 are provided on the rotary shafts 330A to 338A in an opposing relationship to the paper transporting rollers 320 to 328, respectively, and each of the idler rollers 330 to 338 is provided by a plural number in a suitably spaced relationship from each other on the respective rotary shaft.

Further, the rotary shafts 330A to 338A are supported by way of resilient members such as leaf springs so that the idler rollers 330 to 338 may be resiliently contacted with the corresponding paper transporting rollers 320 to 328, respectively.

Figure 25:
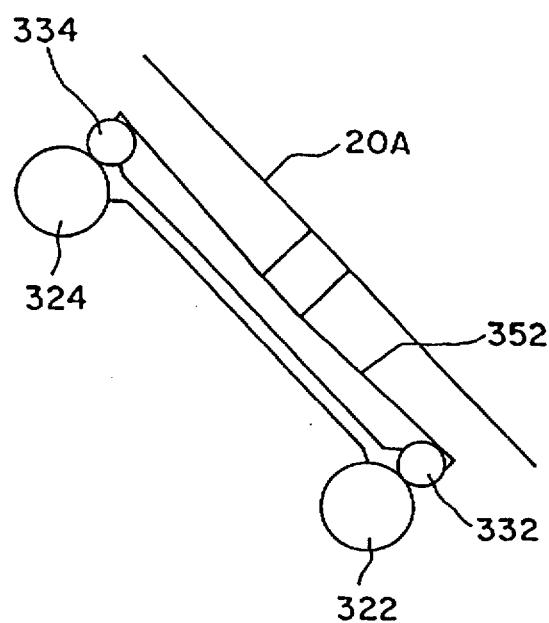
FIG. 25 is a schematic side elevational view showing a roller contacting structure in the paper transport system shown in FIG. 24.

For example, FIG. 25 is a schematic side elevational view showing the supported conditions of the 332 and 334. Referring to FIG. 25, the idler rollers 332 and 334 are supported on a frame 20A of the apparatus lid 20 by way of a leaf spring 352 so that they may be resiliently contacted with the corresponding 322 and 324, respectively.

Since the body-lid locking mechanism 30 for holding the apparatus body 10 and the apparatus lid 20 in a closed condition can hold the closed condition at any of a plurality of stages, the biasing forces of the idler rollers 330 to 338 toward the paper transporting rollers 320 to 328 and the contacting condition between the sheet guides and the auxiliary sheet guides are adjusted by way of the body-lid locking mechanism 30.

A pin 32B is provided at an upper portion of each of the walls 22. The apparatus lid 20 is mounted on the apparatus body 10 with the pins 32B fitted for rotation in the pin holes 32A of the apparatus body 10.

B. Sheet Guide System

The sheet guides 700, 710, 740 and 750 are provided between adjacent ones of the paper transporting rollers 320 to 328 and between adjacent ones of the idler rollers 330 to 338 arranged along the paper transport path 310 and define the paper transport path 310. Within the range of the inclined transport path 312 which extends substantially linearly, the sheet guides 700, 710, 740 and 750 are located below the inclined transport path 312 in the vertical direction, but within the paper reversing transport path 314 which extends along a curve, the sheet guides 700, 710, 740 and 750 are provided at least on the outside of the curved portion of the paper reversing transport path 314. Naturally, sheet guides (which will be referred to as auxiliary sheet guides) are provided at required locations above the inclined transport path 312 in the vertical direction and on the inner side of the curved portion of the paper reversing transport path 314.

For example, such a sheet guide 700 as shown in FIG. 4 is provided in the proximity of an exit of the separation roller 820. The sheet guide 700 is secured to the apparatus body 10 such that it is inclined in conformity with the inclined transport path 312 as shown in FIG. 26(B). Here, the sheet guide 700 is constructed as a sheet guide apparatus 702 which includes an integral auxiliary sheet guide 704 mounted for pivotal motion around a shaft 704A to open or close the sheet guide 700. It is to be noted that L.L in FIG. 26(B) denotes a horizontal line.

The sheet guide 700 and the auxiliary sheet guide 704 are opposed in parallel to each other with guide faces thereof located adjacent each other. However, end portions (left lower ends in FIG. 26(B)) of the sheet guide 700 and the auxiliary sheet guide 704 adjacent the separation roller 820 are bent outwardly from the paper transport path 310 such that they are spaced away from each other to form an opening therebetween so that a paper sheet from the separation roller 820 may be introduced with certainty between the sheet guide 700 and the auxiliary sheet guide 704.

The auxiliary sheet guide 704 is mounted for movement on the shaft 704A such that it is resiliently fixed, during use, at such a closed position in the proximity of the sheet guide 700 as indicated by a solid line in FIG. 26(B), but when not in use, it can be pivoted to its open position spaced away from the sheet guide 700 as indicated by a chain line in FIG. 26(B). In particular, the auxiliary sheet guide 704 includes sheet guide moving away means 760 by which the auxiliary sheet guide 704 can be pivoted from the closed position to the open position so that it is spaced away from the opposing sheet guide 700.

The sheet guide moving away means 760 includes a pair of levers 706 provided integrally at the opposite end portions of the auxiliary sheet guide 704, and a spring mechanism 708 for resiliently fixing the auxiliary sheet guide 704 at the closed position. The spring mechanism 708 is formed as such a center-over or toggle spring that, when the levers 706 shown in FIG. 26(B) are moved a little toward the closed position with respect to an intermediate position or dead center 706A thereof, the spring mechanism 708 exerts a biasing force toward the closed position, but when the levers 706 are moved a little toward the open position with respect to the intermediate location 706A, the spring mechanism 708 exerts a biasing force toward the open position.

Accordingly, the auxiliary sheet guide 704 at the closed position is moved to its open position by moving the levers 706 in the direction indicated by an arrow mark P1 in FIG. 26(B) until they exceed the intermediate position 706A. On the contrary, by moving the levers 706 in the opposite direction indicated by another arrow mark P2 in FIG. 26(B) until they exceed the intermediate position 706A, the auxiliary sheet guide 704 is moved to the closed position and thereafter held at the closed position by the biasing force of the spring mechanism 708.

For example, when paper jamming occurs, the auxiliary sheet guide 704 can be opened in this manner and the paper can be removed readily.

Such sheet guides as described above are located between adjacent ones of the rollers on the paper transport path 310. However, the sheet guides 710 and 740 which are located at the reading points 422 of the optical image reading unit 410 act not only to guide a paper sheet but also to provide a color reference (generally a white reference) for a paper sheet 40 to be read by the optical image reading unit 410.

For example, the sheet guide 710 provided at the reading point 422 of the first optical image reading unit 412 is provided on the opposite side to the first optical image reading unit 412 with respect to the inclined transport path 312 and opposed to the first optical image reading unit 412 as shown in FIGS. 4, 7 and 12. The sheet guide 710 has, at a position opposed to but remote from the reading point 422, a stepped portion 716 by which a backing portion 712 which provides a color reference to a paper sheet 40 is offset with respect to a paper guiding portion 714 for guiding the paper sheet 40.

The reason why the backing portion 712 is offset in this manner is that it is intended to prevent possible soiling to the backing portion 712. In particular, if the backing portion 712 otherwise guides a paper sheet like the paper guiding portion 714, then paper powder of the paper sheet or ink printed on the paper sheet sometimes sticks to soil the backing portion 712, and solving of such paper powder or ink to the backing portion 712, which provides a color reference for a paper sheet 40, results in variation or degradation of the color reference. Thus, in order to eliminate such a possible trouble, the backing portion 712 is offset so that it may not contact directly with a paper sheet.

The sheet guide 710 is resiliently pressed toward the first optical image reading unit 412 while it is contacted with a contacting member 718 (FIG. 32(B)) on the first optical image reading unit 412 so that it is controlled to a predetermined position. By the sheet guide 710 controlled to its appropriate position in this manner, a paper sheet 40 is guided so that it may pass an appropriate position conforming to a focal length of the first optical image reading unit 412. It is to be noted here that the contacting member 718 is provided, as shown in FIG. 32(B), on the fluorescent lamp unit 420 of the first optical image reading unit 412, which will be hereinafter described.

Meanwhile, for example, the sheet guide 740 provided at the reading point 422 of the second optical image reading unit 414 is constructed, as shown in FIGS. 4 and 7, as a sheet guide with an opening provided on the same side as the first optical image reading unit 412 with respect to the inclined transport path 312 and opposed to the second optical image reading unit 414, and has an opening 742 at a location thereof opposing to the reading point 422. A backing member 752 for providing a color reference to a paper sheet 40 is provided in an opposing relationship to the opening 742 at a position corresponding to the reading point 422 on the opposite side to the first optical image reading unit 412 with respect to the inclined transport path 312.

In particular, since the second optical image reading unit 414 is provided below the inclined transport path 312 in the vertical direction, the sheet guide 740 is naturally positioned between the second optical image reading unit 414 and the inclined transport path 312. Accordingly, the sheet guide 740 makes an obstacle to reading of information of the rear face 44 of a paper sheet by the second optical image reading unit 414. Therefore, the sheet guide 740 is formed as a sheet guide with an opening wherein it is removed to open at the portion thereof which makes the obstacle so that it can read information of the rear face 44 of a paper sheet through the opening 742.

The sheet guide sheet guide 740 is constructed, for example, in such a manner as shown in FIGS. 27(A) to 27(C). Referring to FIGS. 27(A) and 27(C), a glass plate 742A is mounted in the opening 742 of the sheet guide 740 so that it may guide a paper sheet being transmitted while information on the rear face of the paper sheet is read through the glass plate 742A. The sheet guide 740 is positioned in register with the reading point 422 of the second optical image reading unit 414 with the opposite ends thereof attached to the apparatus body 10. The sheet guide 740 can be mounted onto and removed from the apparatus body 10 by operation of a pair of lever portions 740A provided at the opposite end portions of the sheet guide 740.

In the mean time, the backing member 752 for providing a color reference to a paper sheet must be provided on the opposite side of the second optical image reading unit 414 with respect to the inclined transport path 312. Here, the backing member 752 is constructed as a portion (accordingly as a backing portion) of the sheet guide 750 opposed to the sheet guide 740.

Figure 28:
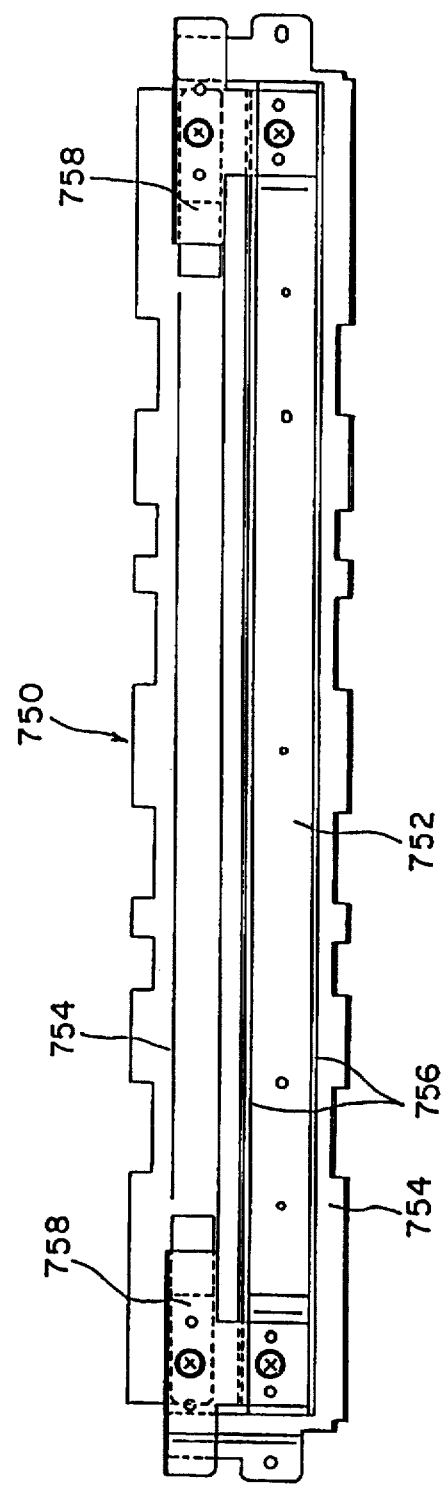
FIG. 28 is a plan view showing the sheet guide system of the paper transport system of FIG. 4.

The sheet guide 750 is constructed, for example, in such a manner as shown in FIG. 28 and is mounted on the apparatus lid 20 such that, as shown in FIG. 24, a downstream side portion (left upper portion in FIG. 24) thereof can be pivoted in a direction toward and away from the inclined transport path 312 around an upstream side portion (right lower portion in FIG. 24) thereof in the paper transporting direction which is secured to the apparatus lid 20. The backing member 752 is offset, similarly to the backing portion 712 of the sheet guide 710, by forming a step 756 on a paper guiding portion 754 for guiding a paper sheet.

A pair of contacting elements 758 each formed from a leaf spring are provided at the opposite ends of an auxiliary sheet guide 746 and resiliently contact with a pair of contacting faces 740B at the opposite ends of the sheet guide 740 (refer to FIGS. 27(A) to 27(C)) to restrict rocking motion of the downstream side portion of the sheet guide 750 in the paper transporting direction. Consequently, the sheet guide 750 is fixed to an appropriate position with respect to the inclined transport path 312 by a resilient biasing force.

It is to be noted that, while the biasing force for contacting each of the sheet guides and an associated auxiliary sheet guide with each other is set to such a low level as will not provide transportation resistance to a paper sheet being transported, it can be adjusted in a similar manner to the biasing forces between the rollers 330 to 338 and the rollers 320 to 328 by adjusting the closed condition between the apparatus body 10 and the apparatus lid 20 by way of the body-lid locking mechanism 30 described hereinabove.

C. Paper Discharge Roller Mechanism

Figure 29:
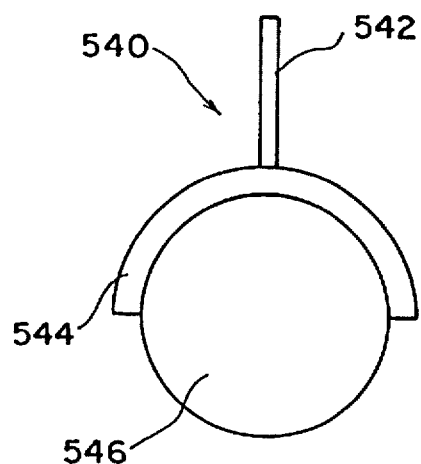
FIG. 29 is a schematic side elevational view showing a paper discharge roller mechanism in the paper transport system of FIG. 4.

The paper discharge roller mechanism 540 is provided at a trailing end portion of the paper transport mechanism 300 as described hereinabove and includes, as shown in FIG. 29, a paper discharge roller 544 mounted on a rotary shaft 546 which receives and is rotated by a driving force. Here, the rotary shaft 328A of the paper transport roller 328 serves also as the rotary shaft 546 of the paper discharge roller 544, and driving of the paper discharge roller 544 is performed together with driving of the paper transport roller 328 by the roller driving mechanism 340.

The paper discharge roller 544 is provided between each adjacent ones of a plurality of paper transport rollers 328 disposed in a suitably spaced relationship from each other on the rotary shaft 328A.

The paper discharge roller 544 has an outwardly projecting projection 542 which is in the form of a tab extending outwardly from an outer periphery of the paper discharge roller 544 and formed from such a resilient flexible material as to allow the projection 542 to be yieldably deformed when it is contacted by the opposing idler roller 338.

Figure 30:
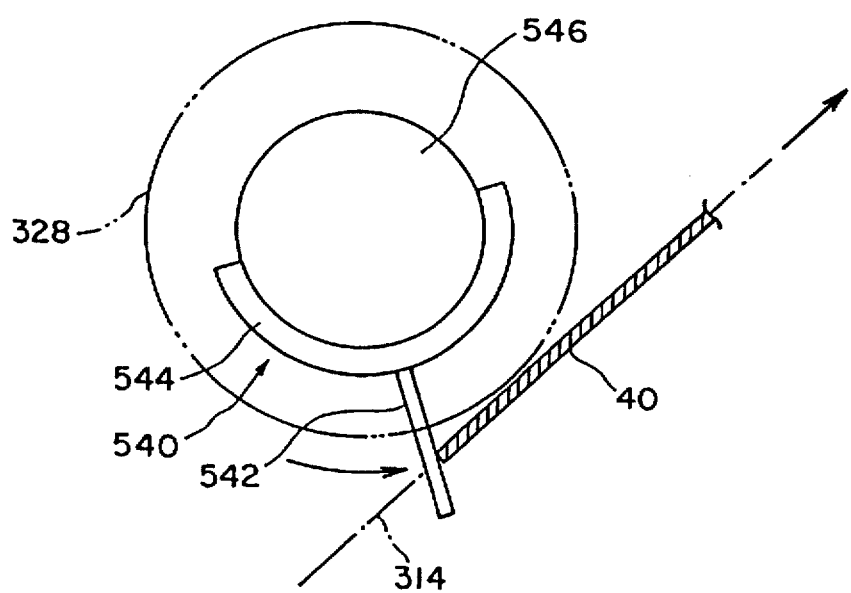
FIG. 30 is a schematic side elevational view illustrating a movement of the paper discharge roller mechanism shown in FIG. 29.

As shown in FIG. 30, when it projects toward the paper reversing transport path 314 of the paper transport path 310, it pushes up the trailing end of a paper sheet 40 being transported along the paper reversing transport path 314 to guide the paper sheet 40 being discharged to the paper stacking mechanism 500.

2-3. Image Reading Mechanism

Figure 31:
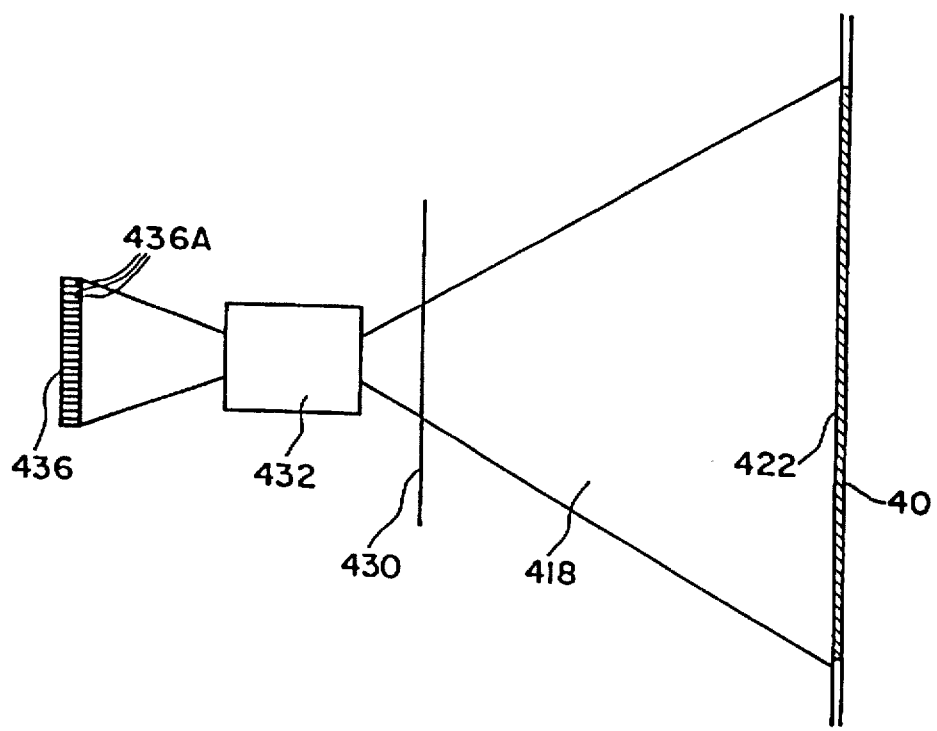
FIG. 31 is a diagrammatic view schematically showing the construction of an optical image reading mechanism of the image reading apparatus of FIG. 4.

The light path 418 from the reading point 422 to the CCD circuit board 336 in the optical image reading unit 410 is schematically shown in FIG. 31 in such a manner that expansion of the light path 418 in the widthwise direction of a paper sheet may be seen omitting the reflections by the mirrors 418A, 418B and 418C and representing the light path 418 generally as a straight line. Referring to FIG. 31, pieces of image information arranged in the widthwise direction of a paper sheet 40 are collected by the lens 432 and come to the CCD circuit board 436. The CCD circuit board 436 is constituted from a plurality of CCD cameras 436A arranged in a juxtaposed relationship to each other so as to catch the pieces of information arranged in the widthwise direction.

The shading plate 430 located forwardly of the lens 432 corrects the image information since the image information is distorted by a greater amount toward the opposite left and right ends 40A and 40B of the paper sheet 40.

The CCD cameras 436A are located in a black box 434 and are controlled by respective CCD drivers to put video gates thereof not shown into an on-state to detect information. The CCD cameras 436A stop detection of image information by putting the video gates into an off-state. The thus detected image information is set to and processed by a video circuit not shown provided on the video circuit board 438. It is to be noted that the on/off control of the video gates is performed in response to detection of passage of a paper sheet by the transport sensor 616 which detects a reading timing.

Image information obtained by the optical image reading units 412 and 414 in this manner is extracted under the control of the image information extraction control means 440 as seen from FIG. 7. In this instance, the image information extraction control means 440 performs extraction control of image information in response to detection by paper end detection means 450. In particular, the paper end detection means 450 detects a leading end 46 from an amount of variation of the output of the optical image reading unit 410 and is provided in the image information extraction control means 440. Extraction of image information is performed when the leading end 46 of a paper sheet 40 advances into the optical image reading unit 410.

Further, in the image reading apparatus of the present embodiment, since the two optical image reading units 412 and 414 are provided near to each other, image reading may possibly be performed simultaneously by the two units optical image reading units 412 and 414. Therefore, the image information extraction control means 440 controls so that information from the second optical image reading unit 414 which reads information of the rear face of a paper sheet is stored once into a buffer storage apparatus of a reading board 984 (refer to FIG. 37) and is then recalled from the buffer storage apparatus after information of the front face of the paper sheet from the first optical image reading unit 412 is sent out.

The image information extraction control means 440 is further constructed such that extraction control of image information obtained by the first optical image reading unit 412 and the second optical image reading unit 414 is performed in response to a result of selection by an original selection switch 924L serving as paper reading selection means which will be hereinafter described and a discrimination mark 50 applied to a paper sheet 40.

Figure 13:
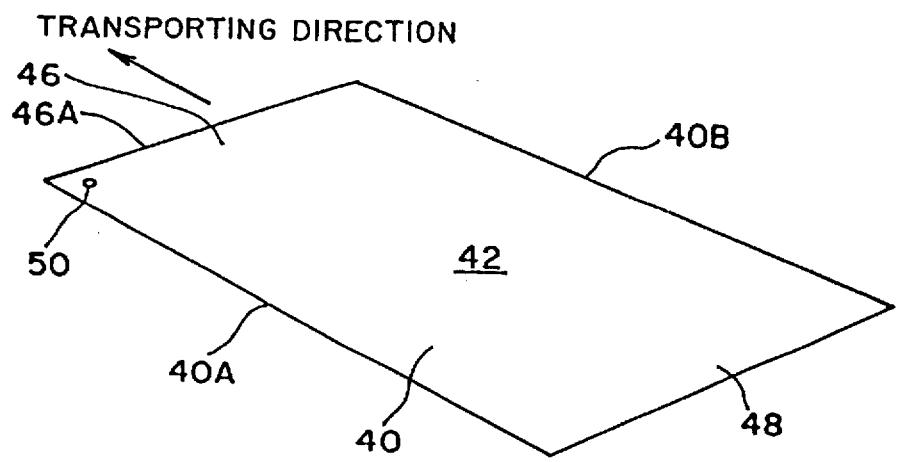
FIG. 13 is a schematic perspective view of a paper sheet employed in the image reading apparatus of FIG. 4.

In particular, it can be selected by the original selection switch 924L whether both face reading should be performed or one face reading should be performed, and the image information extraction control means 440 performs reading control in response to a result of the selection by the original selection switch 924L. However, paper sheets which require both face reading and paper sheets which allow one face reading may possibly be present in a mixed condition. In this instance, when paper sheets should be read in a different manner from other paper sheets in which the paper sheets are mixed, a discrimination mark 50 is applied to each of the paper sheets so that they may be read in a different manner. The discrimination mark 50 is provided for discrimination whether the paper sheet should be read by one face reading or by both face reading, and is applied to a location outside an original reading area such as, for example, a corner of the leading end of the paper sheet 40 as shown in FIG. 13 so that it may be distinguished from image information in the original reading area which should originally be read.

Therefore, for example, when one face reading originals are mixed in both face reading originals, if a discrimination mark 50 which designates one face reading is applied to each of the one face reading originals the quantity of which is smaller than that of the both face reading originals and it is selectively set by way of the original selection switch 924L that both faces of each paper sheet 40 should usually be read, then image information on both faces of a paper sheet 40 is normally read by both of the first optical image reading unit 412 and the second optical image reading unit 414. However, when a discrimination mark 50 is detected, image information only on the front face or the rear face of the paper sheet 40 is read by the first optical image reading unit 412 or the second optical image reading unit 414.

On the contrary, when both face reading originals are mixed in one face reading originals, if a discrimination mark 50 which designates double face reading is applied to each of the double face reading originals the quantity of which is smaller than that of the one face reading originals and it is selectively set by way of the original selection switch 924L that one face of each paper sheet 40 should usually be read, then image information only on the front face or the rear face of a paper sheet 40 is normally read by the first optical image reading unit 412 or the second optical image reading unit 414. However, when a discrimination mark 50 is detected, image information on the both faces of the paper sheet 40 is read by both of the first optical image reading unit 412 and the second optical image reading unit 414.

The image information extraction control means 440 further includes discrimination mark image erasure means 460 so that the image of such discrimination mark 50 applied to a paper sheet 40 may be erased and only image information to be read originally may be outputted.

By the way, the apparatus body 10 or the apparatus lid 20 assures an upper mounting space (space for the front face reading unit) 26 and a lower mounting space (space for the rear face reading unit) 16 having substantially similar sizes and shapes to each other to allow the optical image reading units 412 and 414 to be mounted in them, respectively (refer to FIG. 4). In the meantime, the optical image reading unit 410 is prepared by a plural number having different specifications having different performances but having substantially common sizes and profiles.

While, in the image reading apparatus of the present embodiment, the first optical image reading unit 412 and the second optical image reading unit 414 are constructed with common specifications, it is easy to construct the first optical image reading unit 412 and the second optical image reading unit 414 so as to have different specifications such that, for example, the optical image reading unit for front face reading of the construction described above has higher performances than the optical image reading unit for rear face reading of the construction described above.

Further, each of the optical image reading units 410 includes detection means (front/rear face detection means) 630 which can detect that it is installed as a unit for front face reading when it is installed in the upper mounting space 26 but detect that it is installed as a unit for rear face reading when it is installed in the lower mounting space 16.

Information detected by the detection means 630 is sent to the image information extraction control means 440 and used for extraction control of image information.

It is to be noted that the detection means 630 may be constructed in the following manner. For example, a front surface detection projection (not shown) is provided only in the upper mounting space 26 while a rear face detection projection (not shown) is provided only in the lower mounting space 16, and a front face detection switch (not shown) which is automatically contacted, when it is installed in the upper mounting space 26, by the front face detection projection to switch to an on-state and a rear face detection switch (not shown) which is automatically contacted, when it is installed in the lower mounting space 16, by the rear face detection projection to switch to an on-state are provided on each of the optical image reading units 410.

By the way, in each of the optical image reading units 410, the fluorescent lamp unit 420 is provided in order to make the reading point 422 light. The fluorescent lamp unit 420 is constructed, for example, in such a manner as shown in FIGS. 32 and 33.

In particular, the fluorescent lamp unit 420 includes a mounting base 424 and a fluorescent lamp 426 mounted on the mounting base 424. As shown in FIG. 32, a pair of sockets 424A are provided projectingly at the opposite ends of the mounting base 424, and the mounting base 424 is mounted on and between the sockets 424A. The mounting base 424 itself is mounted in an inclined relationship to the inclined transport path 312 as seen in FIG. 33 to assure the light path 418 to the CCD cameras 436A.

Figure 33:
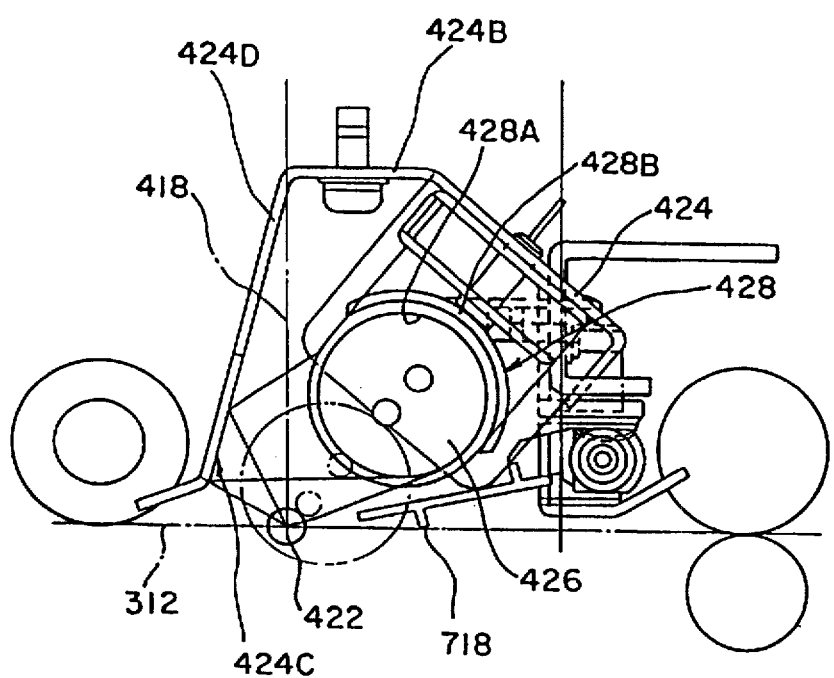
FIG. 33 is a side elevational view showing the fluorescent lamp unit shown in FIGS. 32(A) and 32(B)

A heater 428 is provided along the rear face of the fluorescent lamp 426 and covers over the fluorescent lamp 426 as seen in FIG. 33. The inner face of the heater 428 adjacent the fluorescent lamp 426 is formed as a reflection plate 428A which converges light of the fluorescent lamp 426 to the reading point 422, and a heat generation element 428B is provided on the rear face side of the heater 428. Generally, since the fluorescent lamp 426 does not emit much light at a low temperature, it cannot illuminate the reading point 422 sufficiently until the fluorescent lamp 426 becomes warm after it is started. However, with the present fluorescent lamp unit 420, since the fluorescent lamp 426 is warmed up by the heat generation element 428B, after it is started, the fluorescent lamp 426 becomes warm rapidly and can illuminate the reading point 422 with a sufficient amount of light.

A lamp house 424B is provided on the mounting base 424 adjacent the light path 418 such that it covers over the fluorescent lamp 426, and the inner face of the lamp house 424B is formed as a reflection plate 424C which converges light of the fluorescent lamp 426 to the reading point 422. Naturally, the lamp house 424B has a slit 424D formed therein so that it does not intercept the light path 418.

Further, the contacting member 718 mentioned hereinabove is mounted and resiliently supported on the mounting base 424 adjacent the inclined transport path 312 such that it may be rocked toward the inclined transport path 312. The contacting member 718 restricts the sheet guide 710 to a predetermined position as described hereinabove, and a face of the contacting member 718 adjacent the fluorescent lamp 426 functions also as a reflection plate which reflects light of the fluorescent lamp 426 so that the light may not be projected other than to the reading point 422.

2-4. Stacking Mechanism

Figure 34:
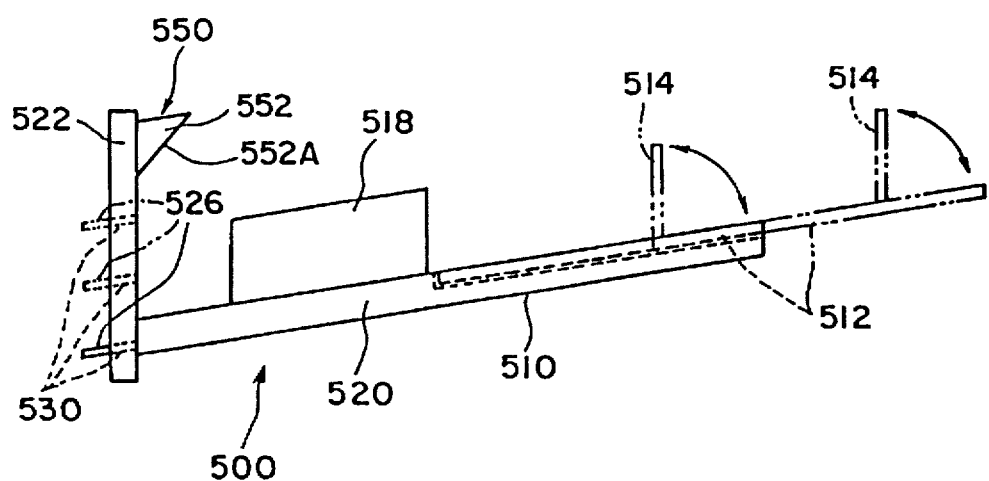
FIG. 34 is a schematic side elevational view showing a stacker mechanism of the image reading apparatus of FIG. 4.
Figure 35:
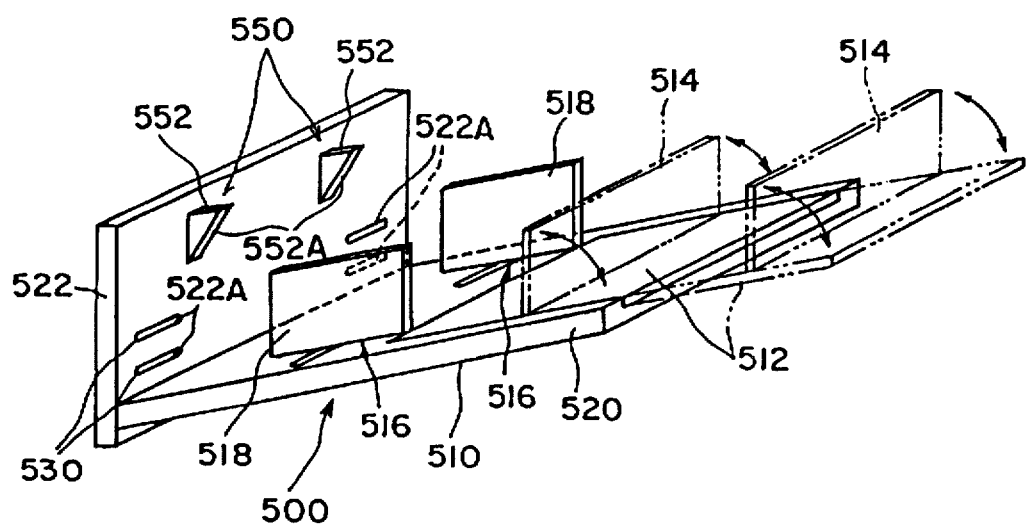
FIG. 35 is a schematic perspective view showing the stacker mechanism shown in FIG. 34.

Referring now to FIGS. 34 and 35, the paper stacker 510 of the paper stacking mechanism 500 includes a stacker table 520 at the bottom thereof and further includes an end frame 522 at an interior end thereof from which a paper sheet 40 is discharged. A pair of paper trailing end guide members 552 which constitute a paper trailing end guide mechanism 550 are provided projectingly at upper portions of the end frame 522.

The paper trailing end guide members 552 guide, at guide faces 552A thereof, the trailing end 48 of a paper sheet 40 to be stacked into the paper stacker 510 so that paper sheets 40 may be stacked in a predetermined posture on the stacker table 520.

A paper stacker position variation mechanism 530 is provided on the stacker table 520 so that the vertical position of the stacker table 520 may be adjusted. Here, while the stacker table 520 is mounted on the end frame 522, the paper stacker position variation mechanism 530 is constructed so that the vertical position of the stacker table 520 may be adjusted by removing and mounting the stacker table 520 from and onto the end frame 522.

In particular, pairs of left and right fitting projections 526 are formed at a front end (paper discharging side end) of the stacker table 520 while pairs of left and right insertion holes 522A are formed in the end frame 522 corresponding to the fitting projections 526. Then, the stacker table 520 is mounted onto the end frame 522 by inserting the fitting projections 526 into the insertion holes 522A, but the stacker table 520 is removed from the end frame 522 by pulling off the fitting projections 526 from the insertion holes 522A.

The paper stacker position variation mechanism 530 is constituted from such mounting structure of the stacker table 520 and the structure including the plurality of (three in the arrangement shown) left and right pairs of insertion holes 522A. In particular, the vertical position of the stacker table 520 can be adjusted by selectively inserting the fitting projections 526 into the insertion holes 522A provided at the different heights.

The stacker table 520 further includes a slide element 512 provided thereon for sliding movement in the paper discharging direction, and a paper stopper 514 is mounted for up and down pivotal motion on the slide element 512.

The paper stopper 514 is located at a paper discharging side end portion of the stacker table 520 and prevents, when it is at an uprightly pivoted position as indicated by chain lines in FIG. 35, the stacked paper sheets 40 from moving in the discharging direction. When such prevention of movement of the paper sheets is not required, the paper stopper 514 will be pivoted down so that the stacker table 520 can be used wide.

Further, if the paper sheets have a great length in the discharging direction, then the slide element 512 will be drawn out as indicated by chain lines in FIG. 35 so that the stacker table 520 may present a greater area. Also in this instance, if the paper stopper 514 is pivoted to the upright position, movement of the paper sheets is prevented by the paper stopper 514, but when it is not particularly necessary to prevent movement of the paper sheets, the paper stopper 514 will be pivoted down to its horizontal position so that the stacker table 520 may be used with a wider area.

The stacker table 520 further has a pair left and right slide elements 516 mounted thereon for sliding movement in the paper width direction, and a paper stopper 518 is mounted for up and down pivotal motion on each of the slide elements 516. Thus, by moving the slide elements 516 to adjust the paper stoppers 518 to the width of a paper sheet 40, also the position in the widthwise direction of a discharged paper sheet is controlled appropriately. Naturally, if the width of the paper sheet 40 is so large that movement of the slide elements 516 to maximum limit positions does not allow accommodation of the paper sheet 40 between the left and right paper stoppers 518, the paper stoppers 518 will be pivoted down so that the maximum width of the stacker table 520 may be utilized. In this instance, wall faces 24 (refer to FIG. 5) of the apparatus lid which are provided uprightly on the opposite sides of the stacker table 520 control the position of a paper sheet in the widthwise direction in place of the left and right paper stoppers 518.

2-5. Control System

A. Operation Panel

Figure 36:
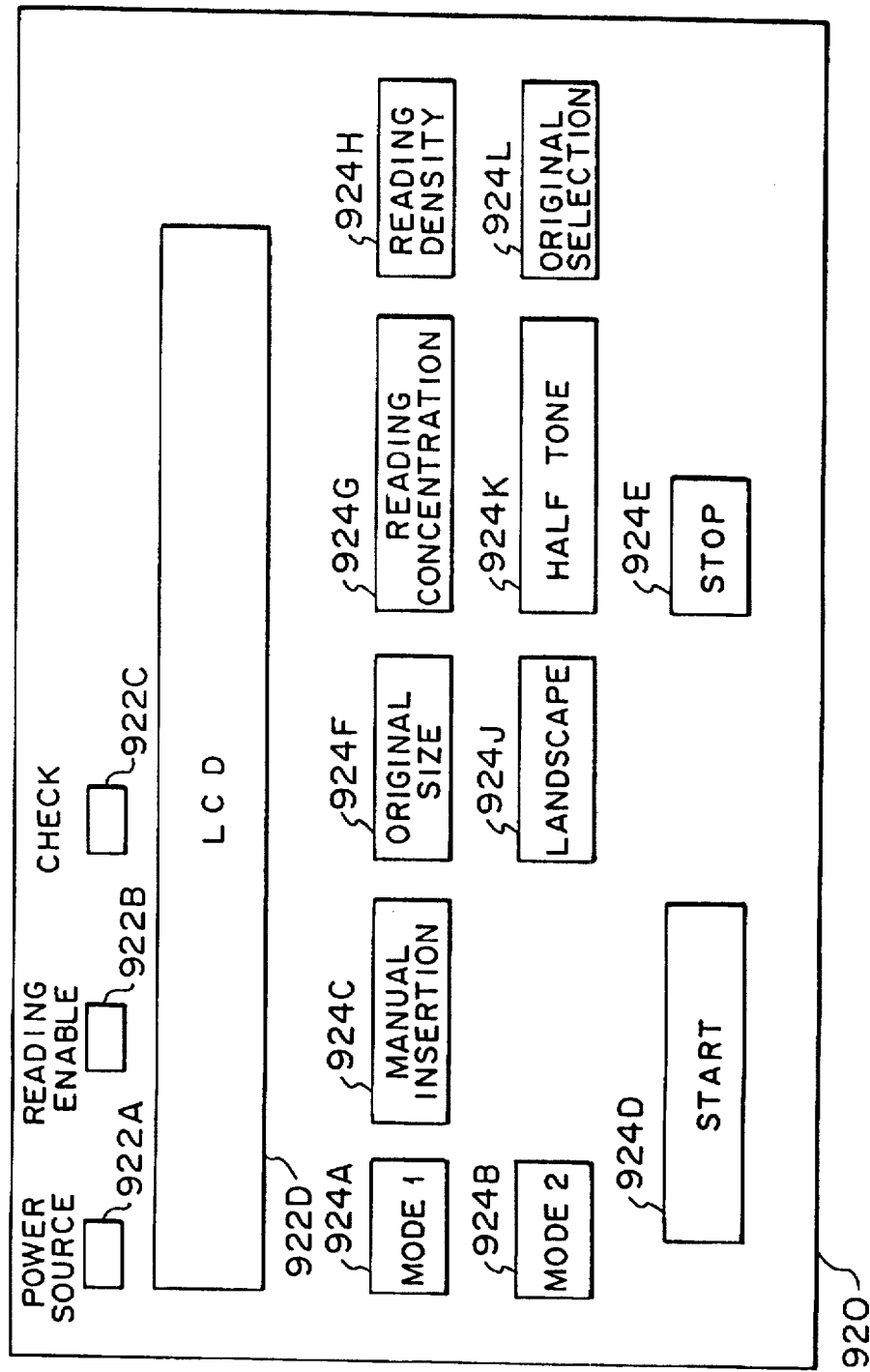
FIG. 36 is a front elevational view showing an operation panel of the image reading apparatus of FIG. 4.

Referring now to FIG. 36, the operation panel 920 has provided thereon various indication lamps including a power source input indication lamp 922A, a reading enable indication lamp 922B and a check lamp 922C, and a liquid crystal display unit 922D for displaying various information by characters. The liquid crystal display unit 922D suitably displays, for example, information of an operation input, an error message, and so forth.

The operation panel 920 further has provided thereon a plurality of automatic reading mode setting switches 924A and 924B each serving as insertion mode selection means for selectively setting one of a plurality of (two including a mode 1 and a mode 2 here) automatic reading modes, a manual insertion mode setting switch 924C serving as insertion mode selection means for setting a manual insertion mode, a start switch 924D for starting the image reading apparatus in an automatic reading mode, and a stop switch 924E for stopping the image reading apparatus.

It is to be noted that the mode 1 and the mode 2 are different, for example, in terms of the transport speed (reading speed). When automatic reading should be performed, the mode 1 or the mode 2 will be selected first, and then the start switch 924D will be depressed to start the image reading apparatus. However, for manual insertion, the manual insertion mode setting switch 924C will be depressed to start the image reading apparatus.

The operation panel 920 further has provided thereon an original size inputting switch 924F, a reading concentration setting switch 924G, a reading density setting switch 924H, a landscape switch 924J, a half tone setting switch 924K, and the original selection switch (paper reading selection means) 924L. The original selection switch 924L is a switch by which it can be set whether both face reading of an original should be performed or one face reading only of the front face or the rear face should be performed.

B. General Construction of the Control System

Figure 37:
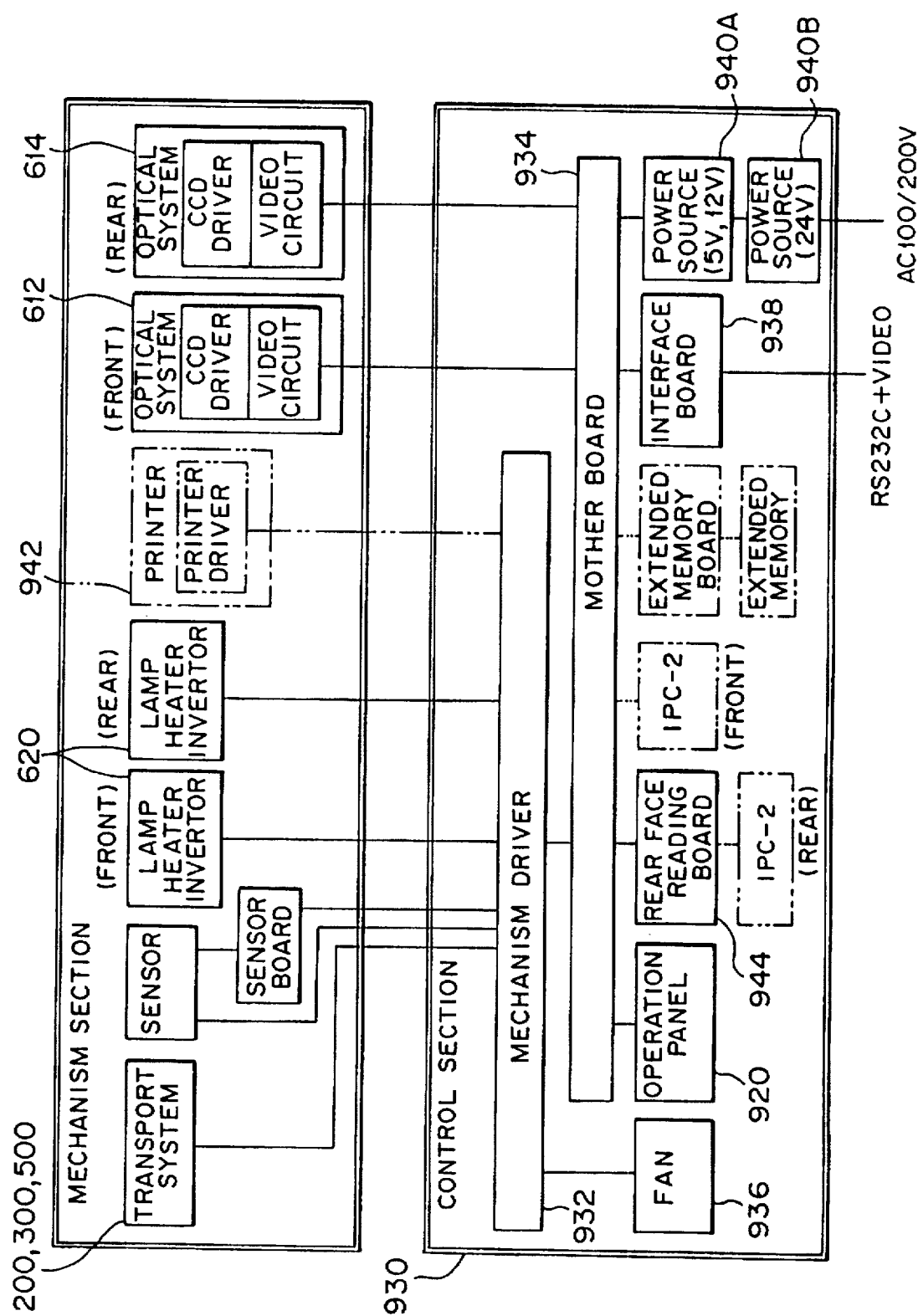
FIG. 37 is a block diagram schematically showing the construction of the image reading apparatus of FIG. 4.
Figure 38:
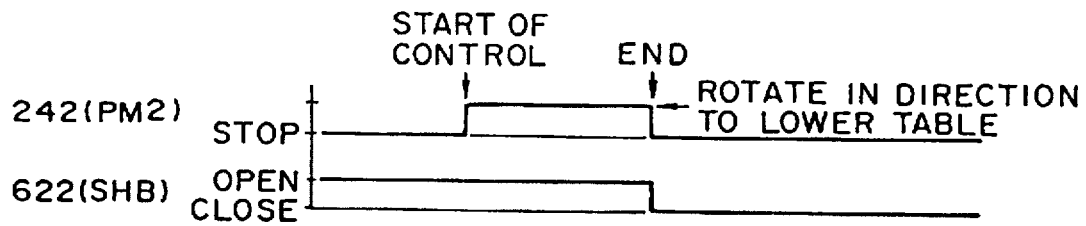
FIG. 38 is a sequence diagram illustrating initialization operation of a hopper system of the image reading apparatus of FIG. 4.

Referring now to FIG. 37 which schematically shows the mechanical components described above and control sections for controlling the mechanical components, a control section 930 includes a mechanical section control means (mechanism driver) 932 including a control circuit for controlling mechanical operations of the mechanical components, and image reading system control means (mother board) 934 including a control circuit for controlling operation of the image reading system. A pair of power source adjustment sections 940A and 940B for transforming an external power source to required voltages are connected to the image reading system control means 934.

The mechanical section control means 932 controls operation of the transport systems (that is, the paper supply mechanism 200, the paper transport mechanism 300, the paper stacking mechanism 500 and so forth) and the heater 428 of the fluorescent lamp unit 420 and an invertor of the fluorescent lamp 426 in accordance with an instruction signal received by way of the image reading system control means 934 and detection information from the various sensors of the mechanical components. The mechanical section control means 932 also controls operation of a cooling fan 936 for the control section 930 itself. The paper supply hopper position control means (motor control means) 280, the pick clutch control means 250 serving as paper supply roller driving mechanism control means, the separation clutch control means 858 and the roller driving mechanism control means 350 described hereinabove are included in the mechanical section control means 932.

The image reading system control means 934 controls operation of CCD driver units of the first optical image reading unit 412 and the second optical image reading unit 414, a video circuit and a rear face reading board 944 and outputting to an outputting interface board 938 in response to setting information of the operation panel 920 and information from the mechanical section control means 932. The image information extraction control means 440, the paper end detection means 450 and the discrimination mark image erasure means 460 described hereinabove are provided in the image reading system control means 934.

Thus, the paper supply hopper position control means 280, the pick clutch control means 250, the separation clutch control means 858 and the roller driving mechanism control means 350 perform various controls in a synchronized relationship with a control timing of the image information extraction control means 440 by way of the mechanical section control means 932 and the image reading system control means 934.

Where an endorser (endorsing printer) 942 is provided in the proximity of the terminal end of the paper transport path 310 as shown in FIG. 7, also a driver for the endorser 942 is controlled by the image reading system control means 934 as seen from FIG. 37. Also where an extension memory board and/or an auxiliary printed circuit board (IPC-2) are provided, they are controlled by the image reading system control means 934.

3. Operation

The image reading apparatus constructed in such a manner as described above operates in the following manner.

Operations of the hopper motor 242, the pick clutch 238, the separation clutch 854 and the transport motor 342 and control by the image information extraction control means 440 proceed, for example, in such a manner as illustrated in time charts of FIGS. 38 to 43.

First, control of the hopper motor 242 will be described. Upon starting of the control, control of an initialization mode is performed as seen from FIG. 38. In particular, in response to an operation starting instruction (that is, a control starting instruction) for the image reading apparatus such as, for example, throwing in of a power source to the apparatus, the hopper motor 242 is rotated in a direction to lower the hopper table 212. Then, when the hopper table 212 comes to its lowermost position, the bottom sensor 622 switches from an off-state (open) to an on-state (closed), and the hopper motor 242 stops in response to such detection signal of the bottom sensor 622. Naturally, the control is not performed if, upon reception of the control starting instruction, the hopper table 212 is already at the lowermost position and the bottom sensor 622 is in an on-state (closed).

The control of the hopper motor 242 after this is different between an automatic reading mode and the manual insertion mode in response to setting information of the switches.

Figure 39:
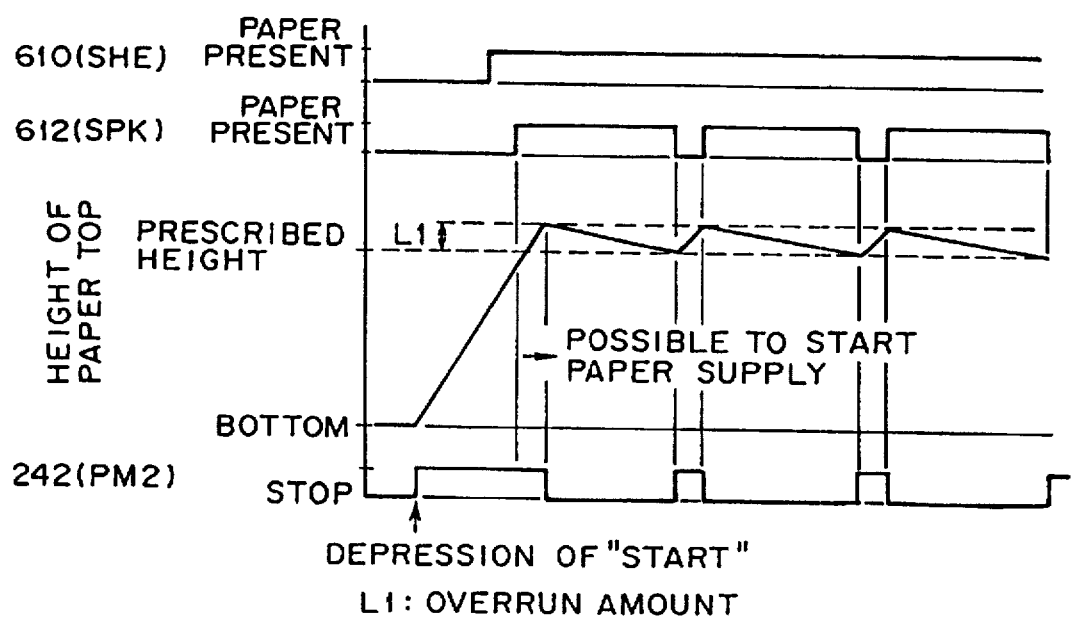
FIG. 39 is a sequence diagram illustrating operation of the hopper system in an automatic reading mode.

In particular, if paper sheets 42 are accommodated into the hopper table 212 and an automatic reading mode is selected and then a starting operation (depression of the start button) is performed, then the hopper motor 242 is rotated in a direction to raise the hopper table 212 as seen from FIG. 39. Then, when the top of the paper sheets 40 in the hopper table 212 rises from a position (bottom position) corresponding to the lowermost position of the hopper table 212, whereupon the hopper empty sensor 610 is turned on ("presence of a paper sheet"), to a prescribed height at which the paper supply sensor 612 is turned on ("presence of a paper sheet").

When the hopper table 212 is raised by an overrun amount $L_1$ i after the paper supply sensor 612 is turned on, the hopper motor 242 is stopped. Thereafter, image reading is performed while paper supplying and transporting operations, which will be hereinafter described, are performed. During the process, as the paper sheets 40 are supplied, the height of the top of the stack of paper sheets 40 decreases. Consequently, the paper supply sensor 612 is turned off finally, and in response to this, the hopper motor 242 is rotated in the direction to raise the hopper table 212.

Then, as the height of the top of the stack of paper sheets 40 in the hopper table 212 rises again, it finally reaches the prescribed height, whereupon the paper supply sensor 612 is turned on ("presence of a paper sheet"). While such a sequence of operations as described above is repeated to control the height of the top of the paper sheets within a fixed range (within the range of the overrun amount $L_1$), image reading operation is performed together with paper supplying and transporting operations.

Figure 40:
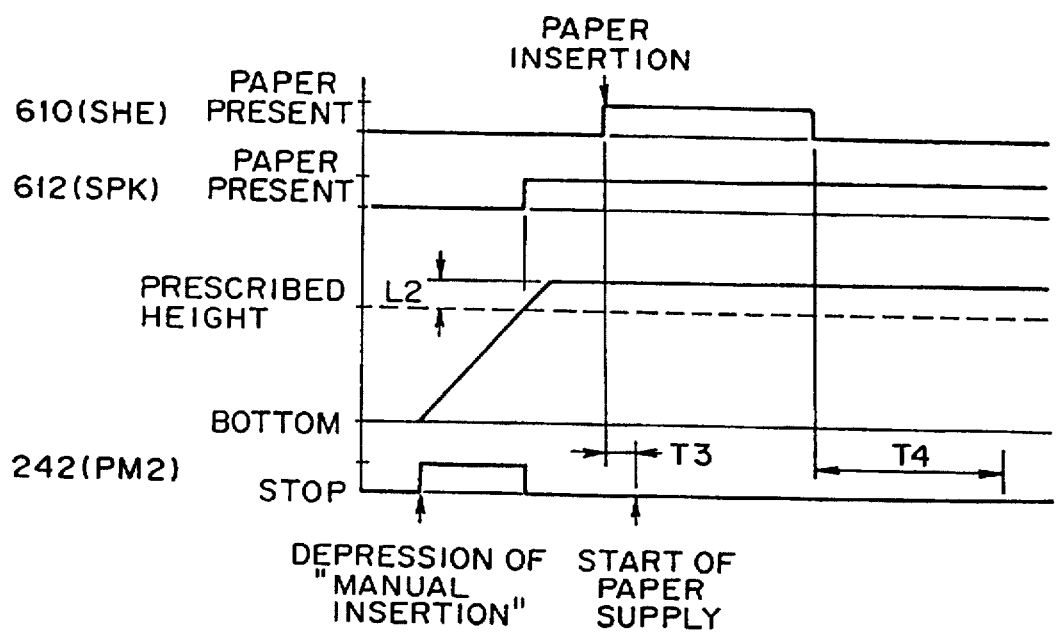
FIG. 40 is a sequence diagram illustrating operation of the hopper system in a manual insertion mode.

On the other hand, if a switch operation for the manual insertion mode (depression of the manual insertion button) is performed, then the hopper motor 242 is rotated in the direction to raise the hopper table 212 as seen from FIG. 40. Then, when the hopper table 212 is raised until the height of the top end thereof comes to a prescribed height, then the paper supply sensor 612 is turned on ("presence of a paper sheet"). When the hopper table 212 is further raised a little by an overrun amount $L_2$ after the paper supply sensor 612 is turned on, the hopper motor 242 is stopped. Thereafter, the hopper motor 242 is kept stopped and the hopper table 212 keeps the position. Then, manual insertion of a paper sheet is performed as can be seen also from an on/off condition of the hopper empty sensor 610.

Subsequently, operations of the pick clutch 238, the separation clutch 854 and the transport motor 342 and control by the image information extraction control means 440 will be described together with operation of the hopper motor 242. Referring to FIG. 41, paper sheets 40 are first accommodated into the paper supply hopper 210 and a read command to instruct starting of image reading is developed (point T1). At this initial stage, since the paper supply hopper 210 is not at the paper supply position, the paper supply sensor 612 is in an off-state. The hopper empty sensor 610 also provides a signal indicating absence of a paper sheet.

Since the paper supply sensor 612 is in an off-state, the hopper motor 242 is rendered operative to raise the paper supply hopper 210 to the paper supply position (point T2). Consequently, the paper supply sensor 612 is turned on. As a result, the hopper motor 242 is stopped, and the pick clutch 238 and the separation clutch 854 are engaged. Thereafter, the transport motor 342 is started (point T3) after a small time lag (30 ms in the example shown) until the pick clutch 238 and the separation clutch 854 are engaged firmly. By the operation of the transport motor 342, the pick rollers 220 and the separation roller 820 are rotated by way of the pick clutch 238 and the separation clutch 854 to supply and transport a first paper sheet 40.

The transport motor 342 can be selectively set to one of a low speed mode of a velocity Vi (for example, 12 to 13 cm/s), a high speed mode of another velocity V2 (for example, about 50 cm/s) and an intermediate speed or mid speed mode of an intermediate velocity. For the first paper sheet upon starting of paper supply, the transport motor 342 operates in the low speed mode. Accordingly, also the transportation speeds of the pick rollers 220 and the separation roller 820 are low.

When the leading end of the paper sheet 40 being transported in this manner passes the transport sensor 614, the transport sensor 614 detects this and is turned on (point T4), and the pick clutch 238 is disengaged. At this point of time, the paper sheet 40 is already at a position at which it can be driven by the separation roller 820, and consequently, the paper sheet 40 is thereafter driven by the separation roller 820.

Then, when the leading end of the paper sheet 40 being transported passes the transport sensor 616, the transport sensor 616 detects this and is turned on (point T5), and the separation clutch 854 is disengaged. At this point of time, the paper sheet 40 is already at a position at which it can be driven by the transport roller 320, and consequently, the paper sheet 40 is thereafter driven by the transport roller 320. Thereafter, the paper sheet 40 is successively driven by the succeeding transport rollers 322 to 328. At the point of time T5, since the transport motor 342 is in the low speed mode, the transportation velocity of the transport roller 320 itself is low.

The transport sensor 616 serves also as a sensor for detecting a reading timing, and when the passagee of the leading end of the paper sheet 40 is detected by the transport sensor 616, a read command is developed in response to the detection (point T6). Upon reception of the read command, the transport motor 342 is accelerated from the low speed mode (velocity $V_1$) to the high speed mode (velocity $V_2$). Accordingly, also the speed of rotation of the transport rollers 320 to 328, that is, the transportation speed, increases until high speed transportation is reached.

Then, at a point of time T7 after lapse of a predetermined time $t_3$ after the leading end of the paper sheet 40 passes the transport sensor 616, the first optical image reading unit 412 for reading information of the front face of the paper sheet 40 is put into a reading condition (that is, a video gate on-state). Thereafter, at another point of time T8 after lapse of another predetermined time $t_4$ after the leading end of the paper sheet 40 passes the transport sensor 616, the second optical image reading unit 414 for reading information on the rear face of the paper sheet 40 is put into a reading condition (that is, a video gate on-state).

It is to be noted that the predetermined times $t_3$ and $t_4$ are times required for a paper sheet to pass from the transport sensor 616 to the reading points 412A and 414A of the optical image reading units 412 and 414, respectively, and are given, from the distances $L_1$ and $L_2$ from the transport sensor 616 to the reading points 412A and 414A and the transportation speed $V_2$ by the transport roller 320, by the following equations, respectively;

$$t_3 = L_1/V_2, \quad t_4 = L_2/V_2$$

During such image reading (at points of time T9 and T10), the transport sensors 614 and 616 are switched from on to off when the trailing end of the paper sheet 40 passes the transport sensors 614 and 616, respectively.

The image infomation read in this manner is extracted under the control of the image information extraction control means 440. In particular, extraction of the image information is performed by the paper end detection means 450 when the leading end 46 of the paper sheet 40 advances into the optical image reading unit 410.

Then, in each of the optical image reading units 412 and 414, when a time $t_5$ required for image reading passes (point T11 or T12), the video gate is switched from on to off, thereby completing reading (Read Complete). It is to be noted that the time is given as a product between the reading line number and the integration time ($t_5$=reading line number×integration time).

In this manner, while the first paper sheet 40 is transported in the high speed mode by the transport rollers 320 to 328, image reading of the front face and the rear face of the paper sheet 40 is performed by the optical image reading units 412 and 414, respectively, and thereafter, the paper sheet 40 is driven by the paper transport roller 328 and the paper discharge roller 544 and stacked into the paper stacker 510.

After reading of the first paper sheet 40 is completed, a start command is developed immediately, and in response to the start command, transportation and reading of a second paper sheet are started. In the operation for the second or following paper sheet, the image reading apparatus operates in such a manner as illustrated in FIG. 42.

In particular, in the present example, since the paper supply hopper 210 is at the paper supply position (that is, the paper supply sensor 612 is in an on-state) when the start command is instructed (point T13), the pick clutch 238 and the separation clutch 854 are engaged simultaneously with the instruction of the start command. Since the transport motor 342 continues to operate in the high speed mode, the pick roller 220 and the separation roller 820 are rotated at a comparatively high speed due to the engagement of the clutches 238 and 854 to transport the second paper sheet. Naturally, in this instance, also the transport rollers 320 to 328 are being rotated by the transport motor 342.

Thereafter, transportation and reading of the second paper sheet are performed in a similar manner to the first paper sheet. However, in transportation and reading of the second or following paper sheet, since the transport motor 342 is operating in the high speed mode from the beginning, the transport motor 342 is controlled to temporarily lower the speed thereof at a point of time when the main element for driving the paper sheet changes over from the separation roller 820 to the transport roller 320, different from the transportation and reading of the first paper sheet.

In particular, when the leading end of the second paper sheet which is supplied and transported at a comparatively high speed by the pick roller 220 and the separation roller 820 passes the transport sensor 614, the transport sensor 614 detects this and is turned on (point T15). Consequently, the pick clutch 238 is disengaged and the paper sheet is thereafter driven by the separation roller 820.

Then, when the leading end of the second paper sheet passes the transport sensor 616, the transport sensor 616 detects this and is turned on (point T19), and the separation clutch 854 is disengaged. Around the point of time T19 (between the points of time T17 to T20), the speed of the transport motor 342 is reduced temporarily from the high speed mode to the intermediate speed mode.

Such speed reduction control is started at a point of time T16 when a required time elapses after the transport sensor 614 is turn on (at a point of time before the leading end of the paper sheet passes the transport sensor 616) and is performed by holding, after the point of time T17 at which the speed drops to an intermediate speed, the intermediate speed till a point of time T20 at which a predetermined time (for example, 50 ms) elapses after the point of time T17.

Due to the speed reduction control, when the main element for driving the paper sheet changes over from the separation roller 820 to the transport roller 320, the transportation speed of the separation roller 820 and the transport roller 320 is suppressed, and consequently, changing over from the separation roller 820 to the transport roller 320 proceeds smoothly. This reduces a cause of a trouble such as paper jamming.

Within the period, a read command is developed (point T18), and similarly as in transportation of the first paper sheet, the first optical image reading unit 412 for reading information of the front face of a paper sheet is put into a reading condition (video gate on-state) at a point of time T21 at which the predetermined time t3 elapses after the leading end of the paper sheet passes the transport sensor 616. Then, at another point of time T22 when the predetermined time t4 elapses after the leading end of the paper sheet passes the transport sensor 616, the second optical image reading unit 414 for reading information of the rear face of a paper sheet is put into a reading condition (video gate on-state). It is to be noted that the predetermined times $t_3$ and $t_4$ mentioned above are given similarly as described hereinabove.

During such image reading, the transport sensors 614 and 616 are changed over from an on-state to an off-state (points T23 and T24) as the trailing end of the paper sheet passes the transport sensors 614 and 616, respectively.

Then, in each of the optical image reading units 412 and 414, the video gate is changed over from an on-state to an off-stage to complete the reading (Read Complete) when the time t5 required for image reading elapses. Also the time t5 is given similarly as described hereinabove.

In this manner, while the second or following paper sheet is transported in the high speed mode by the transport rollers 320 to 328, image reading of the front face and the rear face of the paper sheet is performed by the optical image reading units 412 and 414, respectively, and thereafter, the paper sheet is driven by the paper transport roller 328 and the paper discharge roller 544 and stacked into the paper stacker 510 in a similar manner to the first paper sheet.

If the paper supply sensor 612 is turned off as a result of reduction in quantity of the paper sheets 40 in the paper supply hopper 210 (point T14 in FIG. 42), then the hopper motor 242 is rendered operative at a point of time (T27) at which the operations of the pick roller 220 and the separation roller 820 and the speed reduction control of the transport motor 342 are completed to raise the paper supply hopper 210 to the paper supply position (point T2). Such height control of the paper supply hopper 210 is performed each time the paper supply sensor 612 is turned off as a result of reduction in quantity of the paper sheets 40 while the paper supplying and transporting operations are performed.

Figure 43:
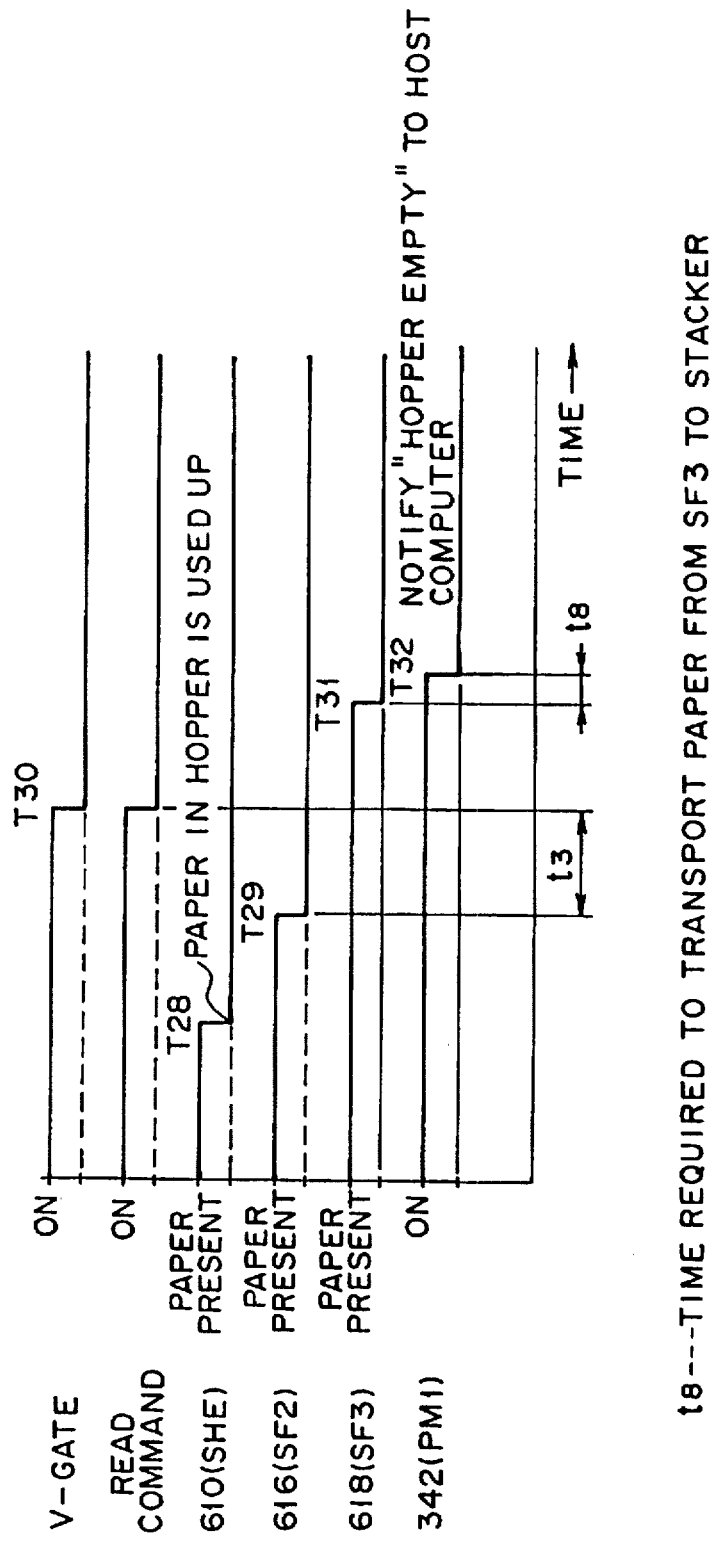
FIG. 43 is a similar view but particularly showing a transport starting sequence upon end of transportation.

Then, when the paper sheets 40 in the paper supply hopper 210 are reduced in quantity until the paper supply hopper 210 becomes empty, the hopper empty sensor 610 changes over from an off-state ("paper present") to an on-state ("paper absent") (point T28) as seen from FIG. 43, and then the transport sensor 616 changes over from an on-state ("during paper passage") to an off-state ("completion of paper passage") (point T29). Thereafter, the video gate of the second optical image reading unit 414 on the downstream side of the transport path is changed over from an on-state to an off-state and simultaneously the read command is changed over from an on-state to an off-state (point T30), and then the discharge sensor 618 changes over from an on-state ("during paper passage") to an off-state ("completion of paper passage") (point T31). The power supply to the transport motor 342 is cut to stop the transport motor 342 after lapse of a predetermined time t8 after the discharge sensor 618 changes over to an off-state. The predetermined time $t_8$ corresponds to a time within which a paper sheet 40 is transported from the discharge sensor 618 to the stacker 500.

It is to be noted that, if a paper sheet to be read requires image reading of only one face thereof and it is intended to read, for example, only the front face of the paper sheet, when reading of the video gate of the first optical image reading unit 412 in FIGS. 41 and 42 comes to an end, it is determined that reading for the paper sheet is completed (Read Complete), and next control is started immediately.

Since transportation and image reading of paper sheets is performed in response to the hopper empty sensor 610, the paper supply sensor 612, the transport sensors 614 and 616 and the discharge sensor 618 in this manner, the image reading operation can be performed appropriately in accordance with a transportation condition of a paper sheet, which is suitable to high speed image reading. Further, if paper jamming should occur intermediately of the paper transport path, this can be detected promptly and the operation of the image reading apparatus can be stopped immediately.

Further, since the control timings by the roller driving mechanism control means 350 and the image information extraction control means 440 are synchronized with each other, even if the processing speed for image reading is increased, the paper transportation operation and the image reading operation can be performed with certainty.

Furthermore, since reading of information of the front face of a paper sheet 40 is performed optically by the first optical image reading unit 412 and reading of information of the rear face of the paper sheet 40 is performed optically by the second optical image reading unit 414, reading of image information on the opposite faces of the paper sheet 40 can be performed rapidly, and the processing speed of a double-side original is improved significantly.

Meanwhile, since extraction of an image is performed when it is detected by the paper leading end detection means 450 that the leading end 46 of a paper sheet 40 advances into the optical image reading unit 410, extraction of the image can be performed rapidly and efficiently.

Further, since the image information extraction control means 440 performs extraction control of image information obtained by the first optical image reading unit 412 and the second optical image reading unit 414 in response to a result of selection by the original selection switch 924L serving as paper reading selection means and the discrimination mark 50 applied to a paper sheet 40, the image reading apparatus is advantageous in that extraction of an image can be performed rapidly and efficiently and the processing speed in image reading can be raised readily.

For example, when one face reading originals are mixed in both face reading originals, if the discrimination mark 50 which designates one face reading is applied to each of the one face reading originals the quantity of which is smaller than that of the both face reading originals and it is selectively set by way of the original selection switch 924L that both faces of each paper sheet 40 should usually be read, then image information on both faces of a paper sheet is normally read by both of the first optical image reading unit 412 and the second optical image reading unit 414. However, when a discrimination mark 50 is detected, image information only on the front face or the rear face of the paper sheet 40 is read by the first optical image reading unit 412 or the second optical image reading unit 414.

As a result, extraction of an image can be performed rapidly and efficiently. Naturally, when both face reading originals are mixed in one face reading originals, similar advantages can be obtained by applying a discrimination mark 50 which designates double face reading to each of the double face reading originals the quantity of which is smaller than that of the one face reading originals and selectively setting by way of the original selection switch original selection switch 924L that one face of each paper sheet 40 should usually be read.

Naturally, if both face reading originals and one face reading originals are not mixed, extraction of image information can be performed rapidly and efficiently by way of selection by the original selection switch 924L.

Further, since the image of the discrimination mark 50 applied to a paper sheet 40 is erased by the discrimination mark image erasure means 460 while only image information which should originally be read is outputted, the discrimination mark will not make an obstacle to extraction of image information.

Further, in the image reading apparatus of the embodiment described above, since the first optical image reading unit 412 for front face reading and the second optical image reading unit 414 for rear face reading are constructed with common specifications, front face information and rear face information of a paper sheet are read in uniform accuracy. Further, common parts can be employed for both of the optical image reading units 412 and 414, and consequently, the cost required for production of the image reading apparatus can be reduced.

Further, since the first optical image reading unit 412 for front face reading and the second optical image reading unit 414 for rear face reading can be constructed readily with different specifications, the reading accuracy and the cost can be balanced well by constructing the image reading apparatus, for example, such that an optical image reading unit which is lower in terms of the accuracy but superior in terms of the cost is employed to read a reading face for which a high degree of accuracy in reading of image information is not required. The image reading apparatus is further advantageous in that various models can be provided readily at a low cost in accordance with applications.

Further, it is appropriately discriminated by the front/rear face detection means 630 whether each optical image reading unit is for front face reading or for rear face reading of a paper sheet, and information thus read can be processed appropriately.

Further, with the image reading apparatus of the present embodiment, the following advantages can be achieved due to its structural characteristics.

In particular, since the paper transport path 310 connected to the paper supply mechanism 200 is constituted from the inclined transport path 312 and the paper reversing transport path 314 without involving a horizontal transport path, the paper transport path 310 requires a comparatively small depthwise space, and accordingly, the image reading apparatus can be reduced in size as much. Further, there is another advantage in that a paper sheet can be transported rapidly from the paper supply mechanism 200 to the stacker mechanism 300 and image reading can be performed at a high speed. Naturally, the reduction in space allows an increase in size of the paper sheet hopper or the paper stacker, which allows reading of a paper sheet of a greater size.

Further, since fine particles are deposited on the surfaces of the transport rollers 320 to 328, the coefficients of friction of the outer surfaces of the transport rollers 320 to 328 are increased by the fine particles. Consequently, an otherwise possible slip of a paper sheet upon transportation is prevented, and accordingly, image reading can be performed smoothly even during transportation of a paper sheet at a high speed.

Furthermore, since a paper sheet 40 is guided during transportation by the paper guiding portions of the sheet guides 700, 710, 740, 750 and so forth, paper jamming occurs less likely. Further, while a color reference for a paper sheet 40 is provided by the backing portions 712 and 752 provided on such sheet guides, since the backing portions 712 and 752 are offset from the paper guiding portions 714 and 754 by way of the steps 716 and 756, a paper sheet 40 will not contact directly with the backing portion 712 or 752. Consequently, soiling to the backing portions 712 and 752 upon passage of a paper sheet 40 is prevented, and a color reference for a paper sheet 40 is provided appropriately. Accordingly, the accuracy in image reading can be assured for a long period of time and also maintenance of the image reading apparatus is facilitated.

Further, since the sheet guides 710 and 750 are resiliently pressed toward the optical image reading unit 410 and contacted with the contacting members, the sheet guides 710 and 750 are controlled with certainty to the predetermined positions with respect to the optical image reading unit 410, and a paper sheet 40 is guided to an appropriate position conforming to a focal length of the optical image reading unit 410. Consequently, an error in reading resolution or magnification of information of a paper sheet 40 by the optical image reading unit 410 is prevented. Naturally, also the positions of the backing portions 712 and 752 provided on the sheet guides 710 and 750 are held appropriately with respect to the optical image reading unit 410, and also the color difference for a paper sheet 40 can be provided appropriately.

Furthermore, while the second optical image reading unit 414 is provided vertically downwardly of the inclined transport path 312, since the sheet guide 740 provided between the second optical image reading unit 414 and the inclined transport path 312 has the opening 742 provided therein, information on the rear face 44 of a paper sheet can be read through the opening 742 while the paper sheet is guided by the sheet guide 740.

Particularly, in the image reading apparatus of the present embodiment, since the glass plate 742A is provided in the opening 742, a paper sheet can be guided also along the opening 742 by the glass plate 742A. Accordingly, the paper transportation performance is improved as much.

By adjusting the manner in which the apparatus body 10 and the apparatus lid 20 are held in a closed condition by way of the body-lid locking mechanism 30, the biasing forces of the idler rollers 330 to 338 to the transport rollers 320 to 328 and the contacting conditions between the sheet guides and the auxiliary sheet guides are adjusted. Consequently, an appropriate transporting force can be obtained readily in accordance with a type of a paper sheet by such adjustment. Accordingly, the image reading apparatus can achieve reliable transportation of a paper sheet free from an error.

4. Modifications and Alternative Forms

In the following, various modifications and alternative forms of several components of the image reading apparatus of the present embodiment will be described.

4-1. Structure of the Paper Hopper

Figure 44:
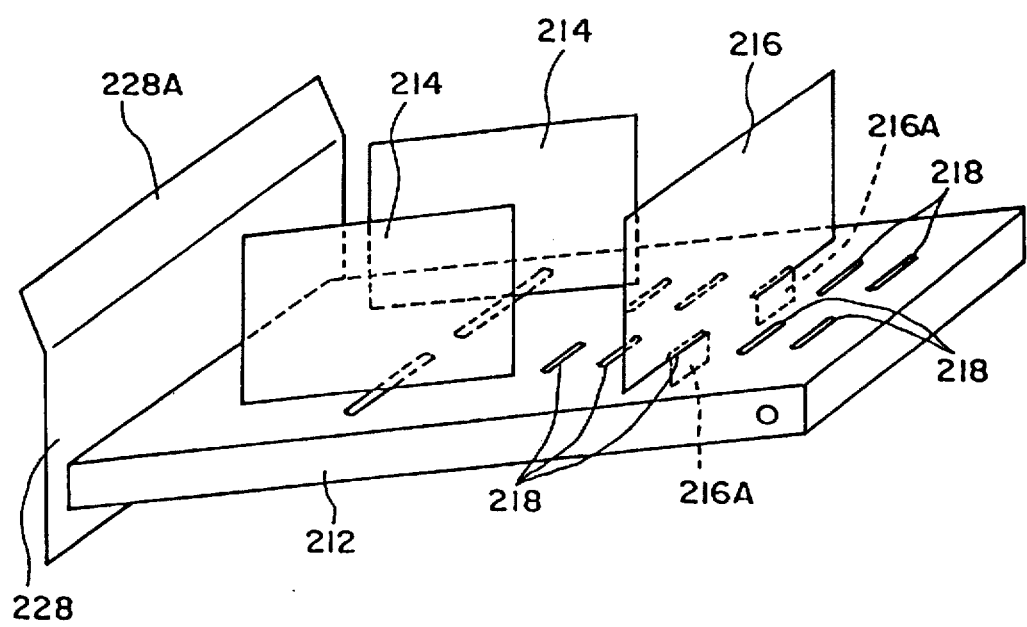
FIG. 44 is a perspective view showing a detailed structure of the paper supply hopper of the image reading apparatus of FIG. 4.

Though not described in detail in the description of the image reading apparatus of the preferred embodiment, a pair of tiltable paper edge guide members 214 for guiding the opposite side edges of paper sheets accommodated in the paper supply hopper 210 are provided in the paper supply hopper 210 as shown in FIG. 44. The tiltable paper edge guide members 214 are mounted on the hopper table 212 of the paper supply hopper 210 for tilting movement and for sliding movement in the widthwise direction of a paper sheet. While the tiltable paper edge guide members 214 are naturally provided in pair at left and right locations, the left and right tiltable paper edge guide members 214 are slidably moved in widthwise directions in an interlocking relationship with each other to positions at which they contact with the side edges of the paper sheets 40 from the left and right sides to hold the paper sheets 40 at an appropriate position in the widthwise direction of the paper sheets 40.

Consequently, the paper sheets 40 can be guided to an appropriate position in the widthwise direction in accordance with the widthwise size of the paper sheets 40 whatever widthwise size the paper sheets 40 may have from a small size to a large size. Further, where the paper width is larger than the range of movement of the tiltable paper edge guide members 214, the tiltable paper edge guide members 214 can be tilted down so that they may not protrude from the hopper table 212, and accordingly, the hopper table 212 can be used with its maximum width. It is to be noted that, in this instance, the left and right wall faces 16 (refer to FIG. 5) of the hopper section of the apparatus body which are provided uprightly on the opposite side portions of the hopper table 212 can be used in place of the left and right tiltable paper edge guide members 214.

Further, a paper trailing end guide member 216 for guiding the trailing end edges of paper sheets 40 accommodated in the paper supply hopper 210 is provided in the paper supply hopper 210. While the paper trailing end guide member 216 is provided in the hopper table 212, the hopper table 212 has a plurality of fitting holes 218 formed therein and serving as mounting portions for mounting the paper trailing end guide member 216.

In particular, the paper trailing end guide member 216 has a fitting projection 216A provided at a lower end thereof and is fixed to the hopper table 212 by fitting the fitting projection 216A of the paper trailing end guide member 216 into one of the fitting holes 218 of the hopper table 212. Here, a pair of left and right fitting projections 216A are provided at the lower end of the paper trailing end guide member 216 while the fitting holes 218 of the hopper table 212 are provided in left and right pairs correspondingly. The plurality of pairs of fitting holes 218 are provided at different locations in the lengthwise direction of a paper sheet (paper supplying direction) so that the paper trailing end guide member 216 can be selectively fixed to a suitable position on the hopper table 212 in accordance with a size of paper sheets to be accommodated onto the hopper table 212. Accordingly, the paper trailing end guide member 216 can guide the trailing ends of paper sheets of various sizes.

4-2. Paper Supply Roller System

Figure 45:
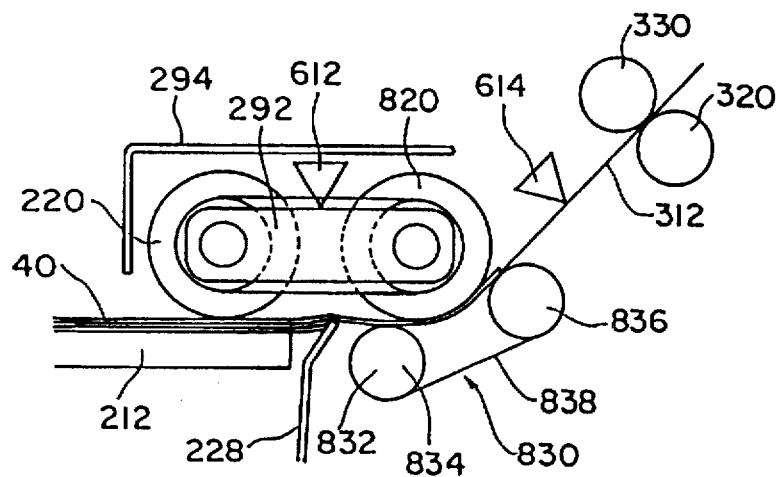
FIG. 45 is a side elevational view showing the paper supply mechanism shown in FIG. 14 at a position when the amount of paper sheets in the paper supply hopper is small where the paper supply mechanism is constructed such that the paper supply roller is not rocked.
Figure 46:
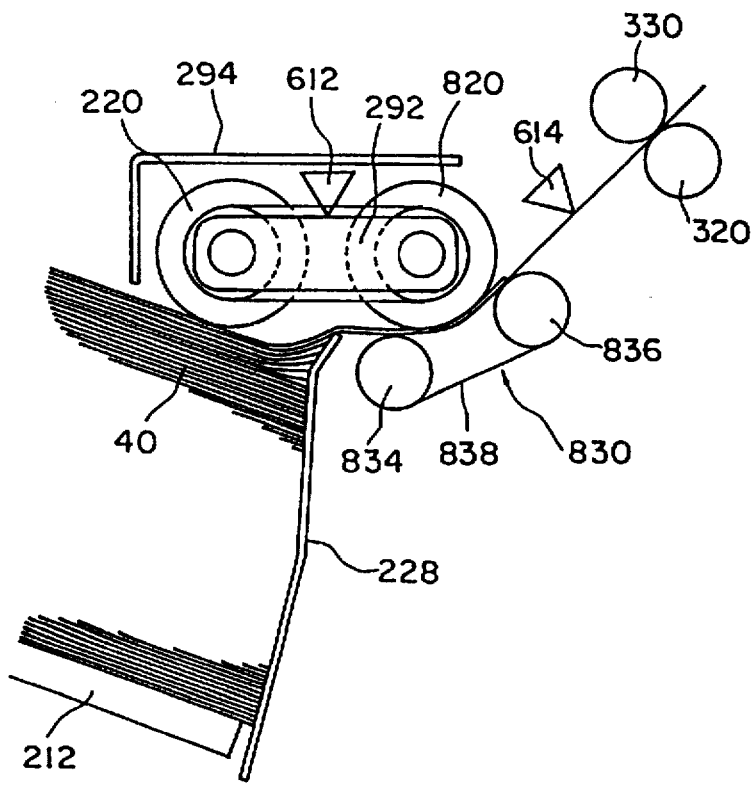
FIG. 46 is a side elevational view showing the paper supply mechanism shown in FIG. 14 at another position when the amount of paper sheets in the paper supply hopper is large where the paper supply mechanism is constructed such that the paper supply roller is not rocked.

By the way, as the height (thickness) of the paper sheets accommodated in the paper supply hopper 210 increases, the amount of pivotal motion by which the paper supply hopper 210 pivots the hopper table 212 so as to tilt forwardly in the paper supplying direction increases. In this instance, naturally the paper sheets accommodated in the hopper table 212 are tilted forwardly, whereupon the top of the paper sheets is naturally tilted forwardly with the front or leading end thereof positioned at a lowermost position. Meanwhile, since the gate 228 constituting the front end of the paper supply hopper 210 is fixed, if the axis of rotation of the paper supply rollers 220 is not rocked and consequently the position of the paper supply rollers 220 is fixed whether the position of the paper supply hopper 210 is higher or lower, then if the gate 228 and the hopper table 212 are set such that the height of the upper end of the gate 228 and the height of the leading end of the top of the paper sheet coincide with each other when the paper supply hopper 210 is, for example, at a high position as shown in FIG. 45, then when the paper supply hopper 210 comes to a low position, the top of the paper sheets is restricted by the paper supply rollers 220 as shown in FIG. 46 so that the height of the front end of the paper sheets becomes lower than the height of the upper end of the gate 228. Consequently, an appropriate paper supplying operation cannot be performed.

In the present apparatus, however, the paper supply rollers 220 are supported for rocking motion around the axis 822 of the separation roller 820 by way of the rockable arm 292, and when the hopper table 212 is driven by the paper supply hopper 210 of the paper supply hopper position control means 280 so that it comes to its high position as shown in FIG. 45, the paper supply rollers 220 assume a substantially horizontal position, but when the hopper table 212 comes to a low position as shown in FIG. 46, the paper supply rollers 220 are rocked upwardly in response to the low position of the hopper table 212.

Figure 47:
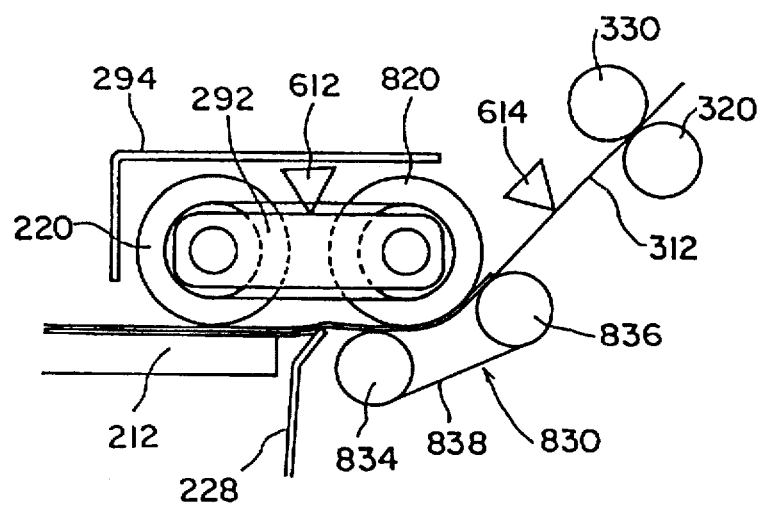
FIG. 47 is a side elevational view showing the paper supply mechanism shown in FIG. 14 at a position when the amount of paper sheets in the paper supply hopper is small where the paper supply mechanism is constructed such that the paper supply roller is rocked.
Figure 48:
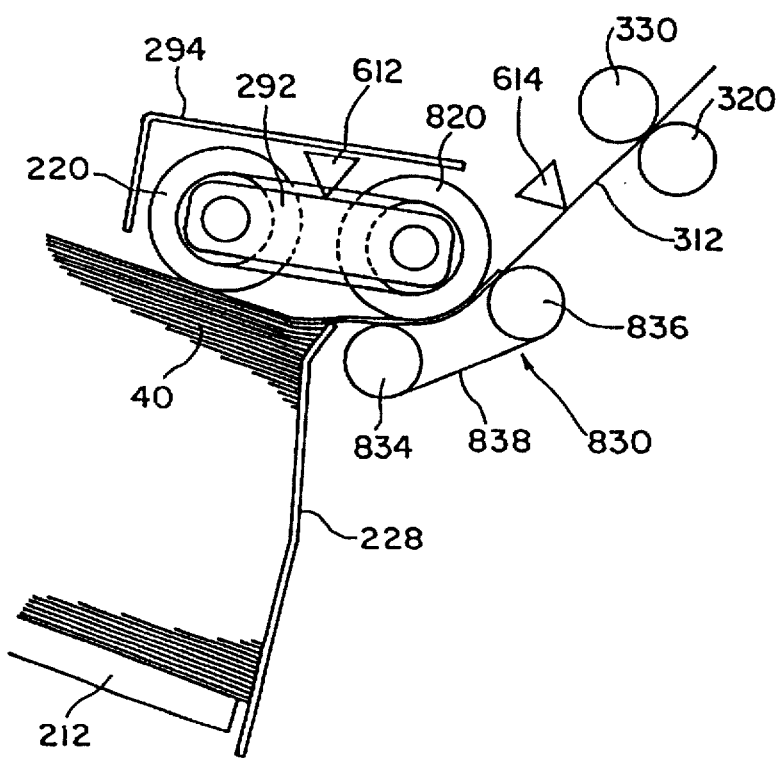
FIG. 48 is a side elevational view showing the paper supply mechanism shown in FIG. 14 at another position when the amount of paper sheets in the paper supply hopper is large where the paper supply mechanism is constructed such that the paper supply roller is rocked.

Accordingly, when the amount of the paper sheets 40 in the paper supply hopper 210 is comparatively small, the hopper table 212 assumes a comparatively high position and the paper supply rollers 220 assume a substantially horizontal position at which the height of the front or leading end of the top of the paper sheets 40 coincides with the height of the upper end of the gate 228 as shown in FIG. 47. In contrast, when the amount of the paper sheets 40 in the paper supply hopper 210 is comparatively large, the hopper table 212 assumes a comparatively low position and the paper supply rollers 220 assume a position rocked upwardly in response to the low position of the hopper table 212 so that, also in this instance, the height of the front end of the top face of the paper sheets coincides with the height of the upper end of the gate 228 as shown in FIG. 48.

In this manner, the top face of the paper sheets 40 normally assumes an appropriate position with respect to the upper end of the gate 228 by the driving control of the paper supply hopper 210 and the interlocking control of the rocking position of the axis of rotation of the paper supply rollers 220 with the paper supply hopper 210. Consequently, there is an advantage in that an appropriate paper supplying operation can be achieved.

4-3. Paper Supply Sensor

By the way, the paper supply sensor 612 is provided in order to adjust the position of the paper supply hopper 210 by way of the paper supply hopper position control means 280. In the embodiment described above, the paper supply sensor 612 detects from the posture of the paper supply rollers 220 and the posture of the paper supply hopper 210 itself whether the paper supply rollers 220 and the paper supply hopper 210 are in respective appropriate positions, that is, in an appropriate paper supplying condition, and the paper supply hopper position control means 280 drives the paper supply hopper 210 in response to a result of detection of the paper supply sensor 612 until the paper supplying condition is detected. The paper supply sensor 612 in the embodiment may be replaced by the following alternative arrangements.

Figure 49:
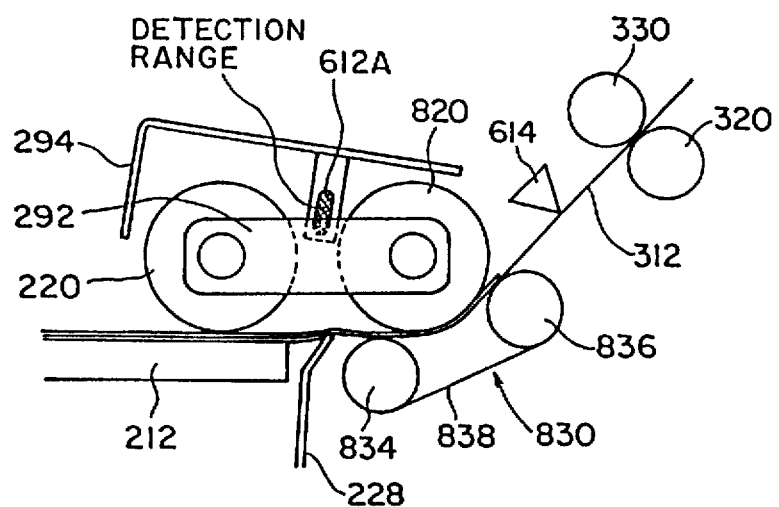
FIG. 49 is a partial side elevational view showing another form of the paper supply mechanism shown in FIG. 14 when the amount of paper sheets in the paper supply hopper is small.
Figure 50:
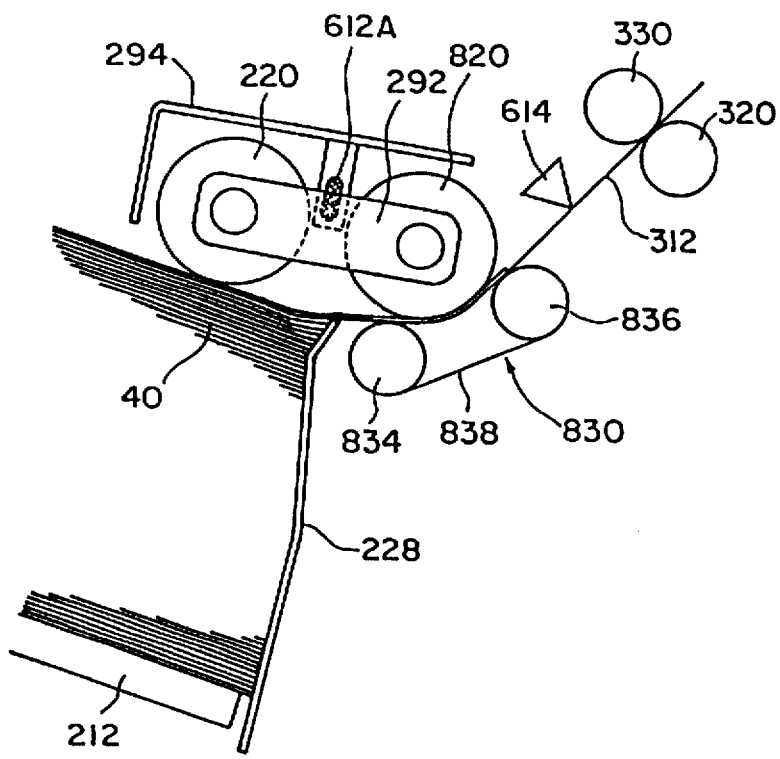
FIG. 50 is a partial side elevational view showing the paper supply mechanism shown in FIG. 49 but when the amount of paper sheets in the paper supply hopper is large.

An alternative arrangement is shown in FIGS. 49 and 50. Referring to FIGS. 49 and 50, in the alternative arrangement shown, while the paper supply rollers 220 are mounted for rocking motion around the axis of the separation roller 820, the cover 294 for the paper supply rollers 220 is mounted in a stationary condition. A paper supply sensor 612A is provided on the stationary cover 294 for detecting a rocked position of the rockable arm 292 to detect a rocked condition of the paper supply rollers 220. The paper supply sensor 612A includes, for example, a large number of photointerrupters arranged in a vertical column so that a small variation of the rocked position of the rockable arm 292 can be detected.

However, only with the construction described above, the inclined condition of the paper supply hopper 210 is not taken into consideration in detection by the paper supply sensor 612A. Therefore, means (hopper inclination detection means) (not shown) for detecting the inclined condition of the paper supply hopper 210 is provided for the paper supply hopper position control means 280, and the paper supply sensor 612A takes a result of detection of the hopper inclination detection means into consideration.

Here, taking notice of the fact that a hopper driving pulse signal corresponds to the inclined condition of the paper supply hopper 210, the hopper inclination detection means is constituted from calculation means for calculating driving pulses from a reference position (for example, the lowermost position) of the paper supply hopper 210, and the paper supply sensor 612A discriminates the paper supplying condition in accordance with information from the hopper inclination detection means.

In particular, the paper supply sensor 612A discriminates the paper supplying condition by comparing a detection value of the rocked condition of the rockable arm 292 with a discrimination reference value which is modified in response to information from the hopper inclination detection means.

For example, if the paper supply hopper 210 is at a position tilted forwardly by a great amount, the discrimination reference value is modified to a high value, and accordingly, the paper supply sensor 612A discriminates the paper supplying condition where the paper supply rollers 220 is at a position displaced upwardly by a great amount. Then, as the inclination of the paper supply hopper 210 decreases, the discrimination reference value is decreased. Consequently, the paper supply sensor 612A discriminates the paper supplying condition at a stage where the upward displacement of the paper supply rollers 220 is comparatively small.

Even with the arrangement described above, the top face of the paper sheets in the paper supply hopper 210 can always be positioned at an appropriate position and an appropriate paper supplying operation can be performed.

Figure 51:
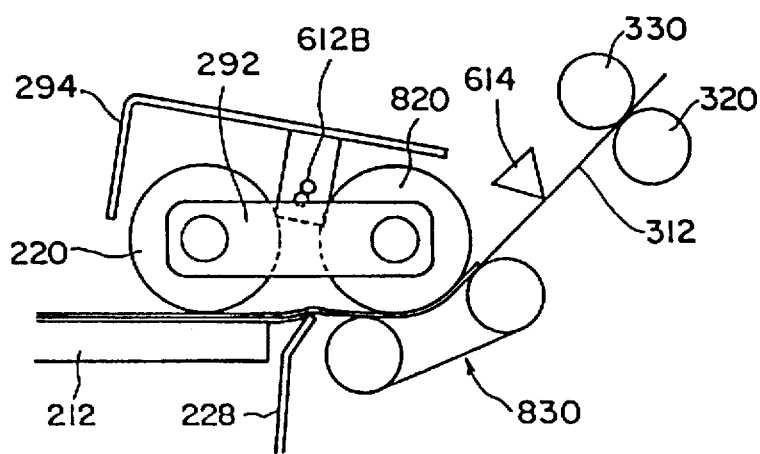
FIG. 51 is a partial side elevational view showing a further form of the paper supply mechanism shown in FIG. 14 when the amount of paper sheets in the paper supply hopper is small.
Figure 52:
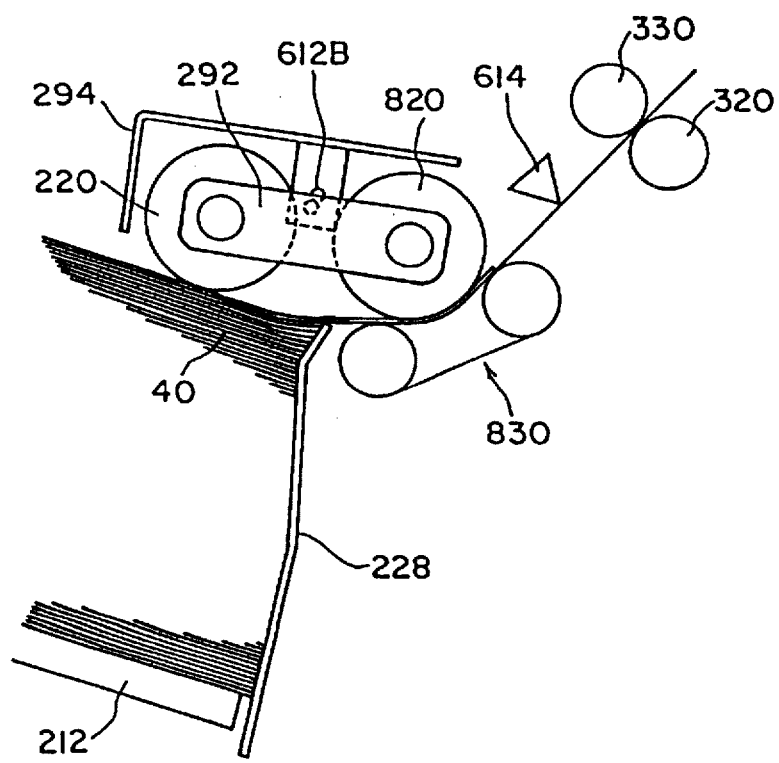
FIG. 52 is a partial side elevational view showing the paper supply mechanism shown in FIG. 51 but when the amount of paper sheets in the paper supply hopper is large.

FIGS. 51 and 52 show another alternative arrangement. Referring to FIGS. 51 and 52, similarly as in the arrangement shown in FIGS. 49 and 50, the paper supply rollers 220 is mounted for rocking motion around the axis of the separation roller 220 but the cover 294 for the paper supply rollers 220 is mounted in a stationary condition, and a paper supply sensor 612B is mounted on the stationary cover 294 for detecting the rocked position of the paper supply rollers 220 based on the rocked position of the rockable arm 292.

The paper supply sensor 612B is constituted from, for example, a plurality of photo-interrupters arranged in a vertical column, and the hopper inclination detection means is provided in the paper supply hopper position control means 280.

In the paper supply sensor 612B, one of the photo-interrupters which is at a position (vertical position) corresponding to a hopper inclination position detected by the hopper inclination detection means is selected, and the paper supplying condition is determined if a required portion of the rockable arm 292 passes the selected photo-interrupter.

Figure 53:
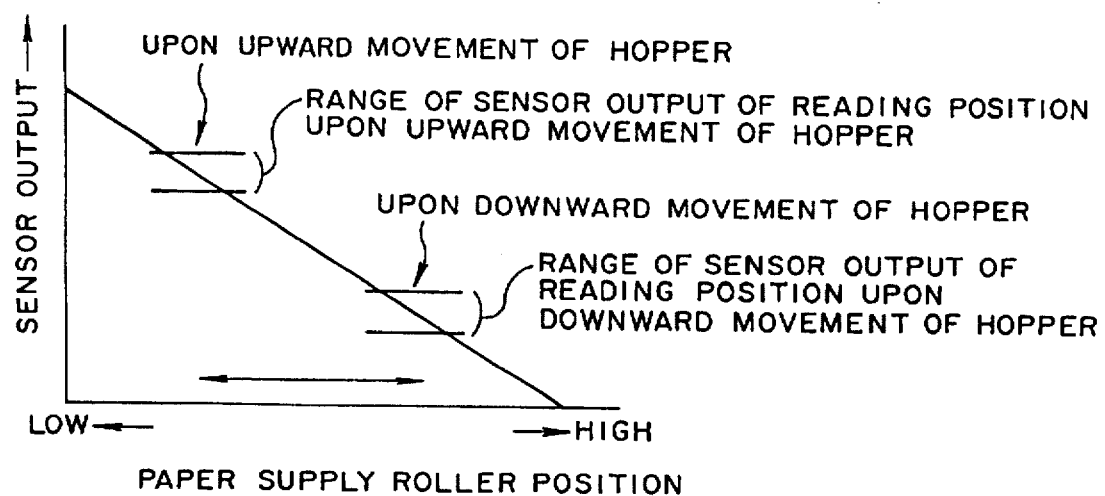
FIG. 53 is a diagrammatic view illustrating detection operation of the paper supply mechanism shown in FIG. 51.

In particular, as seen from FIG. 53, when the paper supply hopper 210 is at a low position at which it is inclined by a great amount, one of the photo-interrupters at an upper position is selected so that the paper supplying condition is determined when the paper supply rollers 220 are moved upwardly high. However, when the paper supply hopper 210 is at a high position at which it is inclined by a small amount, one of the photo-interrupters at a lower position is selected so that the paper supplying condition is determined when the paper supply rollers 220 is moved upwardly by a small amount.

Even with the arrangement described above, the top face of the paper sheets can always be held at an appropriate position with respect to the upper end of the gate 228 and an appropriate paper supplying operation can be performed.

Figure 54:
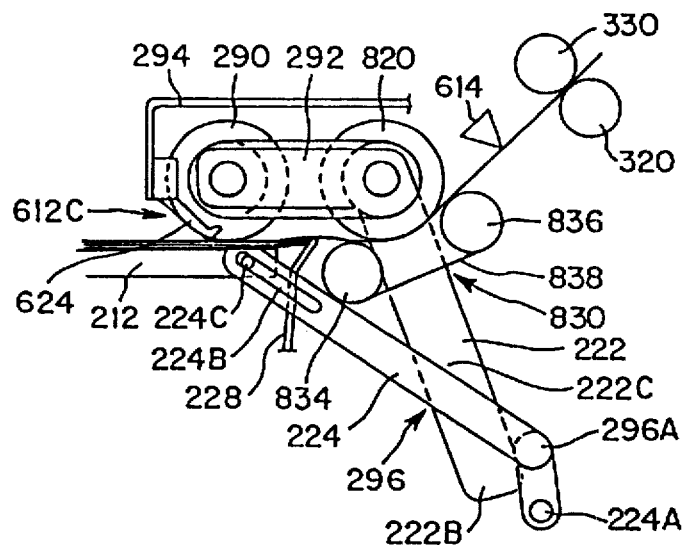
FIG. 54 is a partial side elevational view showing a still further form of the paper supply mechanism shown in FIG. 14 when the amount of paper sheets in the paper supply hopper is small.
Figure 55:
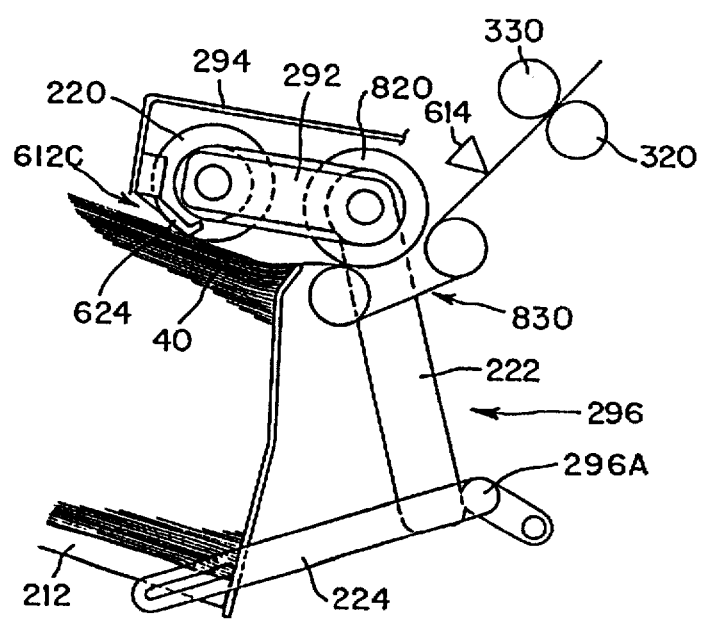
FIG. 55 is a partial side elevational view showing the paper supply mechanism shown in FIG. 54 but when the amount of paper sheets in the paper supply hopper is large.

Also such a further alternative arrangement as shown in FIGS. 54 and 55 is available.

Referring to FIGS. 54 and 55, in the arrangement shown, the cover 294 is mounted for rocking motion around the axis of the separation roller 820 integrally with the paper supply rollers 220, and a paper supply sensor 612C is mounted on the cover 294. The paper supply sensor 612C includes a light-weighted rockable arm 624 mounted for pivotal motion to move a free end thereof down to the top face of the paper sheets, and a photo-interrupter not shown provided at a rocking portion of the rockable arm 624. The paper supply sensor 612C determines the paper supplying condition when the top face of the paper sheets comes to a predetermined height corresponding to the paper supply rollers 220.

Meanwhile, an interlocking mechanism 296 is provided for interlocking the height of the paper supply rollers 220, that is, the position of the rockable arm 292, with the inclined condition of the hopper table 212. The interlocking mechanism 296 is constituted from a first interlocking member 222 and a second interlocking member 224 both having similar shapes to those of the embodiment shown in FIGS. 14 and 15, and a stopper pin 296A for causing the first interlocking member 222 and the second interlocking member 224 to cooperate with each other. The position of the rockable arm 292 is controlled by the stopper pin 296A and corresponds to the inclined position of the hopper table 212.

In particular, the first interlocking member 222 has an arm portion 222C which is provided integrally with and extends obliquely downwardly from the rockable arm 292, on which the center of rotation of the paper supply rollers 220 is supported for rotation, so that the paper supply rollers 220 may be rocked around the axis of the separation roller 820. Thus, when the paper supply rollers 220 are rocked, also the arm portion 222C of the first interlocking member 222 is rocked by the paper supply rollers 220.

Meanwhile, the second interlocking member 224 is formed as an arm supported for pivotal motion around an arm fulcrum 224A forwardly of a lower portion of the gate 228 (in the paper supplying direction, that is, in the rightward direction in FIGS. 54 and 55) and has an elongated hole 224B formed at a rocking end portion thereof. A pin 224C provided at a front end portion of the hopper table 212 such that it extends sidewardly is loosely fitted in the elongated hole 224B so that, when the hopper table 212 is moved upwardly or downwardly, the second interlocking member 224 is pivoted by the hopper table 212. Further, the stopper pin 296A is provided at an intermediate bent portion of the second interlocking member 224 in the proximity of the arm fulcrum 224A. An end portion of the arm portion 222C of the first interlocking member 222 is positioned for contacting engagement with an opposing side face of the stopper pin 296A.

Accordingly, when the hopper table 212 is moved upwardly to such a high position as shown in FIG. 54, the second interlocking member 224 is pivoted in the clockwise direction in FIG. 54, whereupon also the stopper pin 296A is turned in the clockwise direction in FIG. 54 around the arm fulcrum 224A until the arm portion 222C of the first interlocking mechanism 222 is contacted with and stopped by the stopper pin 296A at a position at which the rockable arm 292 and the paper supply rollers 220 are rocked little and are in substantially horizontal positions. On the other hand, if the hopper table 212 is moved downwardly to such a low position as shown in FIG. 55, the second interlocking member 224 is pivoted in the counterclockwise direction in FIG. 55, whereupon also the stopper pin 296A is turned in the counterclockwise direction around the arm fulcrum 224A. Accordingly, the arm portion 222C of the first interlocking member 222 will not be contacted with the stopper pin 296A unless the rockable arm 292 and the paper supply rollers 220 are rocked so that the paper supply rollers 220 is moved upwardly.

Since the height or vertical position of the paper supply rollers 220 is normally kept corresponding to the inclined position of the hopper table 212 by way of the interlocking mechanism 296 in this manner, the top face of the paper sheets can normally be held at an appropriate position with respect to the upper end of the gate 228 to assure an appropriate paper supplying operation by driving the paper supply hopper 210 to move upwardly until a detection signal of the paper supplying condition is developed from the paper supply sensor 612C.

Figure 56:
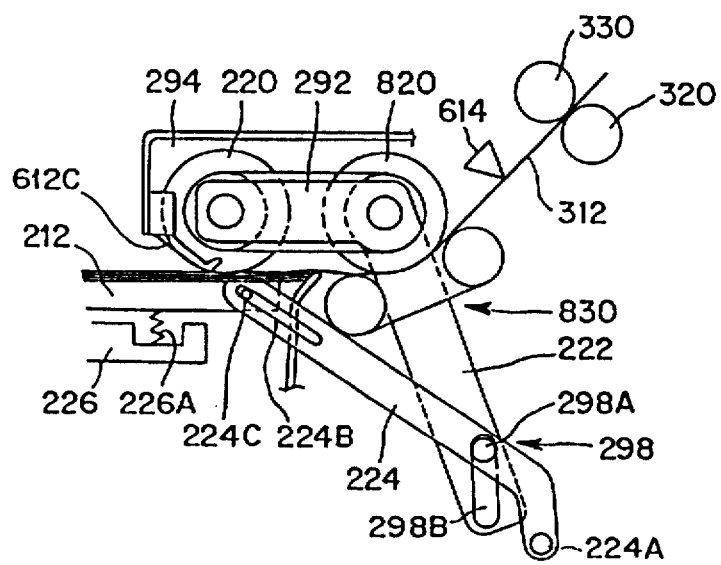
FIG. 56 is a partial side elevational view showing a yet further form of the paper supply mechanism shown in FIG. 14 when the amount of paper sheets in the paper supply hopper is small.
Figure 57:
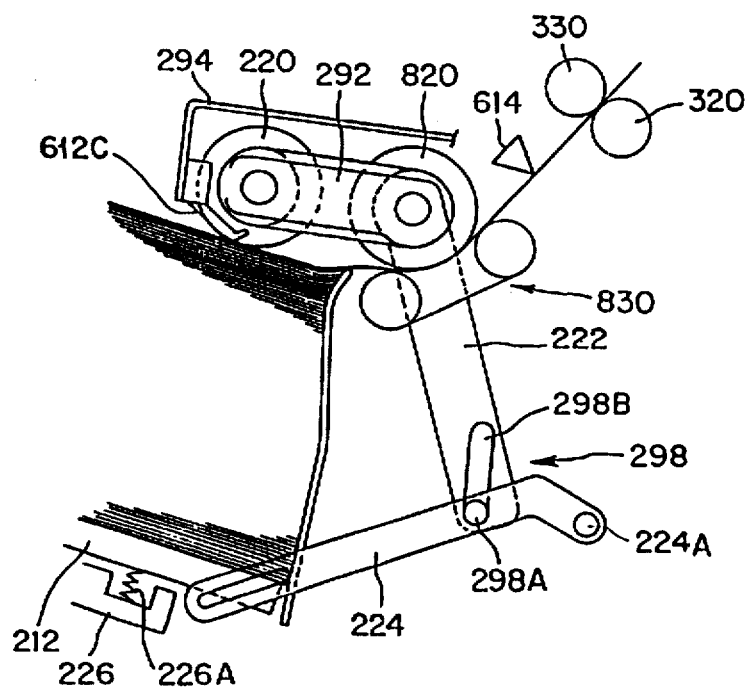
FIG. 57 is a partial side elevational view showing the paper supply mechanism shown in FIG. 56 but when the amount of paper sheets in the paper supply hopper is large.

The interlocking mechanism employed in the arrangement shown in FIGS. 54 and 55 may be modified in such a manner as shown in FIGS. 56 and 57.

Referring to FIGS. 56 and 57, the interlocking mechanism 298 shown includes a first interlocking member 222 and a second interlocking member 224 both having similar profiles to those of the interlocking mechanism in the embodiment shown in FIGS. 14 and 15 or the interlocking mechanism shown in FIGS. 54 and 55, and a pin 298A and an elongated hole 298B for interlocking the first interlocking member 222 and the second interlocking member 224 with each other. The pin 298A is provided at an intermediate bent portion of the second interlocking member 224 in the proximity of the arm fulcrum 224A while the elongated hole 298B is formed in a longitudinal direction in a suitable angle in an end portion of the arm portion 222C of the first interlocking member 222. The pin 298A is loosely fitted in the elongated hole 298B.

With the interlocking mechanism 298, due to the engagement between the elongated hole 298B and the pin 298A, when the hopper table 212 is moved, for example, upwardly as shown in FIG. 56, the second interlocking member 224 is pivoted in the clockwise direction in FIG. 56, whereupon also the pin 298A is turned in the clockwise direction around the arm fulcrum 224A while moving upwardly in the elongated hole 298B to a position at which the rockable arm 292 and the paper supply rollers 220 are rocked little and are in substantially horizontal positions. However, when the hopper table 212 is moved downwardly as shown in FIG. 57, the second interlocking member 224 is pivoted in the counterclockwise direction in FIG. 57, whereupon also the pin 298A is turned in the counterclockwise direction around the arm fulcrum 224A while moving downwardly in the elongated hole 298B to rock the rockable arm 292 and the paper supply rollers 220 in the clockwise direction to move the paper supply rollers 220 upwardly.

Since the height or vertical position of the paper supply rollers 220 is normally kept corresponding to the inclined position of the hopper table 212 by way of the interlocking mechanism 298 in this manner, the top face of the paper sheets can normally be held at an appropriate position with respect to the upper end of the gate 228 to assure an appropriate paper supplying operation by driving the paper supply hopper 210 to move upwardly until a detection signal of the paper supplying condition is developed from the paper supply sensor 612C.

It is to be noted that, in the modified arrangement shown in FIGS. 56 and 57, the hopper table 212 is resiliently supported on a base member 226 by way of a plurality of springs 226A.

Where the paper supply rollers 220 are mounted for rocking motion around the axis 822 of the separation roller 820 and the interlocking mechanism includes the first interlocking member 222 and the second interlocking member 224 while paper supply position detection means 644 is constructed so as to detect the paper supply position in response to movements of the first interlocking member 222 and the second interlocking member 224 in this manner, the paper supply position detection means 644 can be used also as means for detecting that the sheet guide 710 or 740 is not set completely or as means for detecting that locking by the rotary shaft locking mechanism 890 is incomplete.

In particular, the following case is considered here. If, for example, paper jamming occurs, the apparatus lid 20 will be pivoted upwardly to open the paper transport path 310 between the apparatus lid 20 and the apparatus body 10, and then after the image reading apparatus is restored from the paper jamming, the apparatus lid 20 will be pivoted downwardly to put the paper transport path 310 into a closed condition (condition for use).

In this instance, since the paper supply hopper 210 during ordinary use of the image reading apparatus is at the paper supply position, before the apparatus lid 20 is pivoted upwardly, naturally the paper supply hopper 210 is at the paper supply position and consequently the paper supply sensor 610 serving as the paper supply position detection means 644 is in an on-state (paper supply position detection condition).

Then, when the apparatus lid 20 is pivoted down to put the paper transport path 310 into a closed condition again, if the apparatus lid 20 is closed appropriately, then the paper supply sensor 610 is put into an on-state (paper supply position detection condition), but if the apparatus lid 20 is not closed appropriately, then the relative positional relationship between the first interlocking member 222 and the second interlocking member 224 is different from an ordinary one, and consequently, the paper supply sensor 610 remains an off-state. If the apparatus lid 20 is not closed appropriately, then the sheet guides 710 and 740 are not set completely. Accordingly, if the paper supply sensor 610 remains in an off-state after the apparatus lid 20 and the apparatus body 10 are closed with each other, then it can be determined that the sheet guides 710 and 740 are not set completely.

If it is detected by the paper supply position detection means 644 (paper supply sensor 610) that the sheet guides 710 and 740 are not set completely in this manner, then this may be notified to an operator by displaying an error message or the like on the liquid crystal display unit 922D or lighting an error indication lamp or sounding an alarm. The operator thus can reset the image reading apparatus so that an appropriate paper transporting condition and a correct color reference can be obtained.

Also when the locking by the rotary shaft locking mechanism 890 is incomplete, the relative positional relationship between the first interlocking member 222 and the second interlocking member 224 is different from an ordinary one and the paper supply sensor 610 reacts with this, and accordingly, the incomplete locking of the rotary shaft locking mechanism 890 can be detected. Also in this instance, the detection of the incomplete locking can be notified to an operator so that the image reading apparatus may be reset to establish a correct locking condition of the rotary shaft locking mechanism 890 by the operator.

4—4. Paper Supply Hopper

Figure 58:
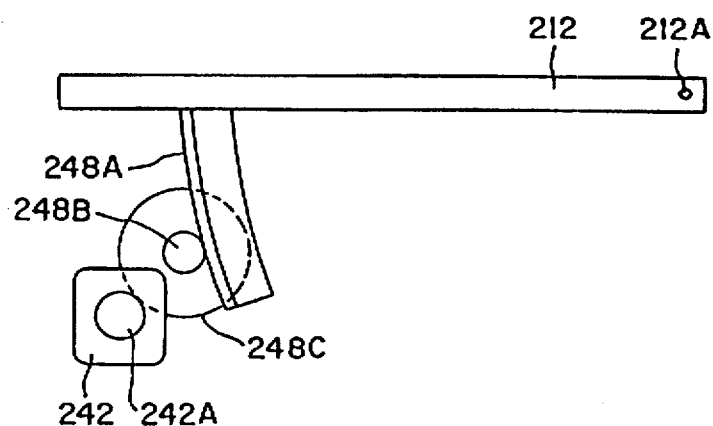
FIG. 58 is a schematic side elevational view showing another form of a paper supply hopper driving mechanism of the image reading apparatus of FIG. 4.

The paper supply hopper driving mechanism 240 may be modified such that the hopper motor 242 and the pinion 248B is coupled directly to each other by way of a gear mechanism as shown in FIG. 58. In particular, referring to FIG. 58, a gear 242A is provided on the rotary shaft of the hopper motor 242 while another gear 248C for meshing engagement with the gear 242A is provided on the rotary shaft of the pinion 248B. The modified arrangement allows compact construction of the paper supply hopper driving mechanism 240.

4-5. Paper Skew Prevention Means

Figure 59:
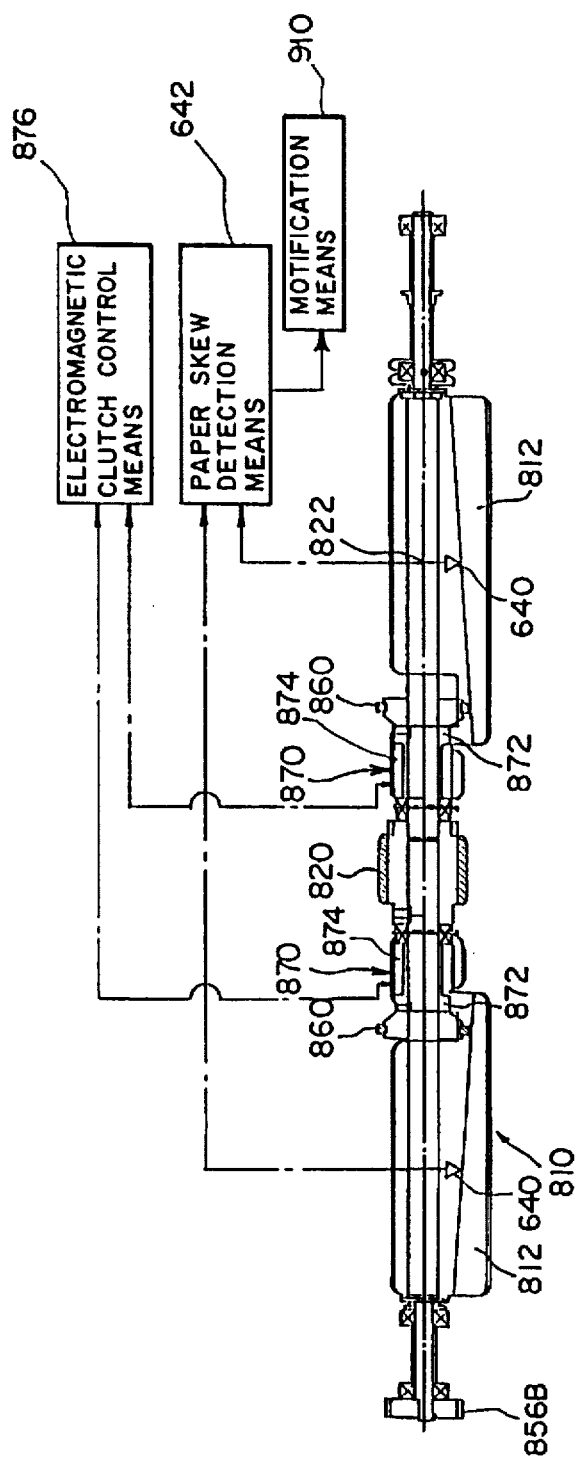
FIG. 59 is a plan view showing another form of a separation roller driving system of the image reading apparatus of FIG. 4.
Figure 60:
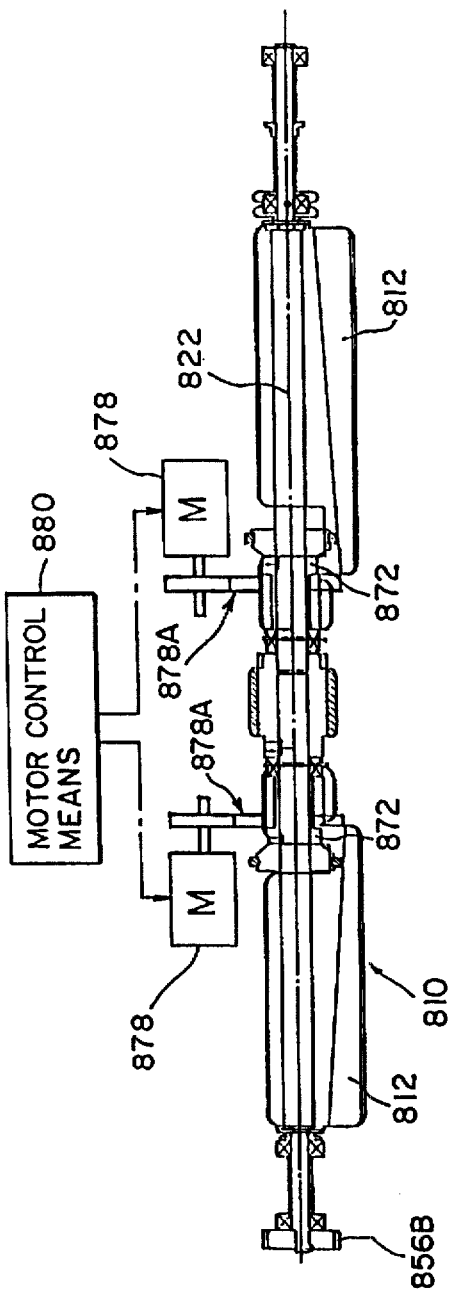
FIG. 60 is a plan view showing a further form of the separation roller driving system of the image reading apparatus of FIG. 4.

The paper skew prevention means may alternatively have such a construction as shown in FIG. 59 or 60. It is to be noted that FIGS. 59 and 60 correspond to FIG. 17(A).

Referring first to FIG. 59, in the paper skew prevention means of the construction shown, the auxiliary rollers 860 are loosely fitted on and coaxially with the axis 822 of the separation roller 820, and an electromagnetic clutch 874 is provided in each of the driving systems 870 for the auxiliary rollers 860. The paper skew prevention means further includes paper guiding condition detection means 640 for detecting paper guiding conditions of the movable guide members 812, and paper skew detection means 642 for detecting a paper skew condition from a difference between the paper guiding conditions of the movable guide members 812 detected by the paper guiding condition detection means 640. The paper skew prevention means further includes electromagnetic clutch control means 876 for controlling the electromagnetic clutches 874 by on/off control in response to a result of the detection by the paper skew detection means 642. Further, a pair of one-way clutches 872 are provided in series in addition to the electromagnetic clutches 874.

In the paper skew prevention means of the construction described above, if a paper skew condition occurs with a paper sheet being transported, differential movements can be provided to the left and right auxiliary rollers 860 thereby to positively correct the paper sheet from the paper skew condition to a correct paper condition. Consequently, a paper skew trouble can be prevented.

It is to be noted that the paper guiding condition detection means 640 may be constituted from a pair of photo-sensors which detect passage of an end of a paper sheet. In this instance, if there is a time lag between passages of an end of a paper detected by the left and right photo-sensors, how much skew the paper sheet has, that is, a paper skew condition, can be determined from a magnitude of the time lag by the paper skew detection means 642.

Further, the paper skew prevention means may further include notification means 910 for notifying, when a paper skew occurs, such occurrence of a paper skew based on detection by the paper skew detection means 642. While the notification means 910 may be considered unnecessary if such means for positively correcting a paper skew condition as the electromagnetic clutch control means 876 is provided, if such a case that correction of a paper skew cannot be performed sufficiently by the paper skew correction means is taken into consideration, it is effective to additionally provide the notification means 910 to the paper skew prevention means. It is to be noted that concrete notification means may be, for example, to sound an alarm, to light an alarming lamp or to display a message.

Referring now to FIG. 60, the paper skew prevention means shown includes a pair of motors 878 and associated gear mechanisms 878A for individually driving the auxiliary rollers 860, and, in place of the electromagnetic clutches 874 shown in FIG. 59, motor control means 880 for controlling operation of the motors 878.

In this instance, the motor control means 880 controls the speeds of rotation of the motors 878 of the auxiliary rollers 860 in response to a result of detection by the paper skew detection means 642. Consequently, control to prevent a paper skew can always be performed so that a paper skew condition may not occur.

It is to be noted that also the present paper skew prevention means may additionally include notification means 910 for notifying, when a paper skew occurs, occurrence of such paper skew.

4-6. Backing Portion for a Sheet Guide

The backing portion 712 or 752 of the sheet guide 710 or the auxiliary sheet guide 750 provided along the inclined transport path 312 in an opposing relationship to the image reading unit 410 may have such different forms as shown, for example, in FIGS. 61 to 70. It is to be noted that, while the different forms are described as different forms of the sheet guide 710 in the following description, they may be applied also as different forms of the auxiliary sheet guide 750.

Figure 61:
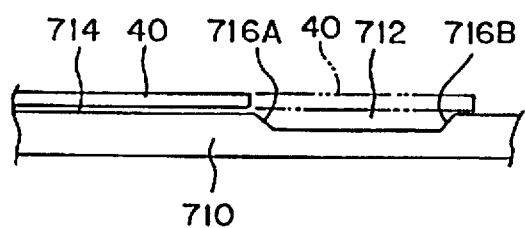
FIG. 61 is a schematic side elevational sectional view showing another form of a backing element and an adjacent member of the image reading apparatus of FIG. 4.

Referring first to FIG. 61, the backing portion 712 for providing a color reference to a paper sheet 40 is concaved with respect to the paper guiding portion 714 for guiding a paper sheet, similarly as in the embodiment described hereinabove. In the present form, however, the backing portion 712 is concaved by providing a pair of steps 716A and 716B, similarly as in the auxiliary sheet guide 750, and the paper guiding portion 714 is formed forwardly and rearwardly of the backing portion 712. Due to the construction, the backing portion 712 does not contact directly with a paper sheet. Further, the steps 716A and 716B are inclined at obtuse angles with respect to the backing portion 712 and the paper guiding portion 714, and consequently, particularly when a paper sheet 40 passes the step 716B on the downstream side (right side in FIG. 61) in the transporting direction, even if, for example, the leading end 46A of the paper sheet 40 contacts with the step 716B, it is guided by the inclined face of the step 716B so that the paper sheet 40 is transported smoothly along the step 716B.

Figure 62:
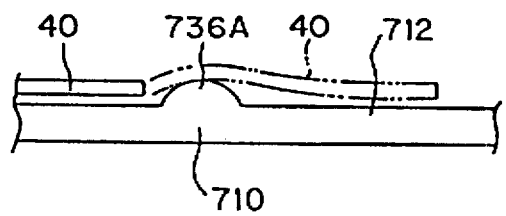
FIG. 62 is a schematic side elevational sectional view showing a further form of the backing element and adjacent member of the image reading apparatus of FIG. 4.
Figure 63:
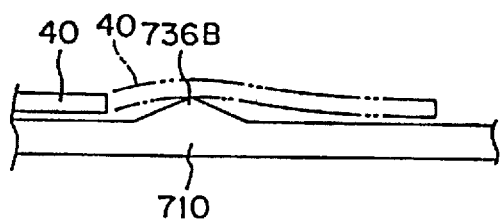
FIG. 63 is a schematic side elevational sectional view showing a still further form of the backing element and adjacent member of the image reading apparatus of FIG. 4.

Meanwhile, in the forms of the backing portion 712 shown in FIGS. 62 and 63, a protrusion 736A or 736B is provided on the paper guiding portion 714 immediately forwardly of the backing portion 712. The shape of the protrusion may be such a curved face shape as shown in FIG. 62 or such a roof-like shape as shown in FIG. 63. A paper sheet 40 is guided by the protrusion 736A or 736B such that it is not contacted directly with the backing portion 712.

Figure 64:
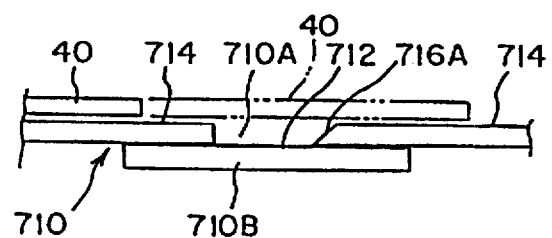
FIG. 64 is a schematic side elevational sectional view showing a yet further form of the backing element and adjacent member of the image reading apparatus of FIG. 4.

Or, the backing portion 712 may be concaved in such a manner as shown in FIG. 64 wherein a slit 710A is formed in the sheet guide 710 and a backing portion 710B of another member is securely mounted on the rear side of the slit 710A. Also in this instance, a step 716A of the backing portion 710B on the downstream side (right side in FIG. 64) in the transporting direction is formed in an obtuse angle so that a paper sheet 40 may be transported smoothly along the same.

In any of the forms described hereinabove, such a construction as described above prevents the backing portion 712 from contacting directly with a paper sheet and prevents sticking of paper powder or soiling substance to the backing portion 712. Consequently, the backing portion 712 can provide an appropriate color reference for a long period of time, which assures high performances and high reliability of the image apparatus and provides advantage in maintenance.

Meanwhile, in the forms shown in FIGS. 65 to 68, a slit 710A is formed in the sheet guide 710, and a backing member 720 formed as a rotary member is provided on the rear side of the slit 710A. In any of the forms, the backing member 720 in the form of a rotary member provides, at an outer circumferential face 720A thereof, a color reference to a paper sheet 40, and is supported for rotation so that the circumferential face 720A thereof may move in the paper transporting direction.

In particular, in the form shown in FIG. 65, no particular driving means is provided, but the backing member 720 is supported for smooth rotation so that, when a paper sheet 40 being transported is contacted with the circumferential face 720A of the backing member 720, the circumferential face 720A is moved readily in the paper transporting direction by the paper sheet 40. Accordingly, the paper sheet 40 being transported does not contact with the circumferential face 720A of the backing member 720. Consequently, otherwise possible sticking of paper powder or soiling substance to the circumferential face 720A which provides a color reference is reduced, and accordingly, the backing member 720 can provide an appropriate color reference for a long period of time, which assures high performances and high reliability of the image apparatus and provides advantage in maintenance.

Figure 67:
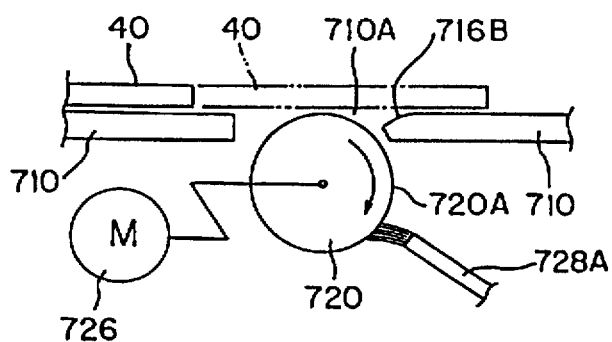
FIG. 67 is a schematic side elevational sectional view showing a yet further form of the backing element and adjacent member of the image reading apparatus of FIG. 4.
Figure 68:
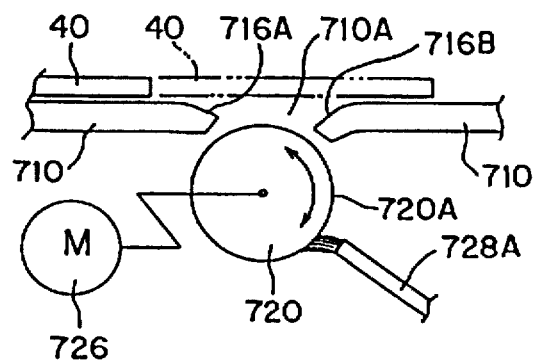
FIG. 68 is a schematic side elevational sectional view showing a yet further form of the backing element and adjacent member of the image reading apparatus shown in FIG. 4.

On the other hand, the forms shown in FIGS. 66 to 68 include a motor 726 for driving the backing member 720 to rotate. In particular, at least in the forms shown in FIGS. 66 and 67, the motor 726 drives the backing member 720 to rotate such that the speed of movement of the backing member 720 may coincide with the transportation speed of a paper sheet 40 being transported. Accordingly, also in those forms, the paper sheet 40 being transmitted does not contact with the circumferential face 720A of the backing member 720. Consequently, otherwise possible sticking of paper powder or soiling substance to the circumferential face 720A which provides a color reference is reduced, and accordingly, the backing member 720 can provide an appropriate color reference for a long period of time, which assures high performances and high reliability of the image apparatus and provides advantage in maintenance.

Particularly in the form shown in FIG. 67, a brush 728A is provided for sliding contact with the circumferential face 720A of the backing member 720 so that paper powder or soiling substance sticking to the circumferential face 720A may be automatically removed by the brush 728A when the backing member 720 rotates. Consequently, the backing member 720 can provide an appropriate color reference for a longer period of time, which assures higher performances and higher reliability of the image apparatus and provides higher advantage in maintenance.

Meanwhile, in the form shown in FIG. 68, the backing member 720 is provided in a suitably spaced relationship from the inclined transport path 312 so that the circumferential face 720A thereof may not contact with a paper sheet 40 being transported. Also the backing member 720 is driven to rotate by a motor 726. In this instance, however, the backing member 720 need not specifically be driven to rotate such that the speed of movement of the circumferential face 720A thereof coincides with the transportation speed of a paper sheet 40 being transported. The reason why the backing member 720 is driven to rotate here is that it is intended to allow paper powder or soiling substance sticking to the circumferential face 720A of the backing member 720 being rotated to be automatically removed by a brush 728A provided for sliding contact with the circumferential face 720A of the backing member 720 similarly as in the several forms described above. In the form of the construction just described, since the circumferential face 720A of the backing member 720 does not contact with a paper sheet 40 being transported, soiling to the circumferential face 720A is naturally little, and besides, paper powder or soiling substance sticking to the circumferential face 720A is automatically removed by the brush 728A. Accordingly, the backing member 720 can provide an appropriate color reference for a very long period of time, which assures high performances and high reliability of the image apparatus and provides high advantage in maintenance.

Further, in the form shown in FIGS. 69(A) to 69(C) or 70(A) to 70(C), a backing member 722 or 724 is constructed for movement in an interlocking relationship with an opening or closing movement of the apparatus lid 20 by way of an interlocking mechanism 730 or 732. Also a brush 728B or 728C is provided for cleaning the backing member 722 or 724 in response to a movement of the backing member 722 or 724. Each of the backing members 722 and 724 is provided on the rear side of a slit 710A formed in the sheet guide 710.

Figure 69A:
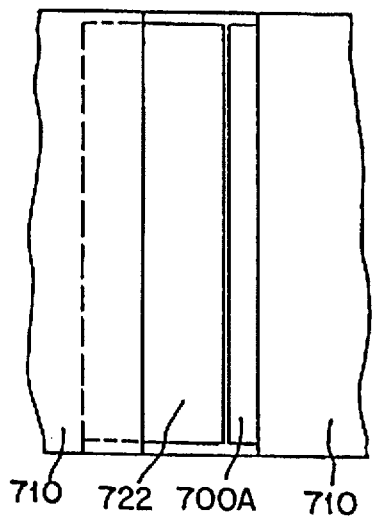
FIG. 69(A) is a schematic plan view showing a yet further form of the backing element and adjacent member of the image reading apparatus of FIG. 4, and FIGS. 69(B) and 69(C) are schematic side elevational sectional views the backing element and adjacent member shown in FIG. 69(A)
Figure 69B:
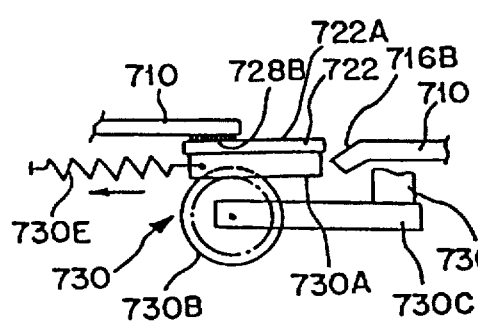
Figure 69C:
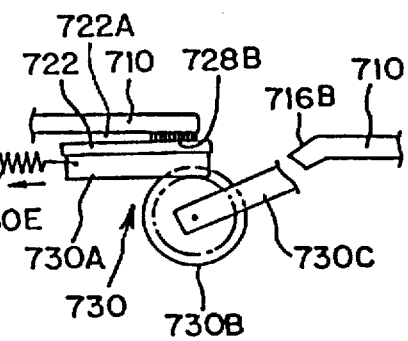

In particular, in the form shown in FIGS. 69(A) to 69(C), the backing member 722 provides, at a surface (upper face) 722A thereof formed as a plate, a color reference to a paper sheet.

The interlocking mechanism 730 for moving the backing member 722 includes a rack-and-pinion mechanism including a rack 730A provided on the rear face of the backing member 722 and a pinion 730B secured at a position at which it meshes for rotation with the rack 730A, an arm 730C provided integrally with the pinion 730B, a stopper 730D for contacting with an end portion of the arm 730C, and a spring 730E for biasing the backing member 722 in its opening (non-use) direction.

In the present form, the backing member 722 is used at such a position at which it covers over the slit 710A as seen from FIGS. 69(A) and 69(B). This position of the backing member 722 is realized by restricting pivotal motion of the arm 730C by means of the stopper 730D. In particular, the stopper 730D is provided on and for integral displacement with the apparatus lid 20. Here, when the apparatus lid 20 is closed so that the image reading apparatus may be used, the stopper 730D is displaced downwardly as seen in FIG. 69(B), but when the apparatus lid 20 is opened, the stopper 730D is displaced upwardly in FIG. 69(B) by the apparatus lid 20.

If the stopper 730D is displaced upwardly in this manner, then pivotal motion of the arm 730C is not restricted any more, and consequently, the arm 730C is rocked upwardly by the biasing force of the spring 730E, whereupon the pinion 730B is rotated in the counterclockwise direction in FIG. 69(B) to move the backing member 722 in the leftward direction in FIG. 69(B) to its opening position (non-use condition) as shown in FIG. 69(C).

On the contrary, if the apparatus lid 20 in the non-use condition is closed, then the stopper 730D is returned downwardly to displace the backing member 722 from the non-use condition shown in FIG. 69(C) to the use condition shown in FIG. 69(B).

The brush 728B is provided on the rear face of the sheet guide 710 for sliding contact with the surface 722A of the backing member 722 so that, when the backing member 722 is moved between the use condition and the non-use condition in this manner, it removes soiling substance to the surface 722A of the backing member 722.

Figure 70A:
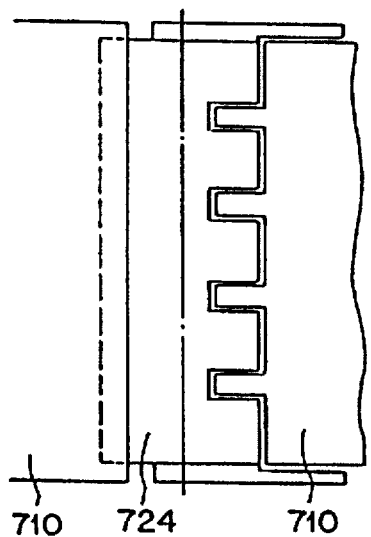
FIG. 70(A) is a schematic plan view showing a yet further form of the backing element and adjacent member of the image reading apparatus of FIG. 4, and FIGS. 70(B) and 70(C) are schematic side elevational sectional views the backing element and adjacent member shown in FIG. 70(A)
Figure 70B:
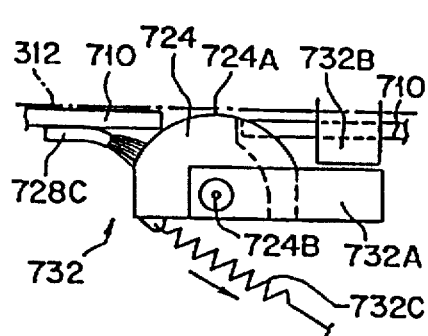
Figure 70C:
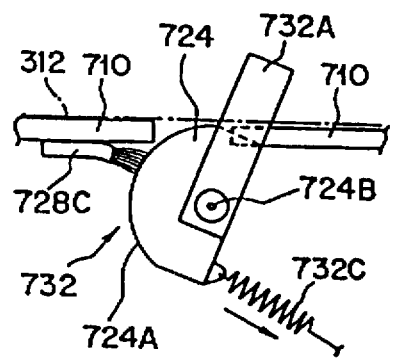

Meanwhile, in the form shown in FIGS. 70(A) to 70(C), the backing member 724 is constructed as a rotary member which has a semi-cylindrical circumferential face 724A and rotates around a shaft 724B, and it provides, at the circumferential face 724A thereof, a color reference to a paper sheet.

The interlocking mechanism 732 for moving the backing member 724 includes an arm 732A provided integrally with the backing member 724, a stopper 732B for contacting with an end portion of the arm 732A, and a spring 732C for biasing the backing member 724 to its non-use condition.

With the interlocking mechanism 732, the backing member 724 assumes its use condition in a posture in which the circumferential face 724A thereof is directed toward the slit 710A as seen in FIGS. 70(A) and 70(B). In this instance, the stopper 732B restricts pivotal motion of the arm 732A to hold the use condition of the backing member 724. In particular, the stopper 732B is provided on the apparatus lid 20 for integral displacement with the apparatus lid 20. Here, when the apparatus lid 20 is closed so that the image reading apparatus may be used, the stopper 732B is displaced downwardly as seen in FIG. 70(B), but when the apparatus lid 20 is opened, the stopper 732B is displaced upwardly in FIG. 70(B) by the apparatus lid 20.

If the stopper 732B is displaced upwardly in this manner, pivotal motion of the arm 732A is not restricted any more, and consequently, the arm 732A is rocked upwardly in FIG. 70(B) by the biasing force of the spring 732C to rotate the backing member 724 in the counterclockwise direction in FIG. 70(B).

On the contrary, if the apparatus lid 20 in the open condition is closed, then the stopper 732B is returned downwardly to displace the backing member 724 from the non-use condition shown in FIG. 70(C) to the use condition shown in FIG. 70(B).

It is to be noted that, as shown in FIG. 70(A), the backing member 724 and the sheet guide 710 have, at end faces adjacent the slit 710A thereof, complementary concave and convex portions which alternately enter each other so that a paper sheet 40 may be transported smoothly at a boundary location between the backing member 724 and the sheet guide 710 on the downstream side.

The brush 728C is provided on the rear face of the sheet guide 710 for sliding contact with the circumferential face 724A of the backing member 724 so that, when the backing member 724 moves between the use condition and the non-use condition in this manner, it may remove soiling substance to the circumferential face 724A of the backing member 724.

In this manner, with any of the forms shown in FIGS. 69 and 70, each time the apparatus lid 20 is opened and closed, paper powder or soiling substance sticking to the surface 722A or the circumferential face 724A of the backing member is automatically removed by the brush 728B or 728C. Accordingly, the backing member can provide an appropriate color reference for a very long period of time, which assures high performances and high reliability of the image apparatus and provides high advantage in maintenance.

Figure 71:
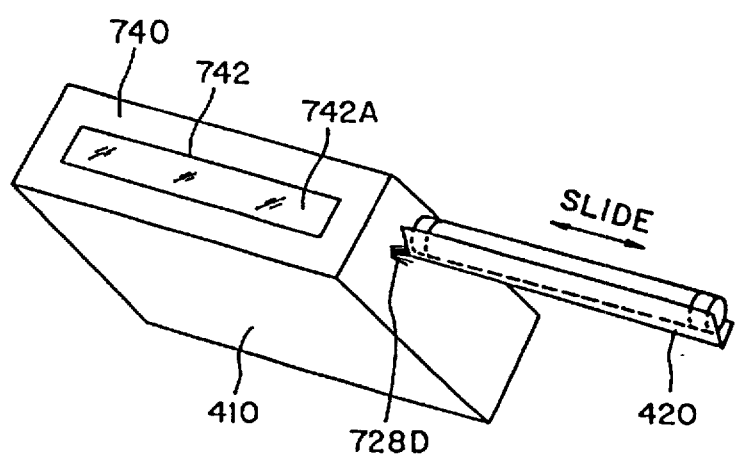
FIG. 71 is a perspective view of a form of a cleaning structure for a sheet guide with an opening of the image reading apparatus of FIG. 4.

Meanwhile, the image reading unit 410 may possibly be constructed such that, as shown in FIG. 71, a sheet guide 740 having an opening 742 is provided integrally with a casing 410A of the image reading unit 410 and a glass plate 742A is provided in the opening 742. In this instance, the lamp unit 420 has a socket element which is structured so as to allow the socket element to be pulled out from the casing 410A in order to replace a lamp. With the structure, however, when the inner side of the glass plate 742A is soiled, the soil cannot be removed readily.

Therefore, in this instance, a brush 728D is provided at an interior end portion of the socket element such that it may slidably contact with the inner side of the glass plate 742A. Thus, when the socket element is pulled out from the casing 410A in order to replace the lamp, the inner side face of the glass plate 742A is automatically cleaned by the brush 728D. Consequently, an appropriate color reference can be provided for a very long period of time, which assures high performances and high reliability of the image apparatus and provides high advantage in maintenance. In this instance, the brush 728D is located such that, when the socket element is set in position in the casing 410A, it does not make an obstacle to image reading.

4-7. Structure of the Paper Discharge Roller and Associated Elements

Figure 72:
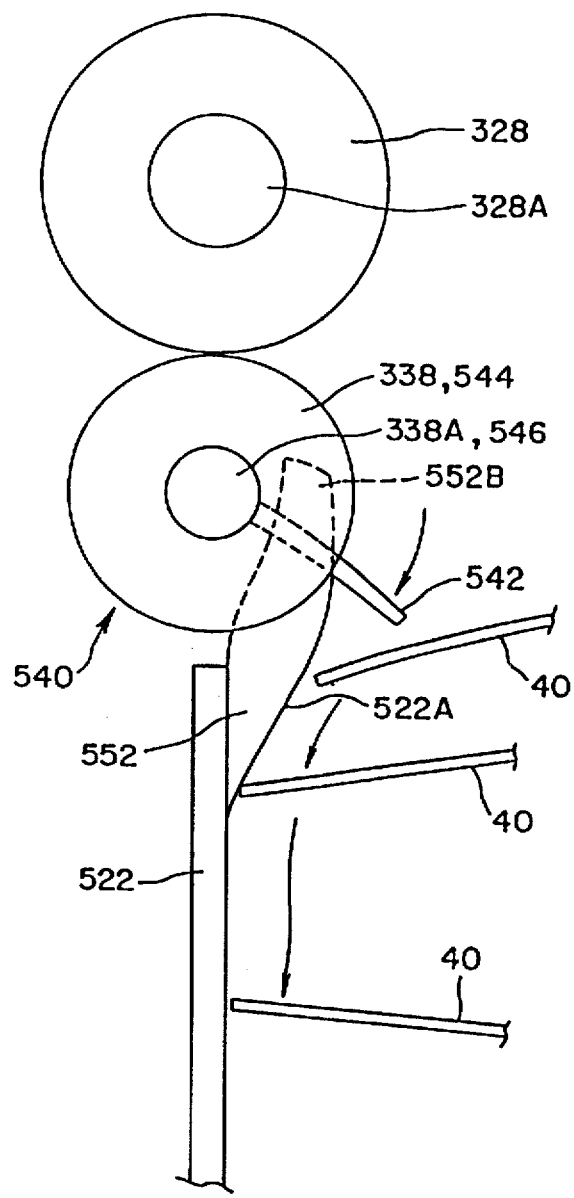
FIG. 72 is a schematic side elevational view showing another construction of the paper discharge roller mechanism in the image reading apparatus of FIG. 4.

While the paper discharge roller 544 of the paper discharge roller mechanism 540 in the embodiment is provided on the common shaft to the paper discharging roller 328, the paper discharge roller 544 may otherwise be provided on the common shaft to the idler roller 338 as shown, for example, in FIG. 72.

In particular, referring to FIG. 72, the rotary shaft 338A of the idler roller 338 serves also as the rotary shaft 546 of the paper discharge roller 544 so that the paper discharge roller 544 may be rotated integrally with the idler roller 338.

The paper discharge roller 544 is provided between each adjacent ones of a plurality of idler rollers 338 disposed in a suitably spaced relationship from each other on the rotary shaft 338A and has a projection 542 extending outwardly. The projection 542 is in the form of a tab extending outwardly farther than the outer peripheries of the idler rollers 338 and is made of a resilient flexible material so that it may be resiliently yielded when it is contacted with the opposing paper discharging roller 328 or the end frame 522.

Meanwhile, the paper trailing end guide members 552 are formed such that upper end portions 552B thereof extend by such a great extent as to project between gaps between the paper discharge roller 544 and the idler roller 338.

Due to the structure described above, the projections 542 project into the paper reversing transport path 314 of the paper transport path 310 so that, when a paper sheet 40 being transported comes there, they push up the trailing end of the paper sheet 40 to guide it so that it may be discharged into the paper stacking mechanism 500. Further, the thus discharged paper sheet 40 is guided at the trailing end thereof by the projections 542 and the guide face 552A of the paper trailing end guide member 552 so that it moves down along the end frame 522 as seen in FIG. 72. Consequently, the paper sheet 40 is stacked regularly on the paper stacker 510.

4-8. Image Reading Unit System

The discrimination mark 50 may be constructed in such a manner as described below.

In particular, the discrimination mark 50 may be constituted from a combination of a plurality of marks. In this instance, for example, when information on a read face of a paper sheet is read, some other information such as, for example, read area information can be read simultaneously. Consequently, reading of image information can be performed efficiently, and an increase in processing speed in image reading can be promoted while assuring the reliability.

Meanwhile, the discrimination mark 50 may be marked in a drop-out color which cannot be read by the optical image reading units 412 and 414. In this instance, an optical discrimination mark image reading unit 470 (refer to a chain line block in FIG. 7) for exclusive use for reading the discrimination mark 50 of the drop-out color may be provided so that control by the image information extraction control means 440 may be performed based on detection information of the optical discrimination mark image reading unit 470.

Where the construction just described is employed, since image information to be read originally which does not include image information of a discrimination mark is read by the optical image reading unit 410, appropriate image information can be obtained. Further, where a pair of such optical discrimination mark image reading units 470 are provided on the upstream side of the optical image reading units 412 and 414 along the paper transport path 310 as seen in FIG. 7, a discrimination mark can be read before a paper sheet 40 advances into the optical image reading unit 412 or 414. Consequently, it is advantageous also in that image information extraction control can be performed appropriately.

Naturally, the image information extraction control is performed based not only on a discrimination mark but also on a result of selection by the paper reading selection means 924L.

Further, while it depends upon setting of an indication of a discrimination mark, such optical discrimination mark image reading unit 470 may be provided on one side or both sides of the optical image reading unit 412 side and the optical image reading unit 414 side with respect to the paper transport path 310.

4-9. Paper Stacking Mechanism

Subsequently, alternative forms of the paper stacking mechanism 500 will be described.

The paper stacking mechanism 500 in the embodiment includes the paper stacker position variation mechanism 530 in which the position of the paper stacker 510 is adjusted manually by selecting the insertion holes 522A into which the fitting projections 526 should be inserted. However, the paper stacker position variation mechanism 530 may be modified in such a manner as shown in FIG. 73 wherein the stacker table 520 of the paper stacker 510 is supported, at a base end portion (right end portion in FIG. 73) thereof, for pivotal motion around a fulcrum 520A such that a front end portion of the stacker table 520 may be moved upwardly or downwardly thereby to allow manual adjustment of the paper stacker 510.

In this instance, a latch mechanism 524 may be provided which allows a downward movement of the stacker table 520 but does not allow an upward movement of the stacker table 520 unless the stacker table 520 is unlatched from the latch mechanism 524. Thus, if the front end portion of the stacker table 520 is manually pushed downwardly, the stacker table 520 is moved down and thereafter held at the lowered position. Then, if the stacker table 520 is unlatched from the latch mechanism 524, the stacker table 520 is returned to its uppermost position. The construction just described is advantageous in that the stacker table 520 can be moved down to a suitable position readily by a simple operation.

Although the position of the paper stacker 510 can be adjusted in advance with the paper stacker position variation mechanism 530 of the embodiment or the paper stacker position variation mechanism 530 described just above, the amount of paper sheets which can be stacked in the paper stacker 510 varies depending upon the position of the paper stacker 510 adjusted in advance in this manner.

Thus, such a situation should be eliminated that the amount of paper sheets stacked in the paper stacker 510 exceeds the amount of paper sheets which can be stacked on the paper stacker 510 at the position adjusted in advance and some paper sheets may overflow from the paper stacker 510.

Figure 74:
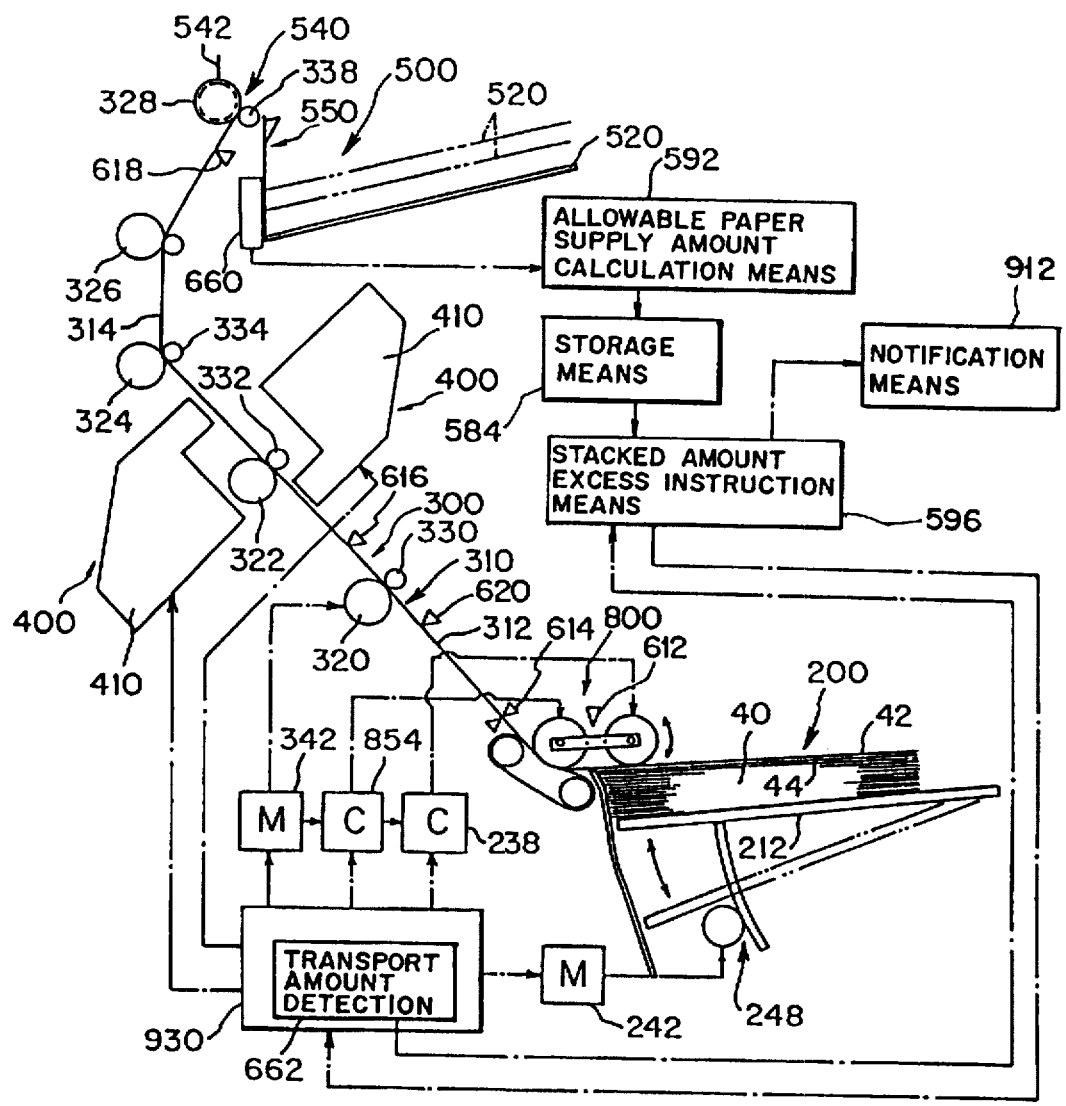
FIG. 74 is a schematic diagrammatic view showing a control system where the paper stacking mechanism shown in FIG. 73 is employed.

To this end, the image reading apparatus may additionally includes, for example, as shown in FIG. 74, paper stacker position detection means 660 for detecting the position of the paper stacker 510, allowable paper supply amount detection means 592 for calculating, based on a result of detection of the paper stacker position detection means 660, an allowable paper supply amount by which paper sheets can be supplied from the paper stacker 510 at the adjusted position, storage means 584 for storing the allowable paper supply amount calculated by the allowable paper supply amount detection means 592, transportation amount detection means 662 for detecting a transportation amount of paper sheets 40, and stacked amount excess instruction means 596 for comparing a detection amount detected by the transportation amount detection means 662 with the allowable paper supply amount stored in the storage means 584 and developing, when the detection amount exceeds the allowable paper supply amount, an instruction to render the notification means 912 operative to notify such excess and another instruction to stop transportation of paper sheets 40.

It is to be noted that the transportation amount of paper sheets can be detected, for example, by counting the number of transported paper sheets based on paper passage information from various sensors such as the transportation sensors 614 and 616 and the discharge sensor 618 or by counting the number of issued start commands for paper transportation or the like. Such a counter device which is generally provided in the control section 930 as mentioned above can be employed as the transportation amount detection means 662.

Generally, the allowable paper supply amount detection means 592, the storage means 584 and/or the stacked amount excess instruction means 596 are incorporated in the control section 930.

Due to the means described above, such a disadvantage that paper sheets overflow from the paper stacker 510 is eliminated.

The means described above may be modified such that, if the detection amount detected by the transportation amount detection means 662 exceeds a value smaller than the allowable paper supply amount stored in the storage means 584 (for example, available paper supply amount×0.9), this is notified from the stacked amount excess instruction means 596 by way of the notification means 912, and when the detection amount detected by the transportation amount detection means 662 thereafter reaches the allowable paper supply amount stored in the storage means 584, an instruction to stop transportation is developed.

Where the stacked amount excess instruction means 596 is constructed in such a manner described just above, if the paper stacking mechanism 500 is constructed such that the stacker table 520 can be moved downwardly to adjust its position readily by a simple operation (refer to FIG. 73) also while paper sheets are stacked on the stacker table 520, then if an operator manually adjusts the stacker table 520 in response to a notification from the notification means 912, then the allowable paper supply amount increases at this stage. Consequently, the disadvantage that paper sheets overflow from the paper stacker 510 can be eliminated without stopping operation of the image reading apparatus. In this instance, a transportation amount from starting of the operation is compared with the new allowable paper supply amount, and if a required condition is reached, then the notification means 912 is rendered operative again.

Alternatively, the transportation amount detection means 662 described above may be replaced by hopper vertical movement amount detection means 664 for detecting a vertical movement amount of the paper supply hopper 210 (a vertical movement amount of the hopper table 212) such that the paper stacker 510 is controlled in response to an amount of a vertical movement of the paper supply hopper 210 detected by the hopper vertical movement amount detection means 664.

Figure 75:
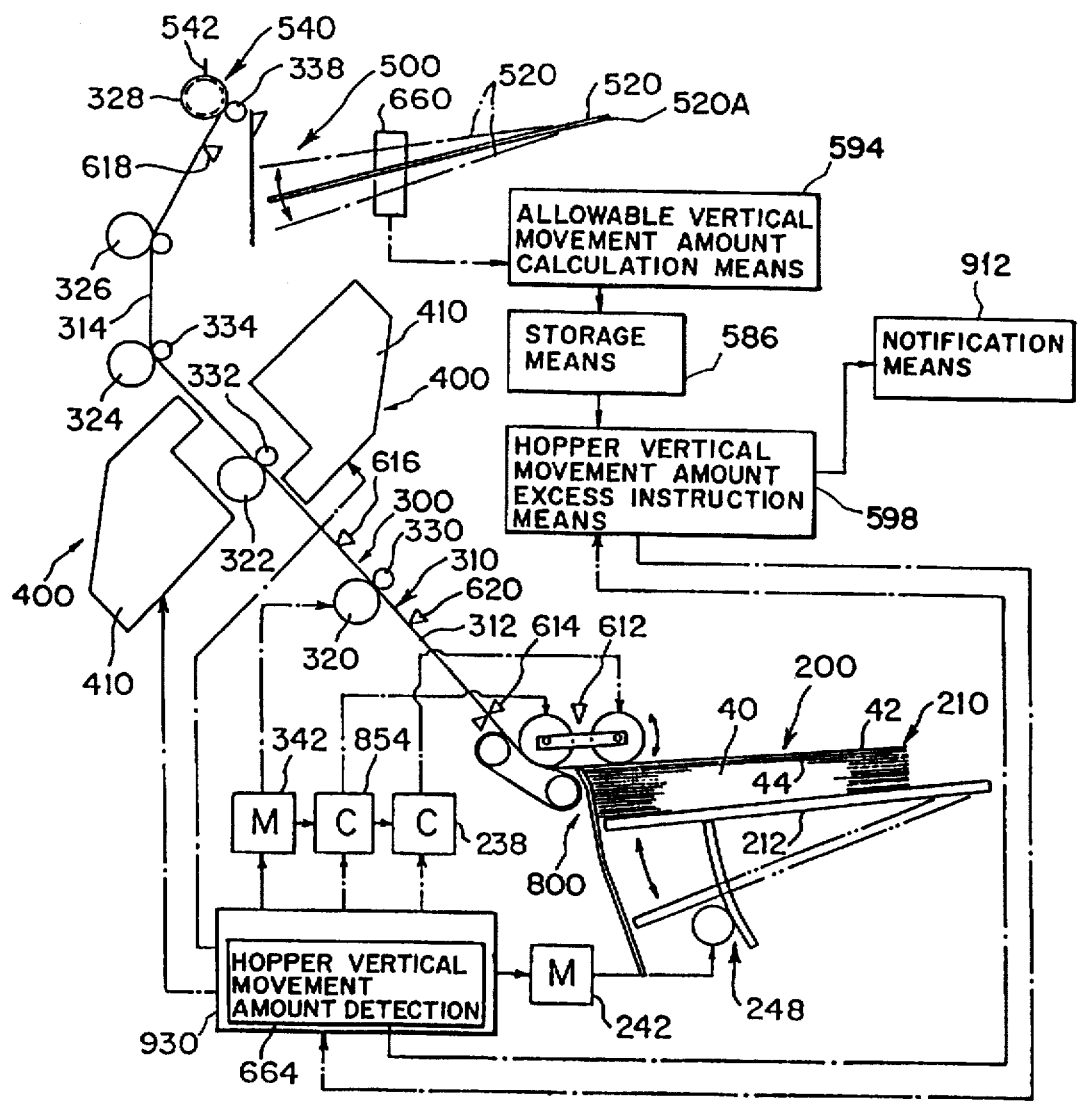
FIG. 75 is a similar view but showing another control system where the paper stacking mechanism shown in FIG. 73 is employed.

In particular, the image reading apparatus includes, as shown in FIG. 75, paper stacker position detection means 660 for detecting the position of the paper stacker 510, allowable vertical movement amount calculation means 594 for calculating an allowable vertical movement amount of the paper supply hopper 210 corresponding to the position of the paper stacker 510 based on a result of detection by the paper stacker position detection means 660, storage means 586 for storing the allowable vertical movement amount calculated by the allowable vertical movement amount calculation means 594, hopper vertical movement amount detection means 664 for detecting a virtual movement amount of the hopper table 212 of the paper supply hopper 210, and hopper vertical movement amount excess instruction means 598 for comparing a detection amount detected by the hopper vertical movement amount detection means 664 and the allowable vertical movement amount stored in the storage means 586 and developing, when the detection amount exceeds the allowable vertical movement amount, an instruction to render the notification means 912 operative to notify such excess and another instruction to stop transportation of a paper sheet.

It is to be noted that, since the vertical movement amount of the paper supply hopper 210 can be obtained by counting hopper vertical movement pulses outputted from the control section 930, such a counting function section which is generally provided in the control section 930 can be used as the hopper vertical movement amount detection means 664.

Further, the allowable vertical movement amount calculation means 594, the storage means 586 and/or the hopper vertical movement amount excess instruction means 598 are generally incorporated in the control section 930.

Due to the construction, such a disadvantage that paper sheets overflow from the paper stacker 510 is eliminated.

Also in this instance, the image reading apparatus may be constructed such that the notification means 912 is rendered operative at a stage before the vertical movement amount of the paper stacker 510 reaches the allowable vertical movement amount and then transportation of a paper sheet is stopped after the allowable vertical movement amount is reached. Where the construction just described is employed, the disadvantage that paper sheets overflow from the paper stacker 510 can be eliminated without stopping operation of the image reading apparatus.

By the way, while, in the various forms described above, the paper stacker position variation mechanism 530 is constructed such that the position of the stacker table 520 can be moved upwardly and downwardly by manual operation, the paper stacker position variation mechanism 530 may otherwise be constructed so as to operate automatically.

Figure 76:
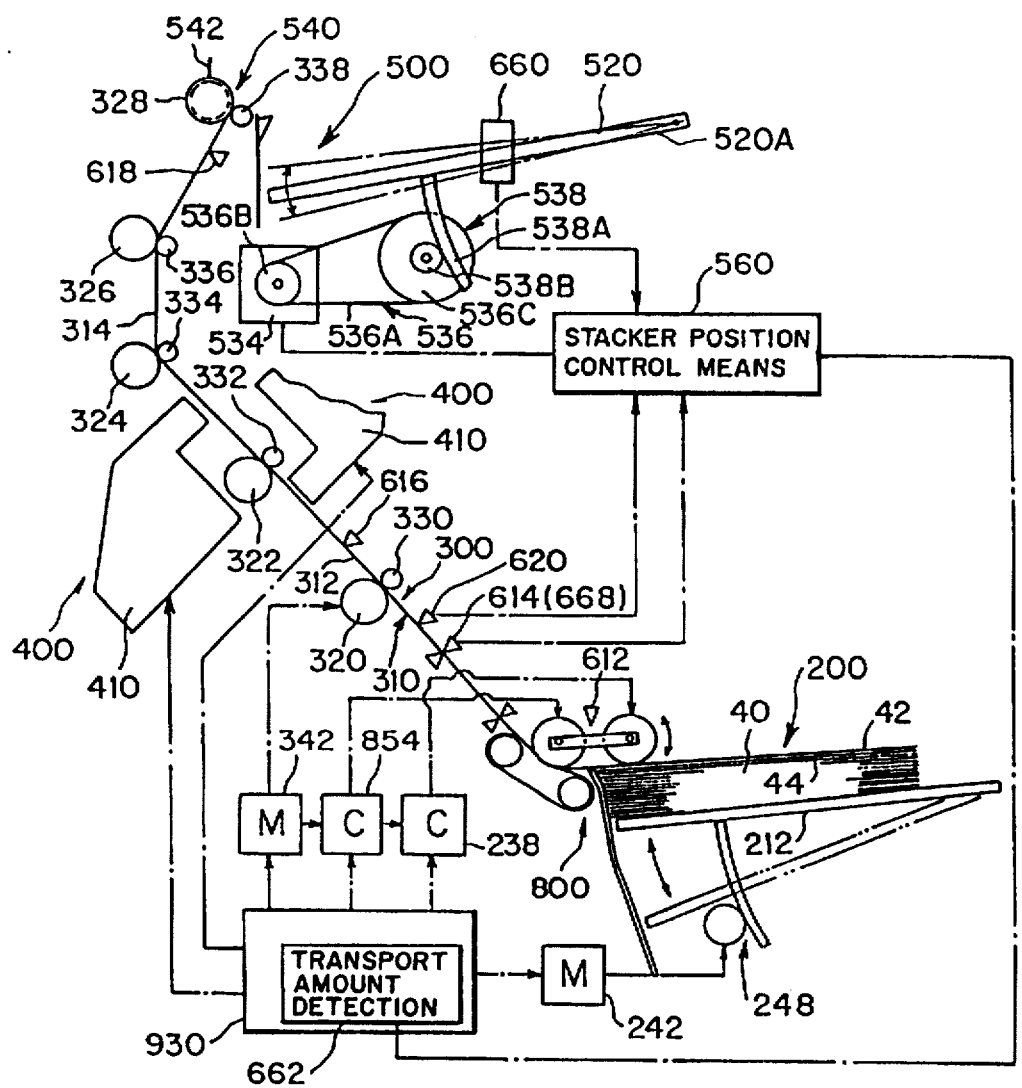
FIG. 76 is a similar view but showing a further paper stacking mechanism according to the present invention and a control system for the paper stacking mechanism.

For example, the paper stacker position variation mechanism 530 may be constructed in a similar manner to the paper supply hopper driving mechanism 240 as shown in FIG. 76. In particular, referring to FIG. 76, the paper stacker position variation mechanism 530 is constructed such that the stacker table 520 is mounted for pivotal motion around a fulcrum 520A at a rear or trailing end portion thereof in the paper discharging direction (at a right end portion in FIG. 76), and a driving motor (stacker motor) 534 serving as a stacker table pivoting driving mechanism for driving the stacker table 520 to pivot is provided.

A stepper motor may be employed as the driving motor 534, and the driving motor 534 and the stacker table 520 are connected to each other by way of a belt-and-pulley mechanism 536 including a belt 536A and a pair of pulleys 536B and 536C, and a rack-and-pinion mechanism 538 including a rack 538A and a pinion 538B. In particular, the pulley 536B is mounted on a rotary shaft of the driving motor 534 while the other pulley 536C is mounted on a rotary shaft of the pinion 538B, and the rack 538A is provided on the stacker table 520. It is to be noted that, similarly as in the form of the paper supply hopper driving mechanism 240 described hereinabove with reference to FIG. 58, the rotary shaft of the driving motor 534 and the rotary shaft of the pinion 538B may be connected to each other by way of a gear mechanism.

The paper stacker position variation mechanism 530 which employs the driving motor 534 described above requires means (stacker position control means) for controlling operation of the mechanism paper stacker position variation mechanism 530. The control means may be constructed, for example, in such a manner as shown in FIG. 76.

In particular, referring to FIG. 76, the control means shown includes paper stacker position detection means 660 for detecting the position of the paper stacker 510, that is, the vertical position of the stacker table 520, transportation amount detection means 662 for detecting a transportation amount of paper sheets 40, paper size detection means 620 for detecting the size of a paper sheet 40 transported, and paper thickness detection means 668 for detecting the thickness of a transported paper sheet 40. The stacker position control means 560 thus controls the driving motor 534 of the paper stacker position variation mechanism 530 in response to results of detection of the detection means 660, 662, 620 and 668 so that the vertical position of the stacker table 520 may be a suitable position corresponding to the paper transport amount, the paper size and the paper thickness.

It is to be noted that the paper thickness detection means 668 may include a light transmission sensor and detect an approximate thickness of a paper sheet from an amount of transmission light detected by the light transmission sensor. Further, the stacker position control means 560 is normally incorporated in the control section 930.

Meanwhile, in control based on the size of a paper sheet, for example, when the size of a paper sheet is small, a paper sheet discharged likely "dances", and if the plane onto which the thus discharged paper sheet is to be stacked (the plane corresponds to the top face of paper sheets stacked already; the plane will be hereinafter referred to as stack plane) is excessively low with respect to the discharging position of the paper sheet from the discharge roller, the paper sheet is not in most cases stacked in position. Therefore, where paper sheets of a small size are used, the stacker table 520 is adjusted to a comparatively high position so that the stack plane may be located near to the discharging position.

In contrast, when paper sheets of a large size are used, if the plane (stack plane) onto which a discharged paper sheet is to be stacked is near to the discharging position, the discharge paper sheet is acted upon by a sliding resistance from the stack plane and is not stacked well in position. Therefore, where the size of paper sheets used is large, the stacker table 520 is adjusted to a comparatively low position so that the stack plane may be spaced by a great distance from the discharging position.

Naturally, in any case, the stacker table 520 is controlled to be moved down based on the thickness of a paper sheet and the number of transported paper sheets so that the stack plane may always be positioned suitably for the size of paper sheets with respect to the discharging position.

In particular, since the stack plane, that is, the top face of paper sheets stacked on the stacker table 520, rises as paper sheets are successively stacked, in order to keep the stack plane at a predetermined position, the stacker table 520 should be moved down by a distance corresponding to a total thickness of paper sheets stacked on the stacker table 520 from its initial position.

Since the total thickness of paper sheets stacked on the stacker table 520 is calculated as a product of the thickness of a single paper sheet (paper thickness) and the number (transportation paper number) of paper sheets stacked on the stacker table 520, the stacker table 520 can be controlled to be moved down appropriately in response to the thickness of a paper sheet and the transportation paper number.

With the paper stacker position variation mechanism 530 of the construction described above, a paper sheet discharged can always be stacked smoothly for various paper sizes from a small size to a large size.

It is to be noted that, since standard paper sheets having a standard thickness which is not particularly thick nor particularly thin are generally used, if this is presupposed, even if position control of the stacker table 520 based on the transport paper number is performed without taking the paper thickness into consideration, discharged paper sheets can be stacked sufficiently well.

Further, also with regard to the paper size, if paper sheets used do not have an extremely large or small size, discharged paper sheets can be stacked sufficiently well even if position control of the stacker table 520 is performed without taking the paper size into consideration.

Figure 77:
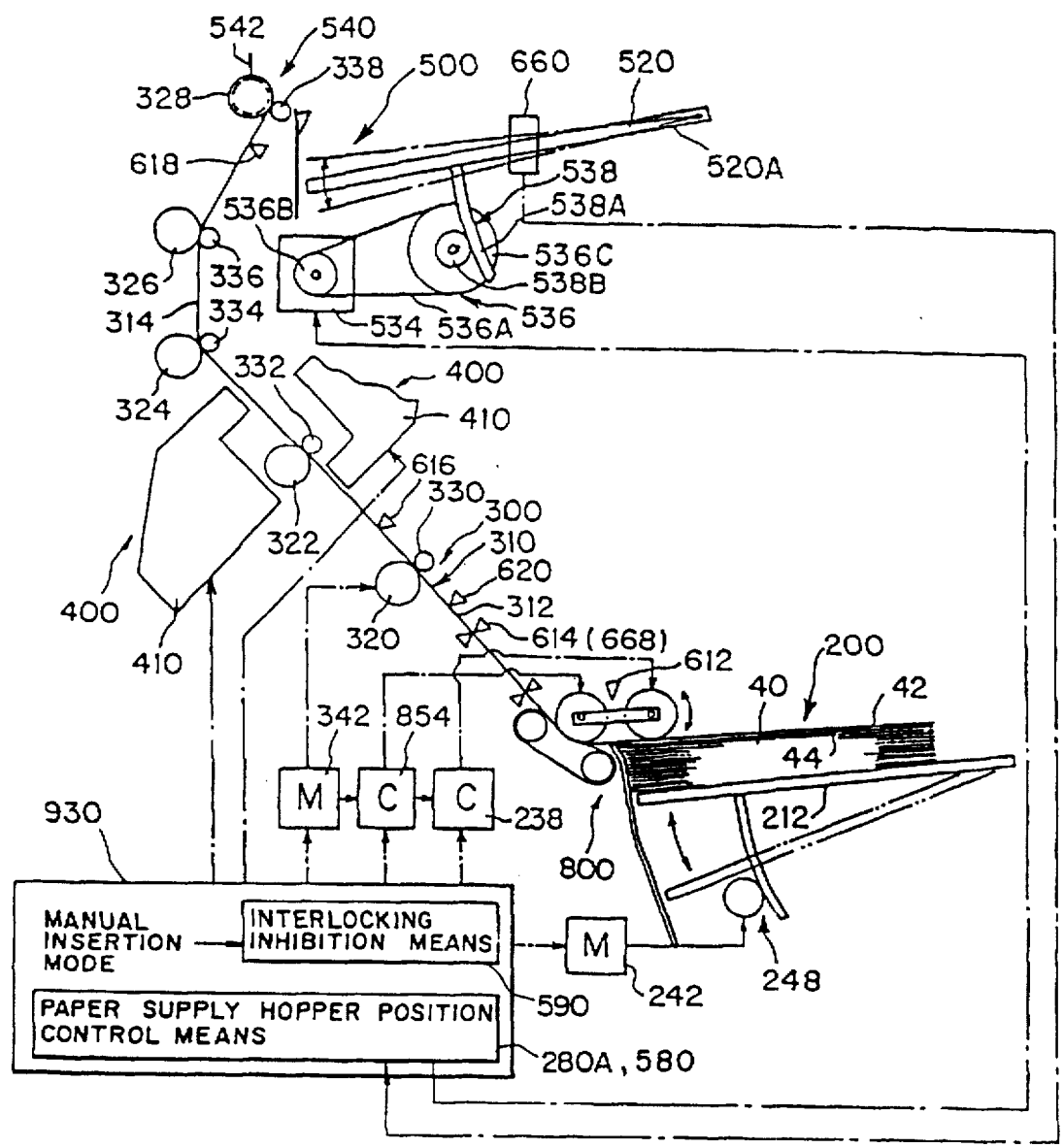
FIG. 77 is a similar view showing the paper stacking mechanism shown in FIG. 76 and another form of the control system for the paper stacking mechanism.

Further, the image reading apparatus may include, as shown in FIG. 77, interlocking means 580 for interlocking the position control of the stacker table 520 with a paper supply position adjusting operation of the paper supply mechanism 200 to operate the paper stacker position variation mechanism 530.

In particular, referring to FIG. 77, the paper supply mechanism 200 raises the position of the hopper table 212 as paper sheets 40 in the paper supply hopper 210 decrease. In contrast, in the paper stacking mechanism 500, as paper sheets 40 in the paper supply hopper 210 decrease, the paper sheets are stacked into the paper stacker 510. Accordingly, the position of the stacker table 520 should be moved down in response to the movement of the position of the hopper table 212.

Here, paper supply hopper position control means 280A outputs to the hopper motor 242 a control signal to raise the position of the hopper table 212 and outputs to the driving motor 534 another control signal to lower the position of the stacker table 520. Thus, the interlocking means 580 is constituted from the paper supply hopper position control means 280A.

Also the position control of the stacker table 520 may be performed in response to an actual stacker position detected by the paper stacker position detection means 660.

By the way, while the amount of the upward movement of the hopper table 212 and the amount of the downward movement of the stacker table 520 have a relationship to each other, the weight of paper sheets stacked on the stacker table 520 when air is included between the paper sheets is considerably greater than the weight of the paper sheets which were originally accommodated in the hopper table 212. Such difference in paper weight can be eliminated by setting the amount of downward movement of the stacker table 520 considerably greater than the amount of upward movement of the hopper table 212.

It is to be noted that the interlocking means 580 may be modified such that the paper stacker 510 is driven simultaneously with the paper supply hopper 210 by the hopper motor 242. In particular, the hopper motor 242 and the pinion 538B on the paper stacker 510 side are connected to each other by way of, for example, a gear mechanism so that, when the paper supply hopper 210 is moved upwardly, the paper stacker 510 is moved down at a required rate. In this instance, the driving motor 534 is eliminated naturally.

Further, while the image reading apparatus has the manual insertion mode in addition to the automatic modes in which a paper sheet is automatically supplied and transported, since, in the manual insertion mode, the position adjustment of the hopper table 212 is not performed and the top face of the hopper table 212 is kept at a prescribed height, if position control of the stacker table 520 is performed in an interlocking relationship with a paper supply position adjustment operation, then also the position of the stacker table 520 is kept fixed. However, also in the manual insertion mode, paper sheets are successively stacked onto the stacker table 520. Accordingly, it is inconvenient if the position of the stacker table 520 is fixed. Therefore, such interlocking means 580 includes interlocking inhibition means 590 for inhibiting an interlocking operation in the manual insertion mode.

In the manual insertion mode, the position of the stacker table 520 may be adjusted manually as in the image reading apparatus of the embodiment described above, or the position of the stacker table 520 may be automatically controlled in response to a transportation number of paper sheets as described above or additionally taking the thickness or the size of a paper sheet into consideration.

Figure 78:
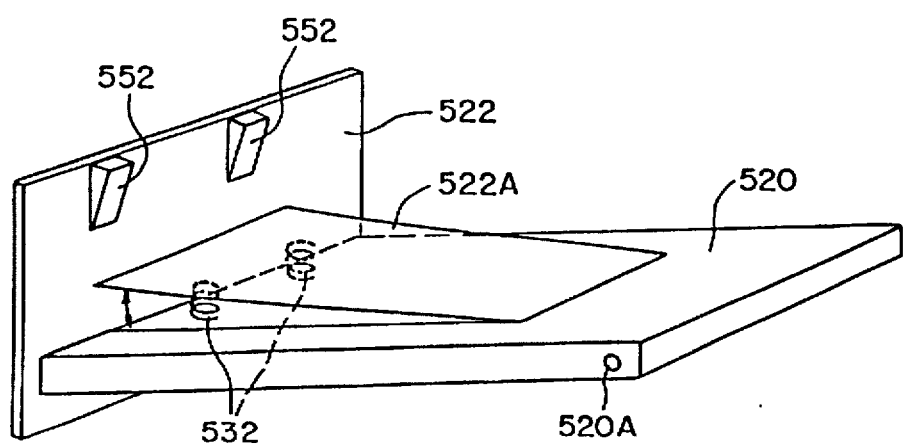
FIG. 78 is a schematic perspective view showing a still further paper stacking mechanism according to the present invention.

Further, the stacker table 520 may be constructed so as to be partially or entirely movable by way of a resilient member 532 (FIG. 78).

For example, as shown in FIG. 78, a central portion of the stacker table 520 on the front end side is divisionally formed as a movable table 520B of a small size. The movable table 520B is, for example, supported at a rear end thereof for pivotal motion and is normally biased upwardly by a pair of spring (resilient members) 532 provided on the lower face of a front end portion of the movable table 520B.

With the stacker table 520 of the construction just described, when the amount of paper sheets stacked thereon is small, the movable table 520B is positioned at an upward position by the biasing forces of the springs 532, but when the amount of stacked paper sheets increases, the movable table 520B is moved down by the weight of the thus stacked paper sheets against the biasing forces of the springs 532. When the movable table 520B is moved down to its lowermost position, the movable table 520B cooperates with a stacker table body 520C, which is the remaining portion of the stacker table 520, to present a flat upper face.

Accordingly, the plane on which a paper sheet is to be stacked (the top face of stacked paper sheets) can be maintained at an optimum position by suitably setting the springs 532.

Figure 79A:
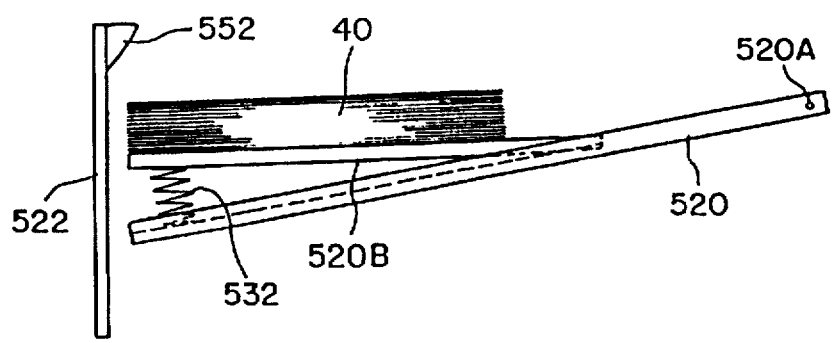
FIG. 79(A) is a schematic side elevational view of the paper stacking mechanism shown in FIG. 78 when it accommodates paper sheets of a small size.
Figure 79B:
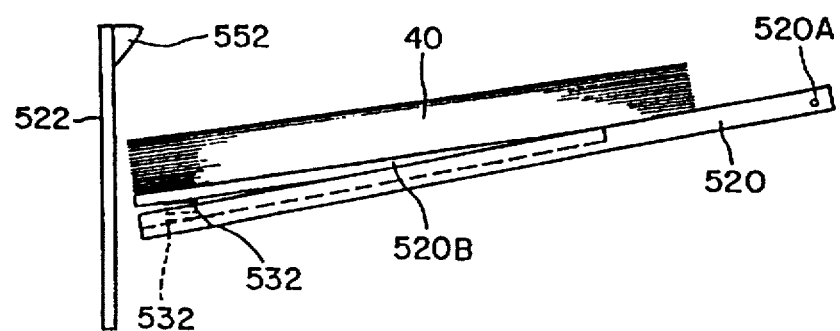
FIG. 79(B) is a similar view but showing the paper stacking mechanism when it accommodates paper sheets of a large size.

Further, as described above, when the paper size is small, the stack plane should be high, but when the paper size is large, the stack plane should be low. With the resilient supporting structure of the movable table 520B described above, if the size of a paper sheet itself is small (here it is considered that the paper thickness is fixed), even if the number of stacked paper sheets increases, the amount of downward movement of the movable table 520B is small as seen in FIG. 79(A), but if the size of a paper sheet itself is large (here it is considered that the paper thickness is fixed), the movable table 520B moves down by a great amount as the number of stacked paper sheets increases as seen in FIG. 79(B).

Accordingly, there is an advantage in that also adjustment of the height of the stack plane takes place automatically in response to a paper size.

Naturally, a similar moving down operation can be obtained even where the entire stacker table 520 is supported resiliently.

Further, if the resilient supporting structure for the movable table 520B or the movable stacker table 520 is combined with the paper stacker position variation mechanism 530 which includes the driving motor 534, since adjustment of the height of the stacker plane in response to a paper size is performed automatically by the resilient supporting structure, only if operation of the paper stacker position variation mechanism 530 is performed in response to the transportation paper number, the height of the stack plane can be performed suitably for both of the paper size and the transportation paper number.

The present invention is not limited to the specifically described embodiment, and variations and modifications may be made without departing from the scope of the present invention.

What is claimed is:

1. A paper stacking apparatus for an image reading apparatus for stacking a paper sheet discharged from a paper transport mechanism of said image reading apparatus along which an optical image reading mechanism is disposed, comprising;
    a paper stacker including, at a bottom portion thereof, a stacker table for receiving thereon paper sheets discharged from said paper transport mechanism to stack the paper sheets;
    a paper stacker position variation mechanism for varying the position of said paper stacker;
    a paper discharge roller mechanism provided at a terminal end of said paper transport mechanism and having a projection extending into a paper transport path of said paper transport mechanism;
    a paper trailing end guide mechanism disposed to extend into said paper stacker for guiding a trailing end of a paper sheet to be stacked into said paper stacker; and
    a paper side edge guide mechanism for guiding side edges of a paper sheet being stacked into said paper stacker while controlling a lateral movement of the paper sheet in a widthwise direction.

2. A paper stacking apparatus for an image reading apparatus as claimed in claim 1, wherein said paper side edge guide mechanism includes a slide element mounted for sliding movement in a widthwise direction of a paper sheet, and a paper stopper mounted on said slide element for movement between a position in which said paper stopper stands upwardly on said slide element and another position in which said paper stopper lies on said slide element.

3. A paper stacking apparatus for an image reading apparatus as claimed in claim 1, wherein said paper discharge roller mechanism includes a paper discharge roller, wherein said discharge roller has said projection provided thereon, and wherein said projection extends into said paper transport path but can be accommodated into said paper discharge roller.

4. A paper stacking mechanism for an image reading apparatus as claimed in claim 1, wherein said paper trailing end guide mechanism includes a pair of paper trailing end guide members disposed in a spaced relationship from each other in a widthwise direction of a paper sheet and directed toward said paper stacker for guiding a trailing end of a paper sheet to be stacked into said paper stacker.

5. A paper stacking apparatus for an image reading apparatus as claimed in claim 1, further comprising a paper leading end control mechanism for controlling a movement of a leading end of a paper sheet being stacked into said paper stacker.

6. A paper stacking apparatus for an image reading apparatus as claimed in claim 5, wherein said paper leading end control mechanism includes a slide element mounted for sliding movement in the paper discharging direction, and a paper stopper mounted on said slide element for movement between a position in which said paper stopper stands upwardly on said slide element and another position in which said paper stopper lies on said slide element.

7. An image reading apparatus with a paper stacking apparatus, comprising:
    a paper transport mechanism for successively transporting paper sheets set in position;
    an optical reading mechanism for optically reading information on a paper sheet being transported by said paper transport mechanism; and
    a paper stacker apparatus for stacking a paper sheet discharged from said paper transport mechanism,
    said paper stacker apparatus including a paper stacker including, at a bottom portion thereof, a stacker table for receiving thereon paper sheets discharged from said paper transport mechanism to stack the paper sheets, a paper stacker position variation mechanism for varying the position of said stacker table, a paper discharge roller mechanism provided at a terminal end of said paper transport mechanism and having a projection extending into a paper transport path of said paper transport mechanism, a paper trailing end guide mechanism disposed to extend into said paper stacker for guiding a trailing end of a paper sheet being stacked into said paper stacker, a paper side edge guide mechanism for guiding side edges of a paper sheet being stacked into said paper stacker, and a paper leading end control mechanism for controlling a movement of a leading end of a paper sheet being stacked into said paper stacker.

8. A paper stacking apparatus for an image reading apparatus for stacking a paper sheet discharged from a paper transport mechanism of said image reading apparatus along which an optical image reading mechanism is disposed, comprising:
    a paper stacker including, at a bottom portion thereof, a stacker table for receiving thereon paper sheets discharged from said paper transport mechanism to stack the paper sheets;
    a paper stacker position variation mechanism for varying the position of said paper stacker;
    a paper discharge roller mechanism provided at a terminal end of said paper transport mechanism and having a projection extending into a paper transport path of said paper transport mechanism;
    a paper trailing end guide mechanism disposed to extend into said paper stacker for guiding a trailing end of a paper sheet to be stacked into said paper stacker,
    said paper stacker position variation mechanism being constructed so as to allow the position of said paper stacker thereof to be adjusted in advance;
    paper stacker position detection means for detecting the position of said paper stacker adjusted in advance;

allowable paper supply amount calculation means for calculating an allowable paper supply amount based on the position of said paper stacker detected by said paper stacker position detection means;

storage means for storing the allowable paper supply amount calculated by said allowable paper supply amount calculation means;

transport amount detection means for detecting an amount of paper sheets transported by said paper transport mechanism;

stacked amount excess instruction means for detecting whether or not the amount detected by said transport amount detection means exceeds the allowable paper supply amount stored in said storage means; and notification means for notifying, when said stacked amount excess instruction means detects that the amount detected by said transport amount detection means exceeds the allowable paper supply amount stored in said storage means, such excess.

9. A paper stacking apparatus for an image reading apparatus for stacking a paper sheet discharged from a paper transport mechanism of said image reading apparatus along which an optical image reading mechanism is disposed, comprising:

a paper stacker including, at a bottom portion thereof, a stacker table for receiving thereon paper sheets discharged from said paper transport mechanism to stack the paper sheets;

a paper stacker position variation mechanism for varying the position of said paper stacker;

a paper discharge roller mechanism provided at a terminal end of said paper transport mechanism and having a projection extending into a paper transport path of said paper transport mechanism;

a paper trailing end guide mechanism disposed to extend into said paper stacker for guiding a trailing end of a paper sheet to be stacked into said paper stacker, said paper stacker position variation mechanism being constructed so as to allow the position of said paper stacker thereof to be adjusted in advance and a paper supply hopper provided in a paper supply mechanism of said image reading apparatus for accommodating paper sheets therein is constructed for movement to a position corresponding to the amount of paper sheets accommodated in said paper supply hopper;

paper stacker position detection means for detecting the position of said paper stacker adjusted in advance;

storage means for storing an allowable vertical movement amount of said paper supply hopper calculated based on the position of said paper stacker detected by said paper stacker position detection means;

hopper vertical movement amount detection means for detecting a vertical movement amount of said paper supply hopper; and notification means for notifying, when the vertical movement amount detected by said hopper vertical movement amount detection means exceeds the allowable vertical movement amount stored in said storage means, such excess.

10. A paper stacking apparatus for an image reading apparatus for stacking a paper sheet discharged from a paper transport mechanism of said image reading apparatus along which an optical image reading mechanism is disposed, comprising:

a paper stacker including, at a bottom portion thereof, a stacker table for receiving thereon paper sheets discharged from said paper transport mechanism to stack the paper sheets;

a paper stacker position variation mechanism for varying the position of said paper stacker;

a paper discharge roller mechanism provided at a terminal end of said paper transport mechanism and having a projection extending into a paper transport path of said paper transport mechanism;

a paper trailing end guide mechanism disposed to extend into said paper stacker for guiding a trailing end of a paper sheet to be stacked into said paper stacker;

paper stacker position detection means for detecting the position of said paper stacker;

transport amount detection means for detecting an amount of paper sheets transported by said paper transport mechanism;

paper characteristic detection means for detecting a characteristic of a paper sheet transported by said paper transport mechanism, and stacker position control means for controlling said paper stacker position variation mechanism to adjust the position of said paper stacker in response to results of detection by said paper stacker position detection means, said transport amount detection means and said paper characteristic detection means so as to correspond to the transported amount and the paper characteristic.

11. A paper stacking apparatus for an image reading apparatus for stacking a paper sheet discharged from a paper transport mechanism of said image reading apparatus along which an optical image reading mechanism is disposed, comprising:

a paper stacker including, at a bottom portion thereof, a stacker table for receiving thereon paper sheets discharged from said paper transport mechanism to stack the paper sheets;

a paper stacker position variation mechanism for varying the position of said paper stacker;

a paper discharge roller mechanism provided at a terminal end of said paper transport mechanism and having a projection extending into a paper transport path of said paper transport mechanism;

a paper trailing end guide mechanism disposed to extend into said paper stacker for guiding a trailing end of a paper sheet to be stacked into said paper stacker;

paper stacker position detection means for detecting the position of said paper stacker;

transport amount detection means for detecting an amount of paper sheets transported by said paper transport mechanism;

paper size detection means for detecting the size of a paper sheet transported by said paper transport mechanism;

paper thickness detection means for detecting the thickness of a paper sheet transported by said paper transport mechanism; and stacker position control means for controlling said paper stacker position variation mechanism to adjust the position of said paper stacker in response to results of detection of said paper stacker position detection means, said transport amount detection means, said paper size detection means and said paper thickness detection means so as to correspond to the transported paper amount, the paper size and the paper thickness.

12. A paper stacking apparatus for an image reading apparatus for stacking a paper sheet discharged from a paper transport mechanism of said image reading apparatus along which an optical image reading mechanism is disposed, comprising:

a paper stacker including, at a bottom portion thereof, a stacker table for receiving thereon paper sheets discharged from said paper transport mechanism to stack the paper sheets;

a paper stacker position variation mechanism for varying the position of said paper stacker;

a paper discharge roller mechanism provided at a terminal end of said paper transport mechanism and having a projection extending into a paper transport path of said paper transport mechanism;

a paper trailing end guide mechanism disposed to extend into said paper stacker for guiding a trailing end of a paper sheet to be stacked into said paper stacker; and interlocking means for operating said paper stacker position variation mechanism in an interlocking relationship with the paper supply position adjusting operation of a paper supply mechanism for supplying a paper sheet to said paper transport mechanism.

13. A paper stacking apparatus for an image reading apparatus as claimed in one of claims 8–12, wherein said stacker table is mounted for pivotal portion around an axis, and said paper stacker position variation mechanism is constructed as a stacker table pivoting driving mechanism for driving said stacker table to pivot around the axis.

14. A paper stacking apparatus for an image reading apparatus as claimed in one of claims 8–12, wherein said paper stacker position variation mechanism includes a resilient member for biasing said stacker table against the weight of paper sheets received on said stacker table.

15. A paper stacking apparatus for an image reading apparatus as claimed in claim 14, wherein said stacker table is partially movable by said resilient member.

16. A paper stacking apparatus for an image reading apparatus as claimed in claim 12, further comprising interlocking inhibition means for inhibiting, when a paper manual insertion mode is selected, the operation of said paper stacker position variation mechanism interlocked with the paper supply position adjusting operation of said paper supply mechanism.

17. A paper stacking apparatus for an image reading apparatus as claimed in claim 12, wherein the amount of operation of said paper stacker position variation mechanism is set greater than the amount of operation by which the paper supply position of said paper supply mechanism is to be adjusted.

* * * * *